United States Patent
Pan et al.

(10) Patent No.: US 12,534,477 B2
(45) Date of Patent: Jan. 27, 2026

(54) COMPOUND HAVING KHK INHIBITORY EFFECT

(71) Applicant: HANGZHOU ZHONGMEIHUADONG PHARMACEUTICAL CO., LTD., Zhejiang (CN)

(72) Inventors: Zhixiang Pan, Shanghai (CN); Haiying He, Shanghai (CN); Zhigan Jiang, Shanghai (CN); Jianhua Xia, Shanghai (CN); Lei Zhang, Shanghai (CN); Chen Zhang, Shanghai (CN); Jian Li, Shanghai (CN); Shuhui Chen, Shanghai (CN)

(73) Assignee: HANGZHOU ZHONGMEIHUADONG PHARMACEUTICAL CO. , LTD., Zhejiang (CN)

( * ) Notice: Subject to any disclaimer, the term of this patent is extended or adjusted under 35 U.S.C. 154(b) by 809 days.

(21) Appl. No.: 17/788,415

(22) PCT Filed: Dec. 24, 2020

(86) PCT No.: PCT/CN2020/139012
§ 371 (c)(1),
(2) Date: Jun. 23, 2022

(87) PCT Pub. No.: WO2021/129737
PCT Pub. Date: Jul. 1, 2021

(65) Prior Publication Data
US 2023/0138901 A1   May 4, 2023

(30) Foreign Application Priority Data

| Dec. 24, 2019 | (CN) | 201911347364.6 |
| Jan. 15, 2020 | (CN) | 202010042685.1 |
| Mar. 30, 2020 | (CN) | 202010237894.1 |
| Apr. 30, 2020 | (CN) | 202010365981.5 |
| May 27, 2020 | (CN) | 202010463222.2 |
| Aug. 13, 2020 | (CN) | 202010813320.4 |
| Sep. 29, 2020 | (CN) | 202011051594.0 |
| Dec. 16, 2020 | (CN) | 202011490305.7 |

(51) Int. Cl.
C07D 495/04   (2006.01)
A61P 3/08   (2006.01)
C07D 403/04   (2006.01)
C07D 513/04   (2006.01)

(52) U.S. Cl.
CPC ............. *C07D 495/04* (2013.01); *A61P 3/08* (2018.01); *C07D 403/04* (2013.01); *C07D 513/04* (2013.01)

(58) Field of Classification Search
CPC .. C07D 495/04; C07D 403/04; C07D 513/04; A61P 3/08
See application file for complete search history.

(56) References Cited

U.S. PATENT DOCUMENTS

2013/0195886 A1   8/2013   Johnson et al.
2022/0106299 A1   4/2022   Liu et al.

FOREIGN PATENT DOCUMENTS

| CN | 102939283 | 2/2013 |
| CN | 107001377 | 8/2017 |
| CN | 107406462 | 11/2017 |
| CN | 108473469 | 8/2018 |
| CN | 113412260 | 9/2021 |
| EP | 3919484 | 12/2021 |
| EP | 4134366 | 2/2023 |
| JP | 2019500383 | 1/2019 |
| JP | 2021506949 | 2/2021 |
| JP | 2022502444 | 1/2022 |
| JP | 2022518823 | 3/2022 |
| WO | 2011133750 | 10/2011 |
| WO | 2016091774 | 6/2016 |
| WO | 2016142310 | 9/2016 |
| WO | 2017115205 | 7/2017 |
| WO | 2020156445 | 8/2020 |

(Continued)

OTHER PUBLICATIONS

Chen et al. "Research advances in the mechanism of fructose-induced nonalcoholic fatty liver disease." Dept of Cardiology, The First Affiliated Hospital of Wenzhou Medical University, English abstract, Dec. 20, 2017;33(12):2449-52.

(Continued)

*Primary Examiner* — Rebecca L Anderson
(74) *Attorney, Agent, or Firm* — Robin L. Teskin; Baker, Donelson, Bearman, Caldwell & Berkowitz, PC

(57) ABSTRACT

A compound having a KHK inhibitory effect, or pharmaceutically acceptable salts thereof, and use thereof in the preparation of a medicament for treating a disease associated with KHK kinase abnormal expression. Provided is a compound as represented by formula (III) or a pharmaceutically acceptable salt thereof.

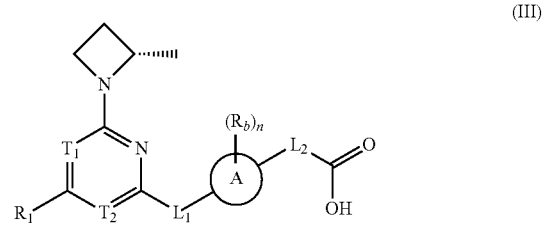

(III)

18 Claims, No Drawings

(56) References Cited

FOREIGN PATENT DOCUMENTS

WO    2021215765    10/2021

OTHER PUBLICATIONS

MyPhuong et al. "Bioactivity-guided identification of botanical inhibitors of ketohexokinase." PloS one. Jun. 20, 2016;11(6):1-17.
International Search Report for Int'l Appl. No. PCT/CN2020/139012, mailed Apr. 6, 2021.

COMPOUND HAVING KHK INHIBITORY EFFECT

CROSS-REFERENCE TO RELATED APPLICATIONS

This application claims the priority from:
CN201911347364.6, filed on 2019 Dec. 24;
CN202010042685.1, filed on 2020 Jan. 15;
CN202010237894.1, filed on 2020 Mar. 30;
CN202010365981.5, filed on 2020 Apr. 30;
CN202010463222.2, filed on 2020 May 27;
CN202010813320.4, filed on 2020 Aug. 13;
CN202011051594.0, filed on 2020 Sep. 29;
CN202011490305.7, filed on 2020 Dec. 16; and
PCT/CN2020/139012, filed on 2020 Dec. 24.

This application is a U.S. National Phase application of Int'l Appl. No. PCT/CN2020/139012, filed Dec. 24, 2020, which claims priority to CN Appl. No. 202011490305.7, filed Dec. 16, 2020, and CN Appl. No. 202011051594.0, filed Sep. 29, 2020, and CN Appl. No. 202010813320.4, filed Aug. 13, 2020, and CN Appl. No. 202010463222.2, filed May 27, 2020, and CN Appl. No. 202010365981.5, filed Apr. 30, 2020, and CN Appl. No. 202010237894.1, filed Mar. 30, 2020, and CN Appl. No. 202010042685.1, filed Jan. 15, 2020, and CN Appl. No. 201911347364.6, filed Dec. 24, 2019.

FIELD OF THE INVENTION

The present invention relates to a class of compounds with KHK inhibitory effect, or pharmaceutically acceptable salts thereof, and the use thereof in the preparation of medicaments for diseases associated with abnormal expression of KHK kinases. Particularly, the present invention relates to a compound represented by formula (III) or a pharmaceutically acceptable salt thereof.

BACKGROUND OF THE INVENTION

Non-alcoholic fatty liver disease (NAFLD) has a high prevalence of about 15% to 40% in developed countries and regions, and 10-20% of NAFLD patients will develop non-alcoholic steatohepatitis (NASH). The estimated worldwide incidence of NASH is 5-7%, and the incidence in the diabetic population will increase to 22%. It is worth noting that about 15-25% of NASH patients will develop cirrhosis. NASH is currently the second leading cause of liver transplantation in the United States, and is expected to become the first leading cause of liver transplantation in the United States in 2020. There is currently no approved drug for the treatment of NASH.

Recent studies have found that a high-fructose diet is an important cause of NASH. Fructose enters the liver and is rapidly phosphorylated to fructose-1-phosphate by the fructokinase Ketohexokinase (KHK). Metabolites produced after fructose-1-phosphate enters cells become substrates for gluconeogenesis and de novo lipogenesis (DNL), leading to increased hepatic lipogenesis and insulin resistance, thereby increasing oxidative stress and inflammation and accelerating the pathogenesis of NAFLD and NASH. KHK is a rate-limiting enzyme for fructose metabolism to fructose-1-phosphate and an important target for regulating fructose metabolism. Therefore, inhibition of KHK can effectively inhibit fructose metabolism, as well as lipid accumulation, oxidative stress, inflammation and insulin resistance caused therefrom, and thus being useful in NASH treatment.

SUMMARY OF THE INVENTION

The present invention provides a compound represented by the following formula or a pharmaceutically acceptable salt thereof, selected from:

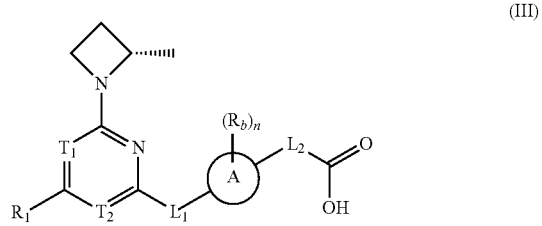

wherein, $T_1$ is selected from N, and $T_2$ is selected from $CR_a$, or $T_2$ is selected from N, and $T_1$ is selected from $CR_a$;

$R_1$ and $R_a$ together with the carbon atoms to which they are directly attached form a ring

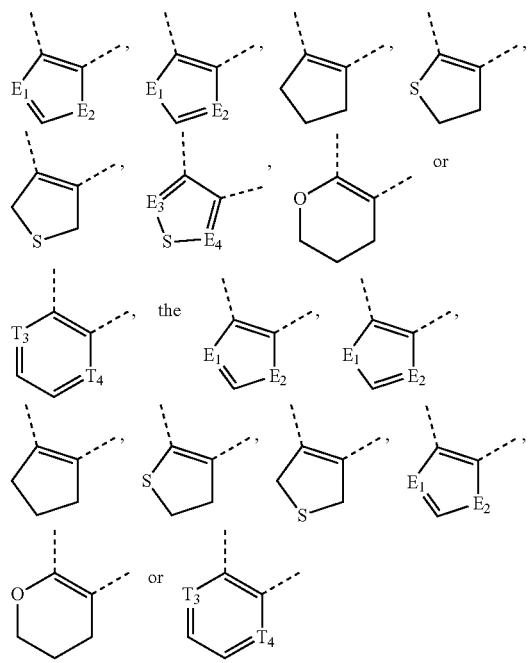

being optionally substituted with 1 or 2 R;

preferably, $R_1$ and $R_a$ together with the carbon atoms to which they are directly attached form a ring

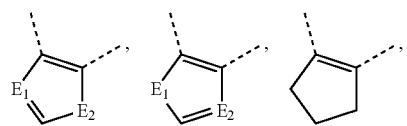

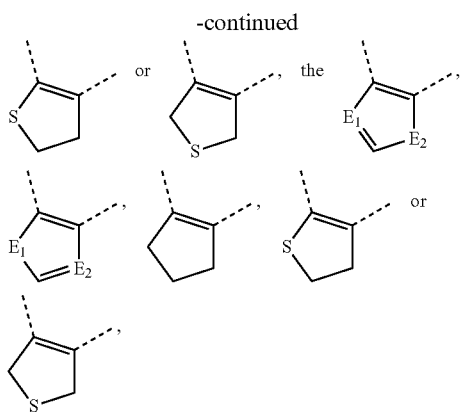

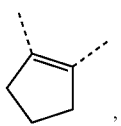

being optionally substituted with 1 or 2 R;

each $E_1$ and $E_2$ is independently selected from the group consisting of N, NH, O, CH, $CH_2$, and S;

$E_3$ and $E_4$ are each independently selected from the group consisting of CH and N;

$T_3$ and $T_4$ are each independently selected from the group consisting of CH and N;

each R is independently selected from the group consisting of H, halo, CN, $NH_2$, OH, $C_{1-3}$ alkyl, and $C_{1-3}$ alkoxy, the $C_{1-3}$ alkyl being optionally substituted with 1, 2, or 3 F;

each $R_b$ is independently selected from the group consisting of halo, cyano, and $C_{1-3}$ alkyl, the $C_{1-3}$ alkyl being optionally substituted with 1, 2, or 3 F;

n is selected from 0, 1 and 2;

$L_1$ is selected from the group consisting of a single bond and NH;

$L_2$ is selected from the group consisting of a single bond, —$(CH_2)_m$—,

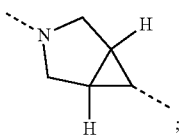

—CH═CH—, and —O$(CH_2)_q$—, wherein the —$(CH_2)_m$—,

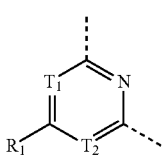

—CH═CH—, and —O$(CH_2)_q$— may be optionally substituted with 1, 2, or 3 R;

m is selected from 0, 1 and 2;

q is selected from 1 and 2;

ring A is selected from the group consisting of 4-8 membered heterocycloalkyl, $C_{3-6}$ cycloalkyl, phenyl, and 5-6 membered heteroaryl;

when $R_1$ and $R_a$ together with the carbon atoms to which they are directly attached form ring

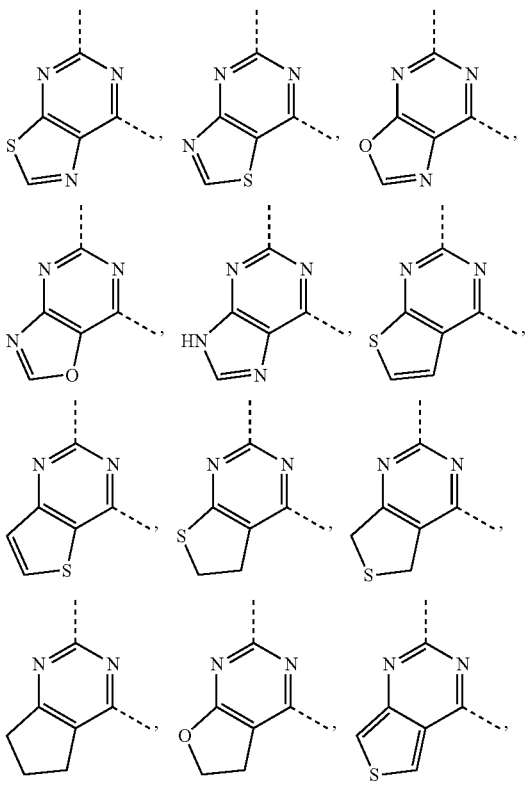

the ring A is not the "4-8 membered heterocycloalkyl and 5-6 membered heteroaryl" contain 1, 2 or 3 heteroatoms independently selected from the group consisting of O, S and N.

In some embodiments of the present invention, the structural unit described above is selected from the group consisting of

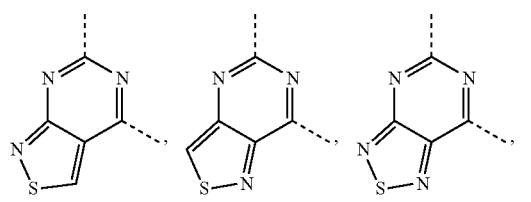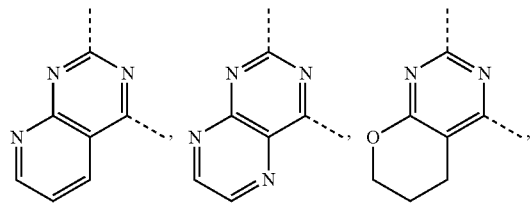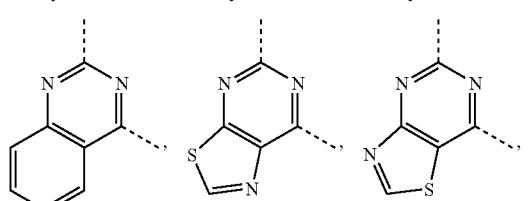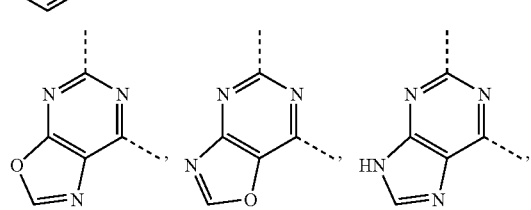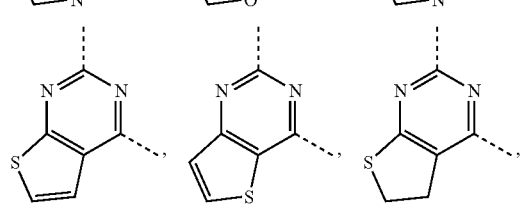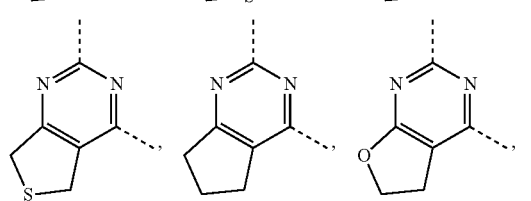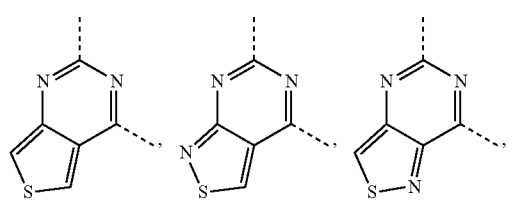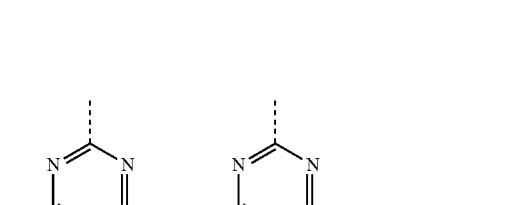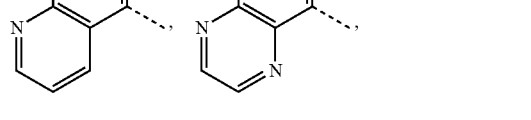
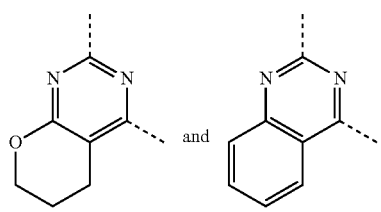
being optionally substituted with 1 or 2 R, and the other variables are as defined herein.
In some embodiments of the invention, the structural unit
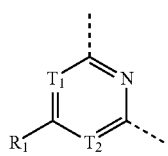
described above is selected from the group consisting of
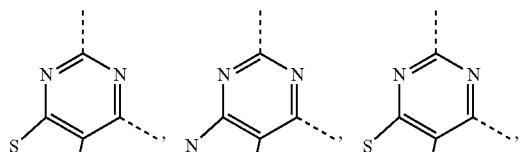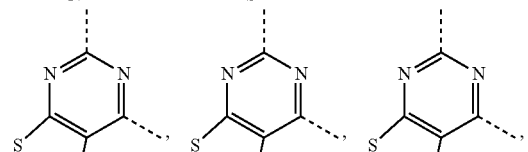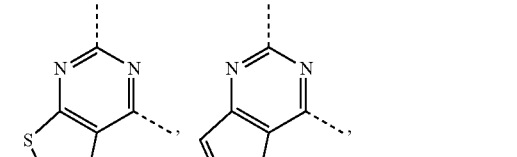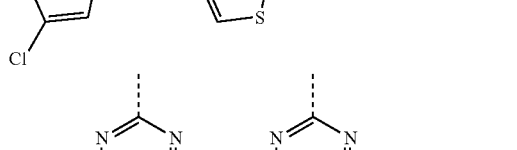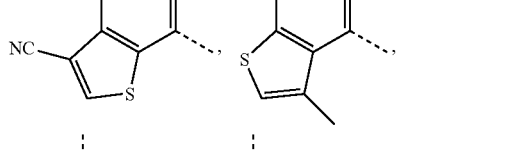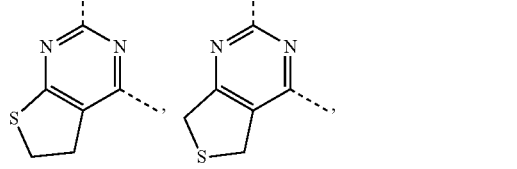

-continued

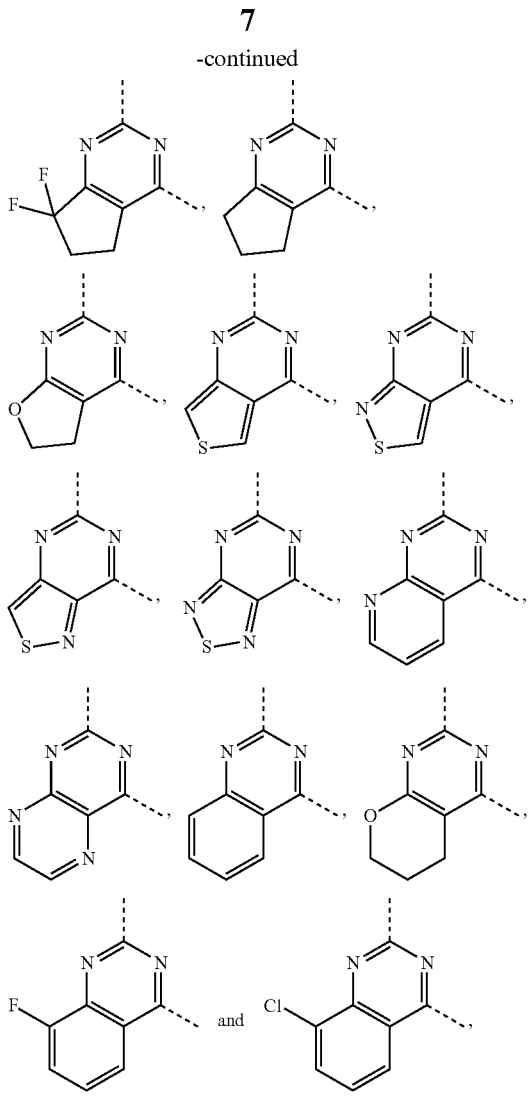

and the other variables are as defined herein.

In some embodiments of the present invention, the ring A described above is selected from the group consisting of

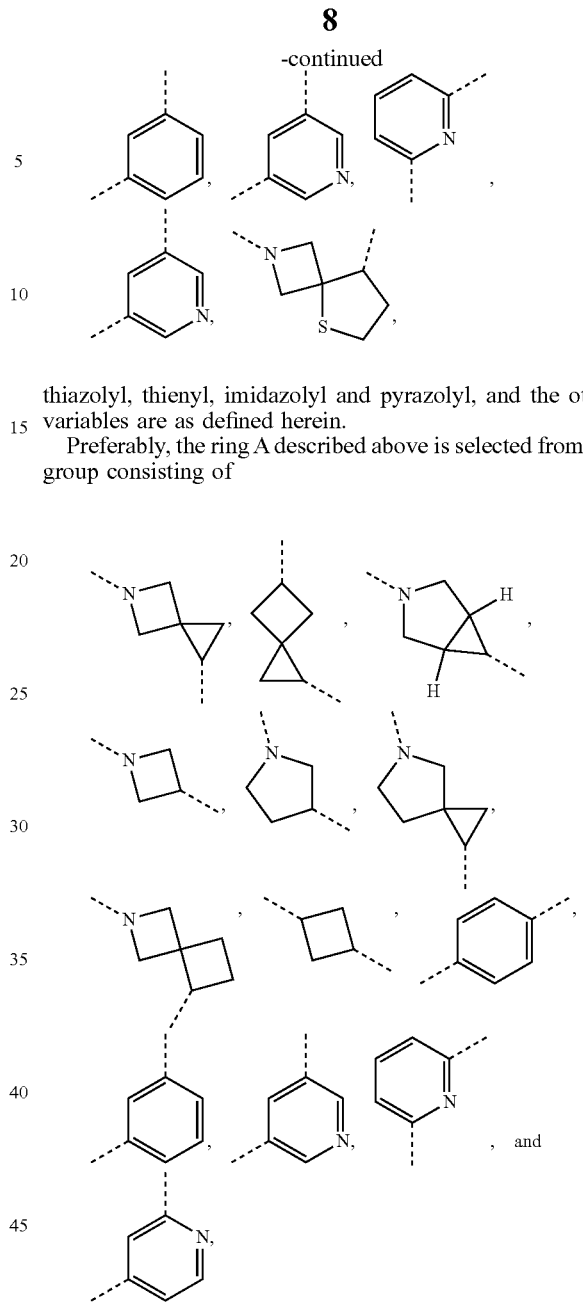

thiazolyl, thienyl, imidazolyl and pyrazolyl, and the other variables are as defined herein.

Preferably, the ring A described above is selected from the group consisting of and the other variables are as defined herein.

In some embodiments of the invention, each R described above is independently selected from the group consisting of H, F, Cl, CN, $CH_3$ and $CF_3$, and the other variables are as defined herein.

In some embodiments of the present invention, each $R_b$ described above is independently selected from the group consisting of F, Cl, cyano, $CH_3$ and $CF_3$, and the other variables are as defined herein.

In some embodiments of the present invention, the compound described above, or a pharmaceutically acceptable salt thereof, wherein $L_2$ is selected from the group consisting of a single bond, —$CH_2$—, —$CH_2CH_2$—, —CH=CH—, and —$OCH_2$—, and the other variables are as defined herein.

The present invention provides a compound represented by the following formula or a pharmaceutically acceptable salt thereof, selected from:

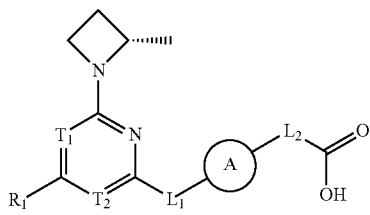
(I)

wherein,
T₁ is selected from N, and T₂ is selected from CR_a, or T₂ is selected from N, and T₁ is selected from CR_a;
R₁ and R_a together with the carbon atoms to which they are directly attached form ring

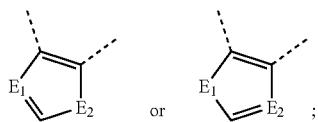

E₁ and E₂ are each independently selected from the group consisting of NH, O, CH and S;
L₁ is selected from the group consisting of a single bond and NH;
L₂ is selected from —(CH₂)_m—;
m is selected from 0, 1 and 2;
ring A is selected from the group consisting of

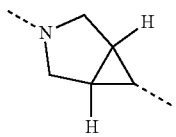

and phenyl, the

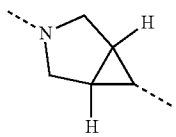

and phenyl being optionally substituted with 1, 2, or 3 R_b;
each R_b is independently selected from the group consisting of halo and methyl.

In some embodiments of the present invention, the compound described above, or a pharmaceutically acceptable salt thereof, wherein the structural unit

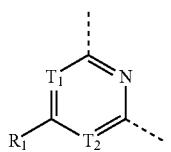

is selected from the group consisting of

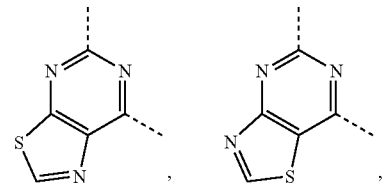

and the other variables are as defined herein.

In some embodiments of the present invention, the compound described above, or a pharmaceutically acceptable salt thereof, wherein the structural unit

is selected from the group consisting of and the other variables are as defined herein.

In some embodiments of the present invention, the compound described above, or a pharmaceutically acceptable salt thereof, wherein the ring A is selected from the group consisting of

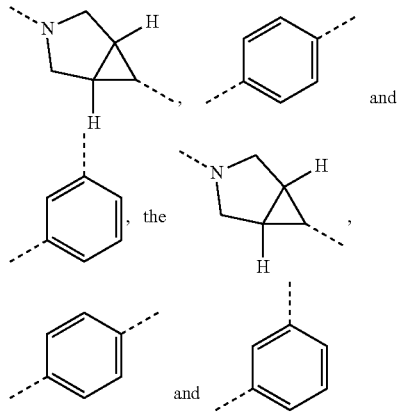

being optionally substituted with 1, 2, or 3 $R_b$, and the other variables are as defined herein.

In some embodiments of the present invention, the compound described above, or a pharmaceutically acceptable salt thereof, wherein the ring A is selected from the group consisting of

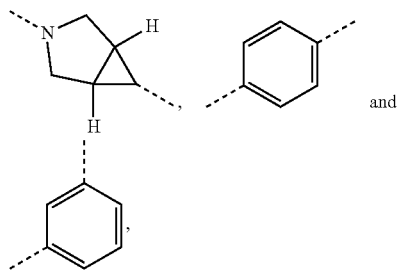

and the other variables are as defined herein.

In some embodiments of the present invention, the compound described above, or a pharmaceutically acceptable salt thereof, wherein $L_2$ is selected from the group consisting of —CH$_2$— and —CH$_2$CH$_2$—, and the other variables are as defined herein.

The present invention provides a compound represented by the following formula or a pharmaceutically acceptable salt thereof, selected from:

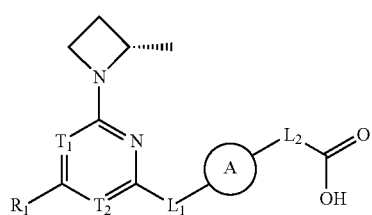

wherein,
$T_1$ is selected from N, and $T_2$ is selected from $CR_a$, or $T_2$ is selected from N, and $T_1$ is selected from $CR_a$;

$R_1$ and $R_a$ together with the carbon atoms to which they are directly attached form ring

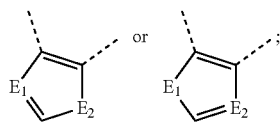

$E_1$ and $E_2$ are each independently selected from the group consisting of N, NH, O, CH and S;

$L_1$ is selected from the group consisting of a single bond and NH;

$L_2$ is selected from —(CH$_2$)$_m$—;

m is selected from 0, 1 and 2;

ring A is selected from the group consisting of

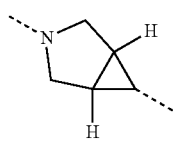

and phenyl, the

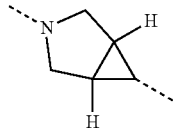

and phenyl being optionally substituted with 1, 2, or 3 $R_b$;

each $R_b$ is independently selected from the group consisting of halo and methyl.

In some embodiments of the present invention, the compound described above, or a pharmaceutically acceptable salt thereof, wherein the structural unit

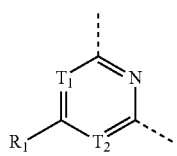

is selected from the group consisting of

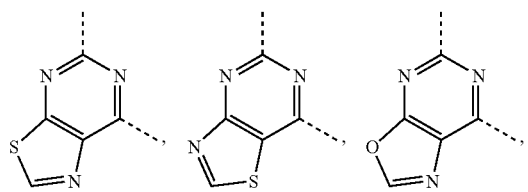

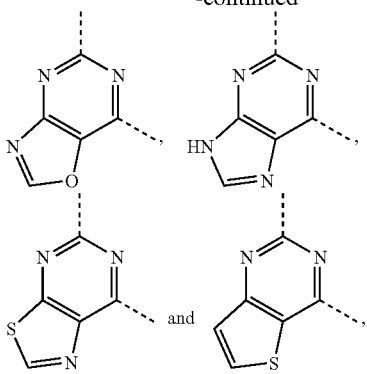

and the other variables are as defined herein.

In some embodiments of the present invention, the compound described above, or a pharmaceutically acceptable salt thereof, wherein the structural unit

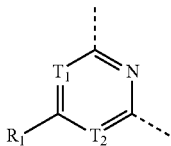

is selected from the group consisting of

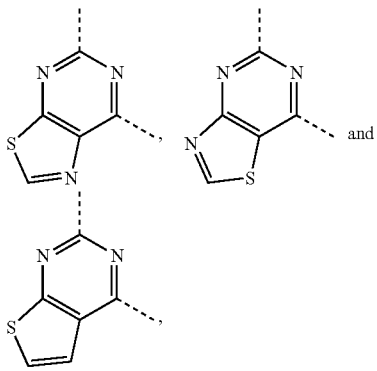

and the other variables are as defined herein.

In some embodiments of the present invention, the compound described above, or a pharmaceutically acceptable salt thereof, wherein the ring A is selected from the group consisting of

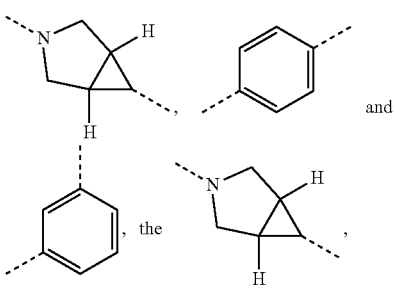

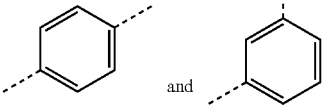

being optionally substituted with 1, 2, or 3 $R_b$, and the other variables are as defined herein.

In some embodiments of the present invention, the compound described above, or a pharmaceutically acceptable salt thereof, wherein the ring A is selected from the group consisting of

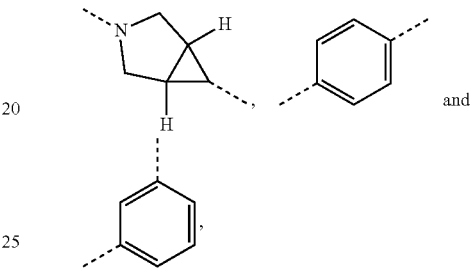

and the other variables are as defined herein.

In some embodiments of the present invention, the compound described above, or a pharmaceutically acceptable salt thereof, wherein $L_2$ is selected from the group consisting of —$CH_2$— and —$CH_2CH_2$—, and the other variables are as defined herein.

The present invention provides a compound represented by the following formula or a pharmaceutically acceptable salt thereof, selected from:
wherein, (III)

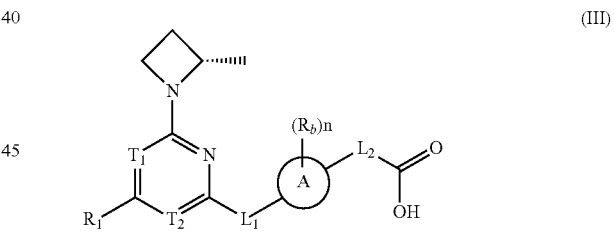

$T_1$ is selected from N, and $T_2$ is selected from $CR_a$, or $T_2$ is selected from N, and $T_1$ is selected from $CR_a$;

$R_1$ and $R_a$ together with the carbon atoms to which they are directly attached form ring

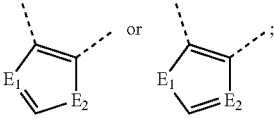

$E_1$ and $E_2$ are each independently selected from the group consisting of N, NH, O, CR and S;

R is selected from the group consisting of H and methyl;

each $R_b$ is independently selected from the group consisting of halo, cyano, and $C_{1-3}$ alkyl, the $C_{1-3}$ alkyl being optionally substituted with 1, 2, or 3 F;

$L_1$ is selected from the group consisting of a single bond and NH;
$L_2$ is selected from the group consisting of a single bond, —(CH$_2$)$_m$—, and —CH=CH—;
m is selected from 0, 1 and 2;
n is selected from 0, 1 and 2; and
ring A is selected from the group consisting of

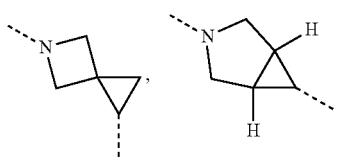

and phenyl.

In some embodiments of the present invention, the structural unit

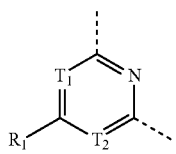

described above is selected from the group consisting of

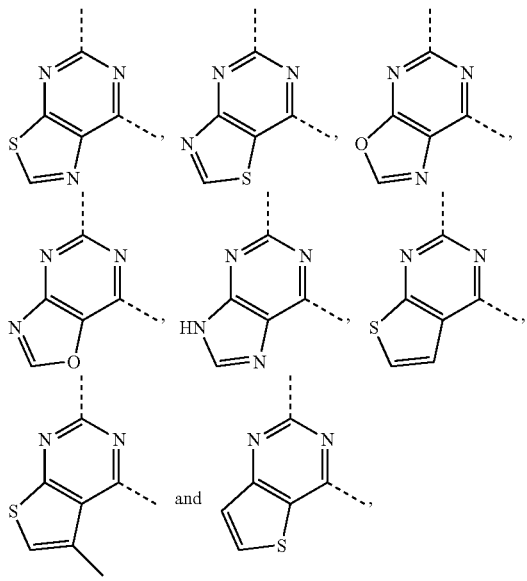

and the other variables are as defined herein.

In some embodiments of the invention, the structural unit

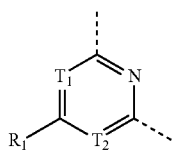

described above is selected from the group consisting of

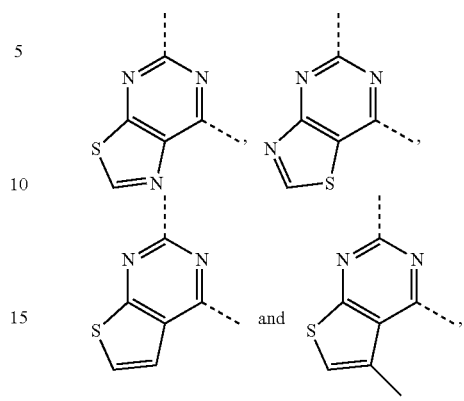

and the other variables are as defined herein.

In some embodiments of the present invention, the ring A described above is selected from the group consisting of

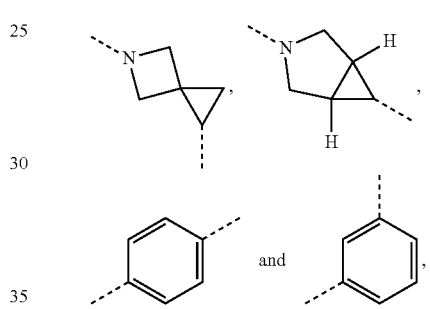

and the other variables are as defined herein.

In some embodiments of the present invention, each $R_2$ described above is independently selected from the group consisting of F, CN, CH$_3$ and CF$_3$, and the other variables are as defined herein.

In some embodiments of the present invention, the compound described above, or a pharmaceutically acceptable salt thereof, wherein a single bond, —CH$_2$—, —CH$_2$CH$_2$—, and —CH=CH—, and the other variables are as defined herein.

The present invention provides a compound represented by the following formula or a pharmaceutically acceptable salt thereof, selected from:

(III)

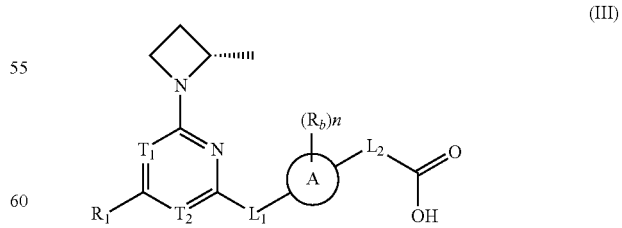

wherein,
$T_1$ is selected from N, and $T_2$ is selected from CR$_a$, or $T_2$ is selected from N, and $T_1$ is selected from CR$_a$;
$R_1$ and $R_a$ together with the carbon atoms to which they are directly attached form ring

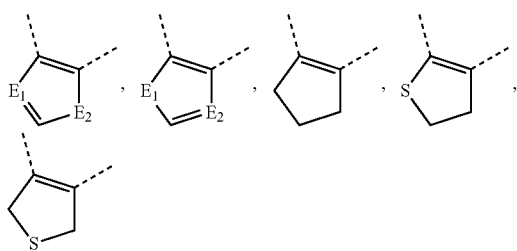

or a phenyl ring, the

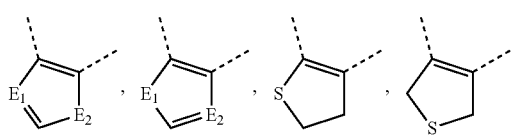

or phenyl ring being optionally substituted with 1 or 2 R;

each $E_1$ and $E_2$ is independently selected from the group consisting of N, NH, O, CH, and S;

each R is independently selected from the group consisting of H, halo, CN and methyl, the methyl being optionally substituted with 1, 2 or 3 F;

each $R_b$ is independently selected from the group consisting of halo, cyano, and $C_{1-3}$ alkyl, the $C_{1-3}$ alkyl being optionally substituted with 1, 2, or 3 F;

n is selected from 0, 1 and 2;

$L_1$ is selected from the group consisting of a single bond and NH;

$L_2$ is selected from the group consisting of a single bond, —$(CH_2)_m$—, and —CH=CH—;

m is selected from 0, 1 and 2;

ring A is selected from 4-7 membered heterocycloalkyl, $C_{3-6}$ cycloalkyl, and phenyl;

the "4-7 membered heterocycloalkyl" contains 1, 2 or 3 heteroatoms independently selected from the group consisting of O, S and N.

In some embodiments of the present invention, the structural unit

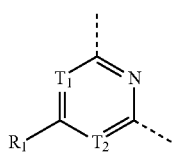

described above is selected from the group consisting of

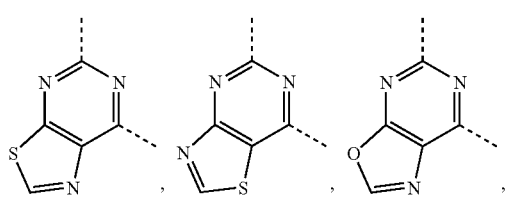

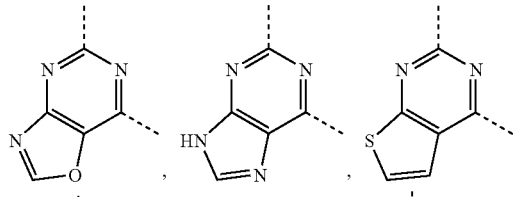

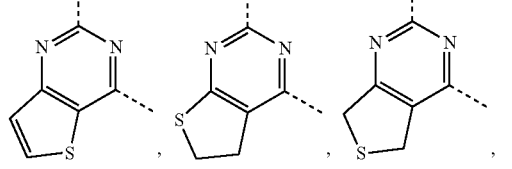

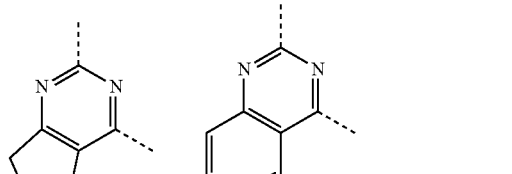

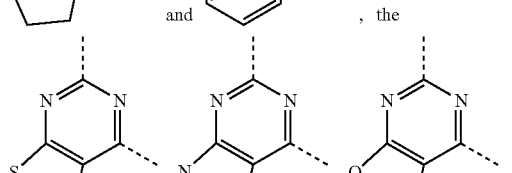

and

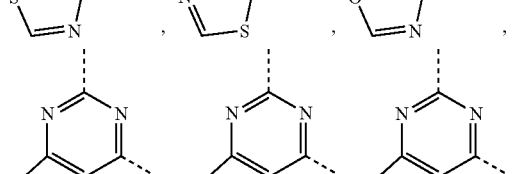

, the

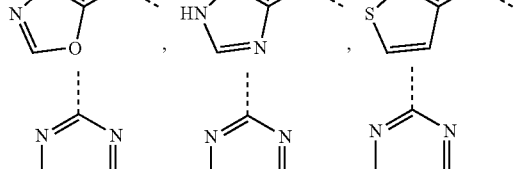

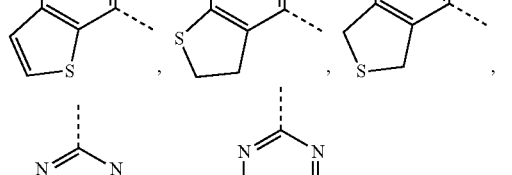

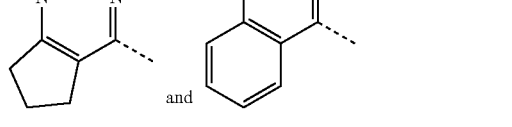

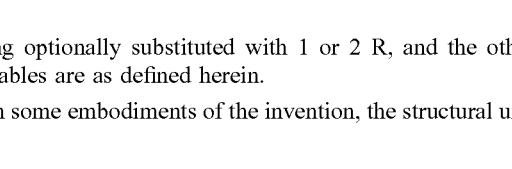

and being optionally substituted with 1 or 2 R, and the other variables are as defined herein.

In some embodiments of the invention, the structural unit

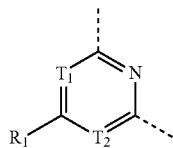

described above is selected from the group consisting of

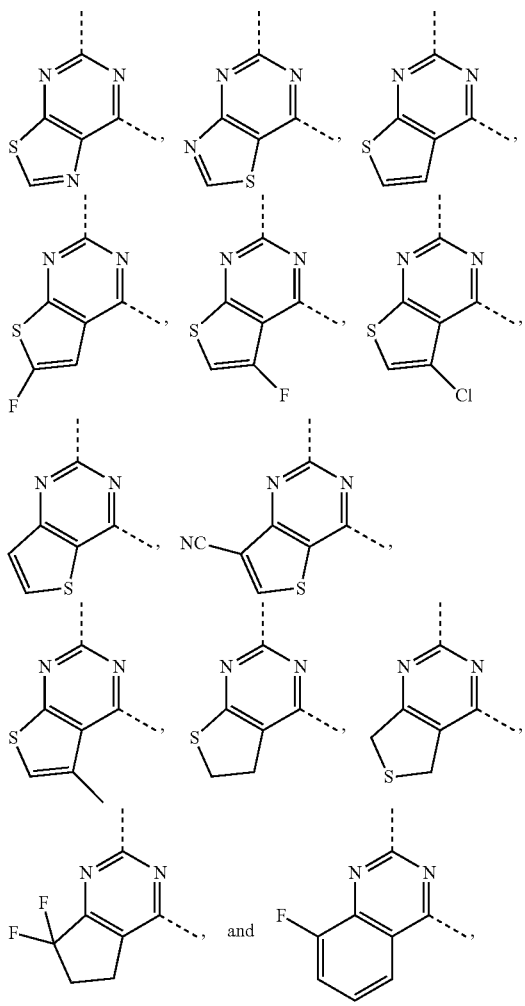

and the other variables are as defined herein.

In some embodiments of the present invention, the ring A described above is selected from the group consisting of

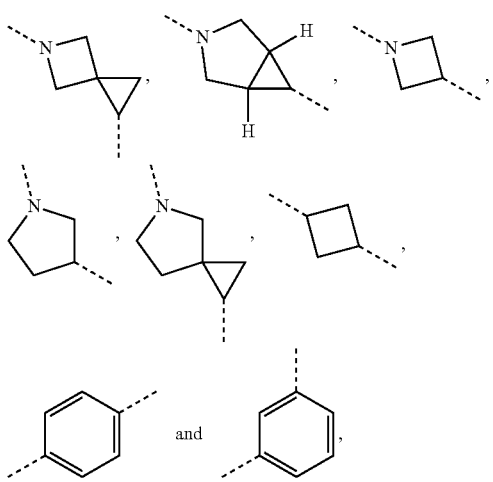

and the other variables are as defined herein.

In some embodiments of the invention, each R described above is independently selected from the group consisting of H, F, Cl, CN, $CH_3$ and $CF_3$, and the other variables are as defined herein.

In some embodiments of the present invention, each $R_b$ described above is independently selected from the group consisting of F, Cl, cyano, and $CF_3$, and the other variables are as defined herein.

In some embodiments of the present invention, the compound described above, or a pharmaceutically acceptable salt thereof, wherein a single bond, —$CH_2$—, —$CH_2CH_2$—, and —CH=CH—, and the other variables are as defined herein.

The present invention provides a compound of formula or a pharmaceutically acceptable salt thereof, selected from:

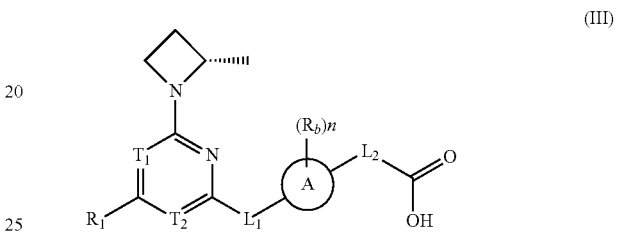

(III)

wherein,
$T_1$ is selected from N, and $T_2$ is selected from $CR_a$, or $T_2$ is selected from N, and $T_1$ is selected from $CR_a$;
$R_1$ and $R_a$ together with the carbon atoms to which they are directly attached form ring

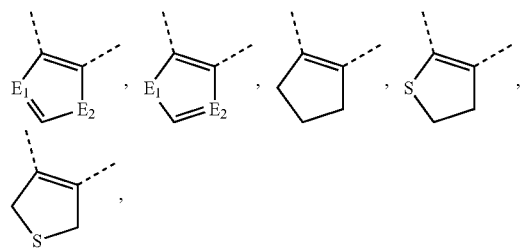

or a phenyl ring, the

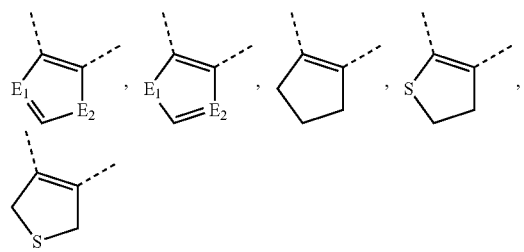

or phenyl ring being optionally substituted with 1 or 2 R;
each $E_1$ and $E_2$ is independently selected from the group consisting of N, NH, O, CH, and S;
each R is independently selected from the group consisting of H, halo, CN and methyl, the methyl being optionally substituted with 1, 2 or 3 F;
each $R_b$ is independently selected from the group consisting of halo, cyano, and $C_{1-3}$ alkyl, the $C_{1-3}$ alkyl being optionally substituted with 1, 2, or 3 F;

n is selected from 0, 1 and 2;

$L_1$ is selected from the group consisting of a single bond and NH;

$L_2$ is selected from the group consisting of a single bond, —$(CH_2)_m$—, —CH=CH—, and —O$(CH_2)_q$—;

m is selected from 0, 1 and 2;

q is selected from 1 and 2;

ring A is selected from 4-7 membered heterocycloalkyl, $C_{3-6}$ cycloalkyl, phenyl, and 5-6 membered heteroaryl;

the "4-7 membered heterocycloalkyl and 5-6 membered heteroaryl" contain 1, 2 or 3 heteroatoms independently selected from the group consisting of O, S and N.

In some embodiments of the present invention, the structural unit

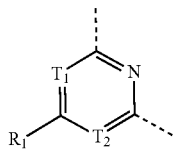

is selected from the group consisting of

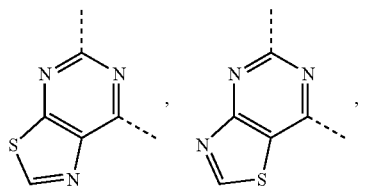

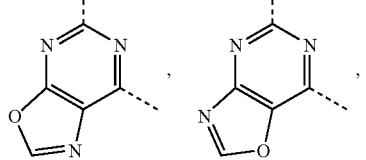

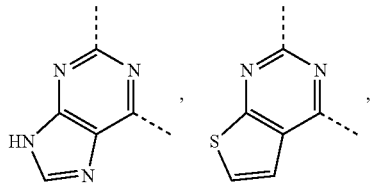

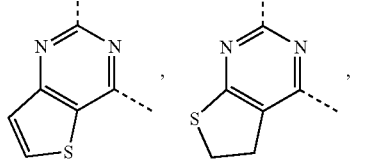

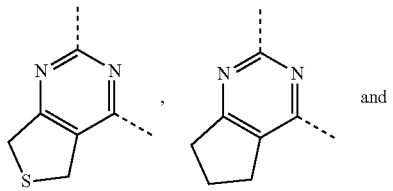

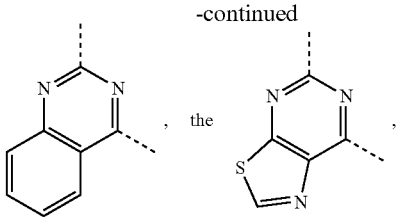

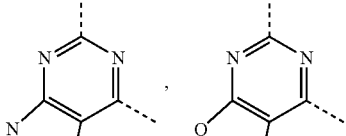

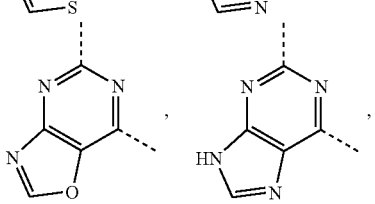

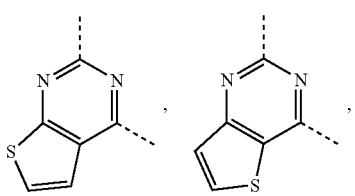

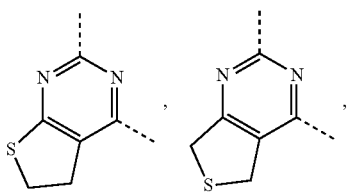

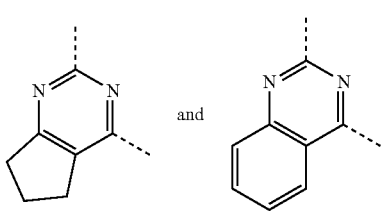

being optionally substituted with 1 or 2 R, and the other variables are as defined herein.

In some embodiments of the invention, the structural unit

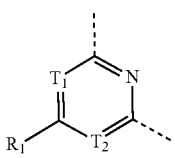

described above is selected from the group consisting of

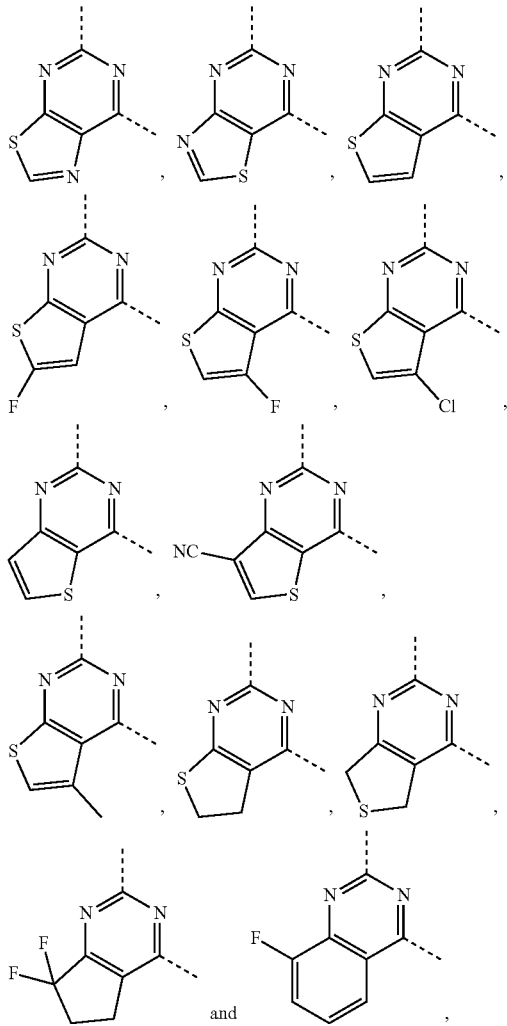

and the other variables are as defined herein.

In some embodiments of the present invention, the ring A described above is selected from the group consisting of

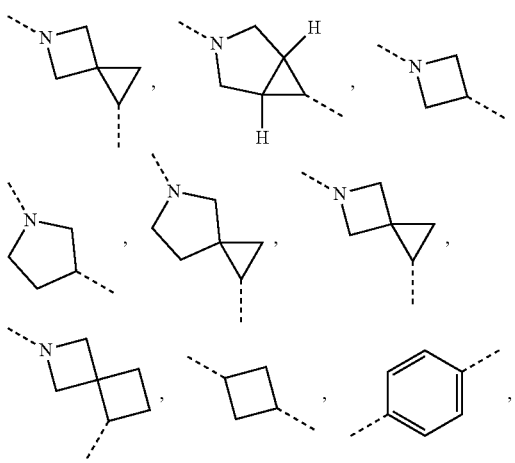

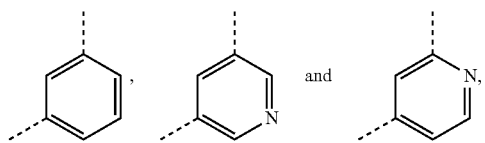

and other variables are as defined herein.

In some embodiments of the invention, each R described above is independently selected from the group consisting of H, F, Cl, CN, $CH_3$ and $CF_3$, and the other variables are as defined herein.

In some embodiments of the present invention, each $R_b$ described above is independently selected from the group consisting of F, Cl, cyano, and $CF_3$, and the other variables are as defined herein.

In some embodiments of the present invention, the compound described above, or a pharmaceutically acceptable salt thereof, wherein a single bond, —$CH_2$—, —$CH_2CH_2$—, —CH=CH—, and —$OCH_2$—, and the other variables are as defined herein.

The present invention provides a compound represented by the following formula or a pharmaceutically acceptable salt thereof, selected from:

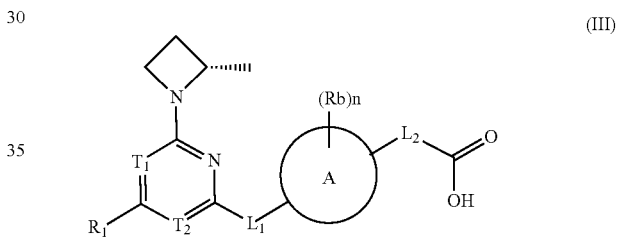

(III)

wherein, $T_1$ is selected from N, and $T_2$ is selected from $CR_a$, or $T_2$ is selected from N, and $T_1$ is selected from $CR_a$;

$R_1$ and $R_a$ together with the carbon atoms to which they are directly attached form ring

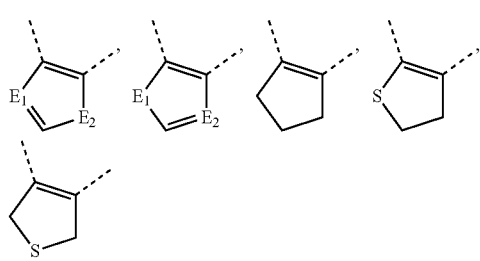

or a phenyl ring, the

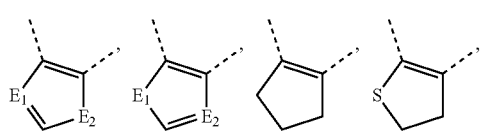

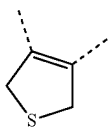

or phenyl ring being optionally substituted with 1 or 2 R;

each $E_1$ and $E_2$ is independently selected from the group consisting of N, NH, O, CH, and S;

each R is independently selected from the group consisting of H, halogen, CN and methyl, the methyl being optionally substituted with 1, 2 or 3 F;

each $R_b$ is independently selected from the group consisting of halo, cyano, and $C_{1-3}$ alkyl, the $C_{1-3}$ alkyl being optionally substituted with 1, 2, or 3 F;

n is selected from 0, 1 and 2;

$L_1$ is selected from the group consisting of a single bond and NH;

$L_2$ is selected from the group consisting of a single bond, —$(CH_2)_m$—, —CH=CH—, and —$O(CH_2)_q$—;

m is selected from 0, 1 and 2;

q is selected from 1 and 2;

ring A is selected from the group consisting of 4-7 membered heterocycloalkyl, $C_{3-6}$ cycloalkyl, phenyl, and 5-6 membered heteroaryl;

the "4-7 membered heterocycloalkyl and 5-6 membered heteroaryl" contain 1, 2 or 3 heteroatoms independently selected from the group consisting of O, S and N.

In some embodiments of the present invention, the above structural unit

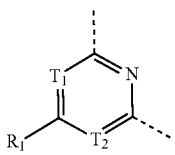

described above is selected from the group consisting of

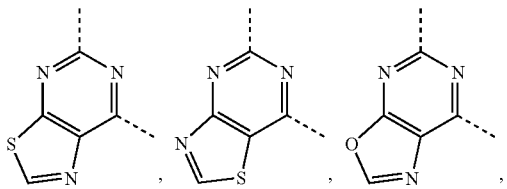

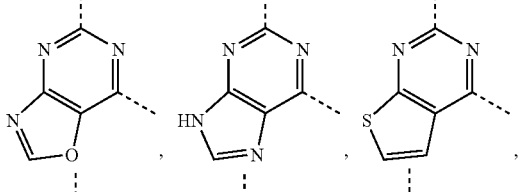

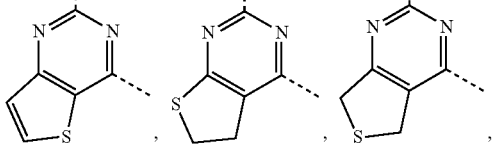

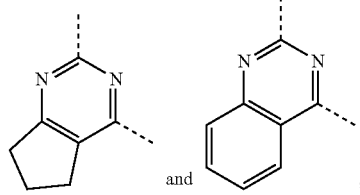

and , the

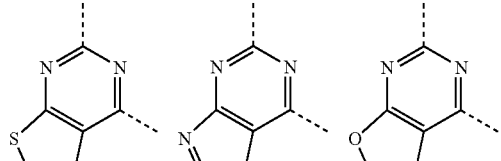

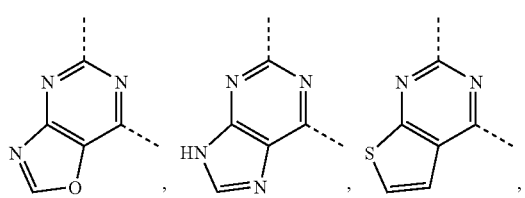

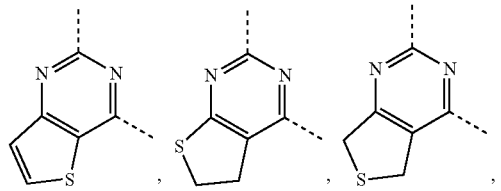

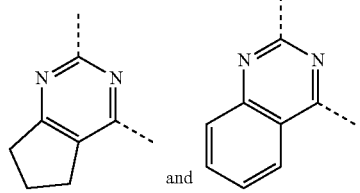

and being optionally substituted with 1 or 2 R, and the other variables are as defined herein.

In some embodiments of the invention, the structural unit

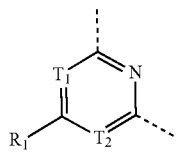

described above is selected from the group consisting of

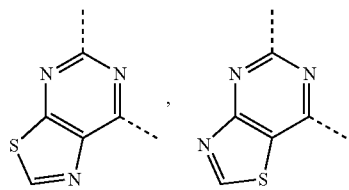

-continued

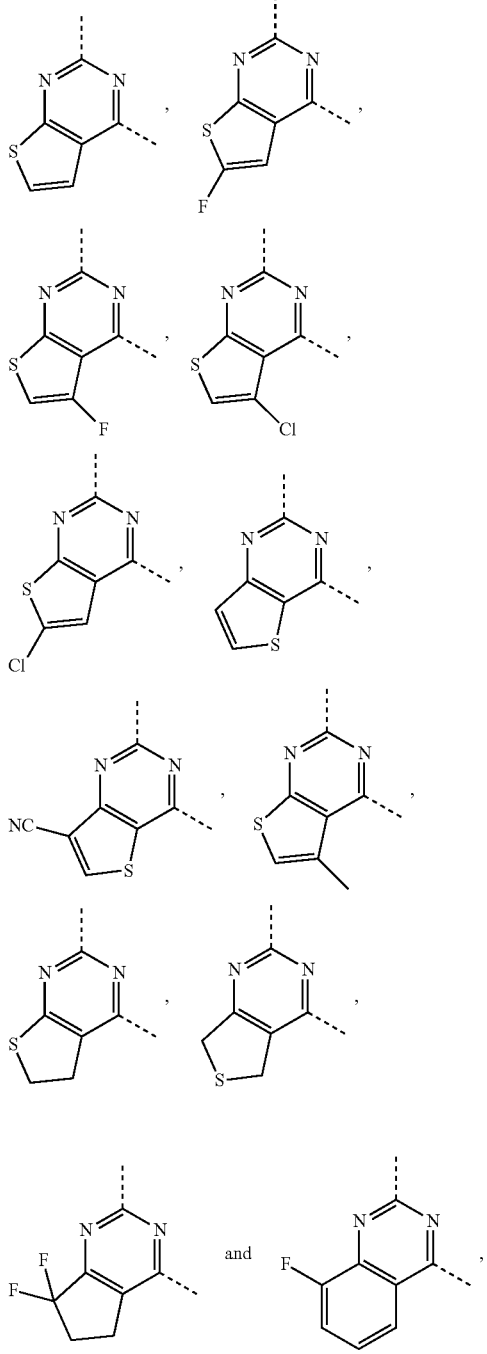

and the other variables are as defined herein.

In some embodiments of the present invention, the ring A described above is selected from the group consisting of

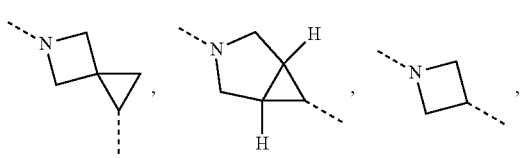

-continued

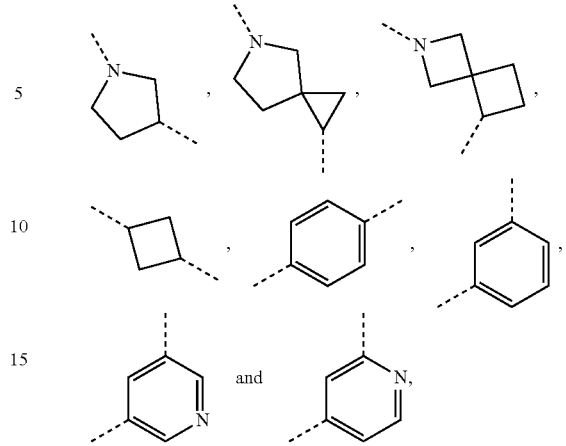

and other variables are as defined herein.

In some embodiments of the invention, each R described above is independently selected from the group consisting of H, F, Cl, CN, $CH_3$ and $CF_3$, and the other variables are as defined herein.

In some embodiments of the present invention, each $R_b$ described above is independently selected from group consisting of F, Cl, cyano, and $CF_3$, and the other variables are as defined herein.

In some embodiments of the present invention, the compound described above, or a pharmaceutically acceptable salt thereof, wherein a single bond, —$CH_2$—, —$CH_2CH_2$—, —CH=CH—, and —$OCH_2$—, and the other variables are as defined herein.

The present invention provides a compound represented by the following formula or a pharmaceutically acceptable salt thereof, selected from:

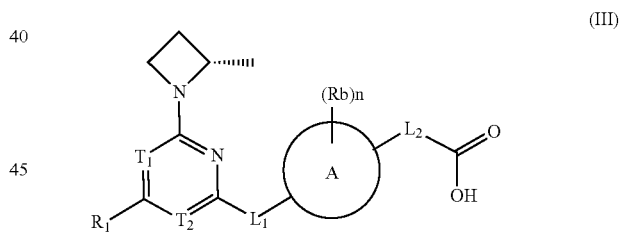

(III)

wherein,
$T_1$ is selected from N, and $T_2$ is selected from $CR_a$, or $T_2$ is selected from N, and $T_1$ is selected from $CR_a$;
$R_1$ and $R_a$ together with the carbon atoms to which they are directly attached form ring

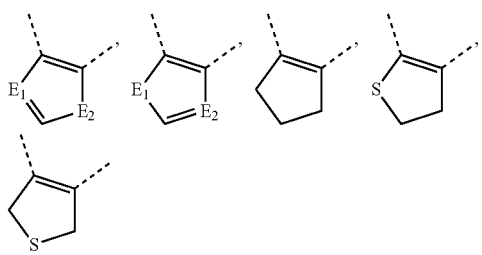

or a phenyl ring, the

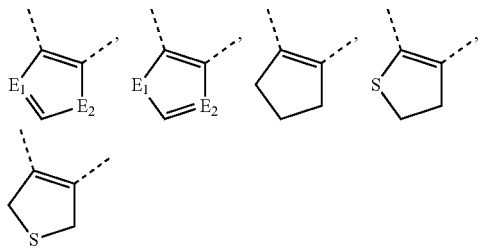

or phenyl ring being optionally substituted with 1 or 2 R;
each $E_1$ and $E_2$ is independently selected from the group consisting of N, NH, O, CH, and S;
each R is independently selected from the group consisting of H, halo, CN and methyl, the methyl being optionally substituted with 1, 2 or 3 F;
each $R_b$ is independently selected from the group consisting of halo, cyano, and $C_{1-3}$ alkyl, the $C_{1-3}$ alkyl being optionally substituted with 1, 2, or 3 F;
n is selected from 0, 1 and 2;
$L_1$ is selected from the group consisting of a single bond and NH;
$L_2$ is selected from the group consisting of a single bond, $-(CH_2)_m-$, $-CH=CH-$, and $-O(CH_2)_q-$;
m is selected from 0, 1 and 2;
q is selected from 1 and 2;
ring A is selected from the group consisting of 4-7 membered heterocycloalkyl, $C_{3-6}$ cycloalkyl, phenyl, and 5-6 membered heteroaryl;
when $R_1$ and $R_a$ together with the carbon atoms to which they are directly attached form ring

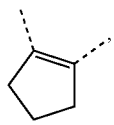

the ring A is not

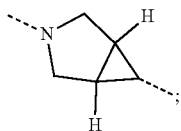

the "4-7 membered heterocycloalkyl and 5-6 membered heteroaryl" contain 1, 2 or 3 heteroatoms independently selected from the group consisting of O, S and N.
In some embodiments of the present invention, the structural unit

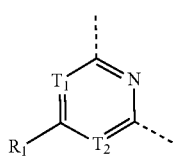

described above is selected from the group consisting of

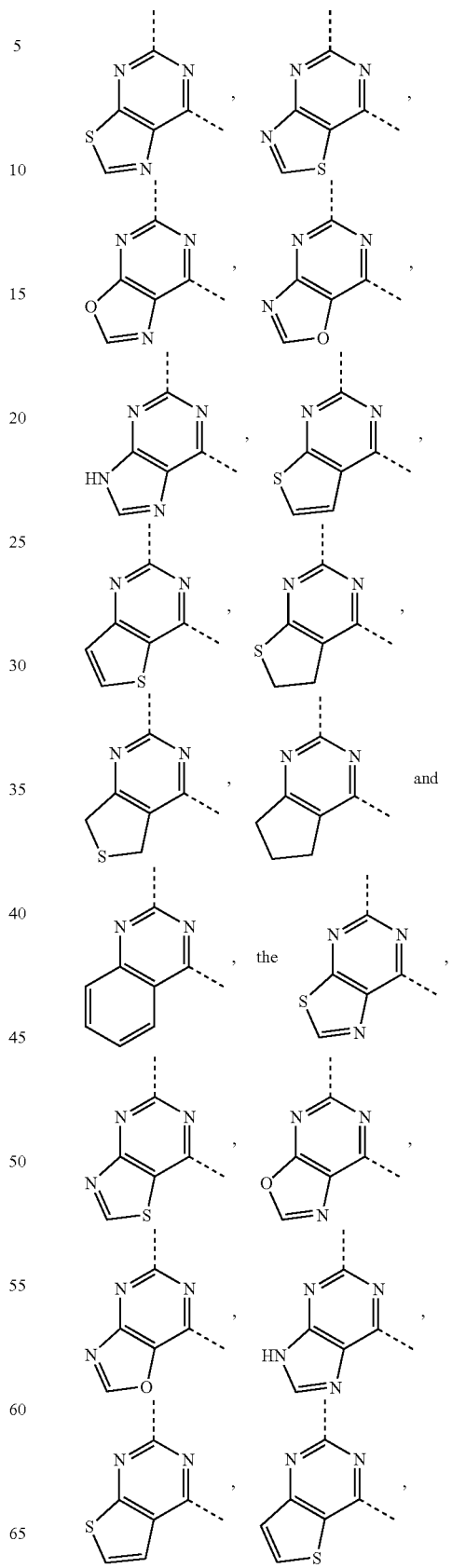

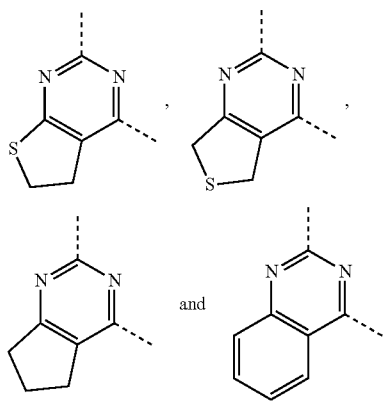
being optionally substituted with 1 or 2 R, and the other variables are as defined herein.
In some embodiments of the invention, the structural unit
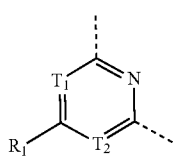
described above is selected from the group consisting of
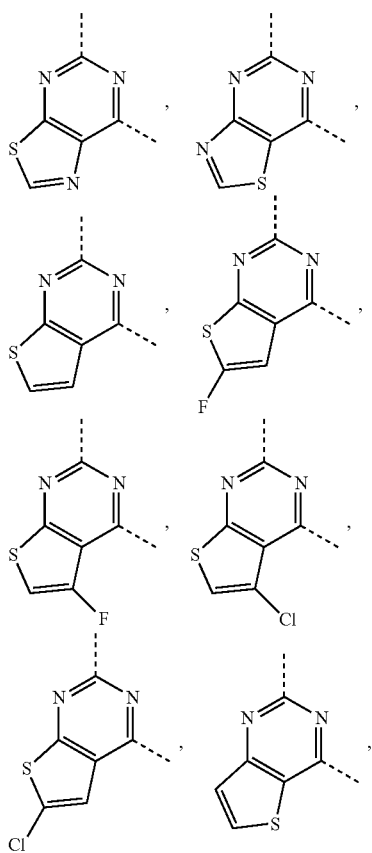
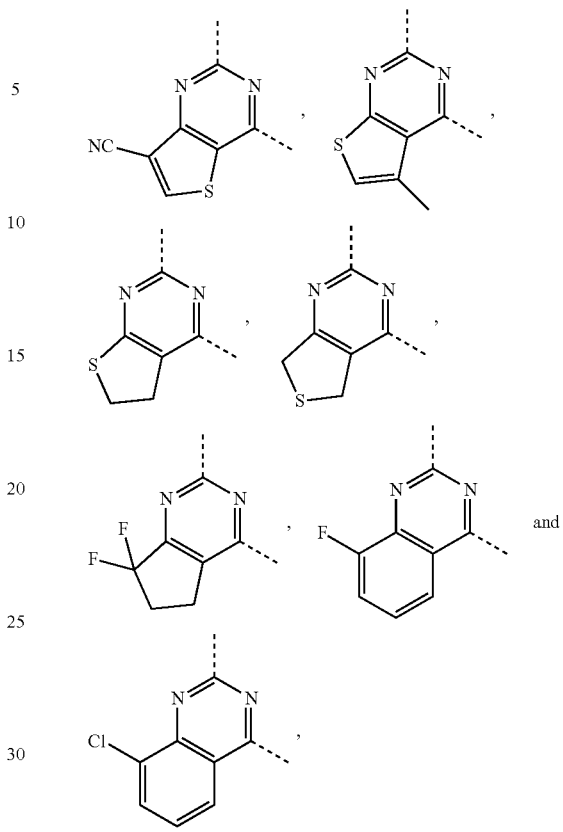
and the other variables are as defined herein.
In some embodiments of the present invention, the ring A described above is selected from the group consisting of
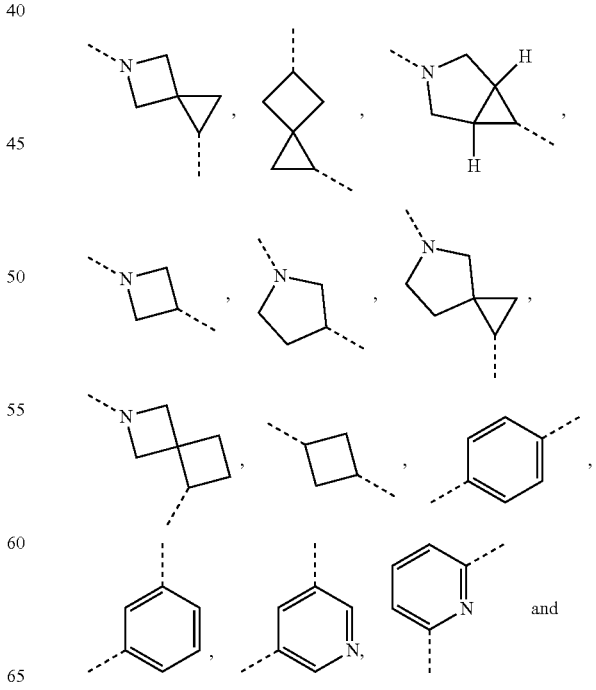

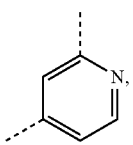

and the other variables are as defined herein.

In some embodiments of the invention, each R described above is independently selected from the group consisting of H, F, Cl, CN, CH$_3$ and CF$_3$, and the other variables are as defined herein.

In some embodiments of the present invention, each R$_b$ described above is independently selected from the group consisting of F, Cl, cyano, CH$_3$ and CF$_3$, and the other variables are as defined herein.

In some embodiments of the present invention, the compound described above, or a pharmaceutically acceptable salt thereof, wherein L$_2$ is selected from the group consisting of a single bond, —CH$_2$—, —CH$_2$CH$_2$—, —CH=CH—, and —OCH$_2$—, and the other variables are as defined herein.

In some embodiments of the present invention, the compound described above, or a pharmaceutically acceptable salt thereof, is selected from the group consisting of (I-1)

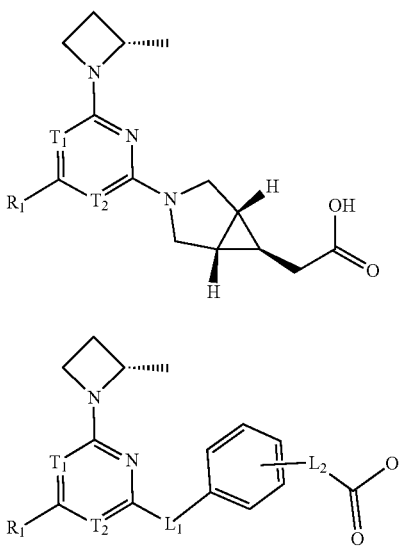

(I-2)

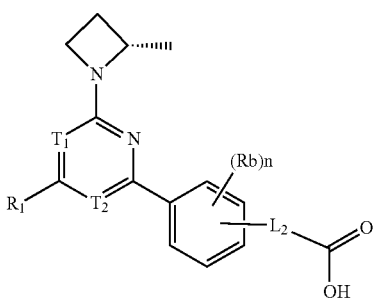

(III-1)

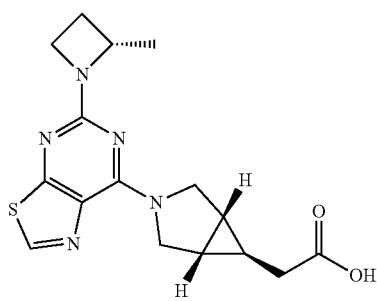

(III-2)

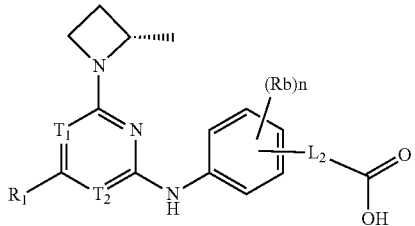

(VI-1)

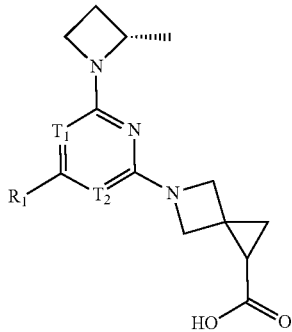

(VIII-1)

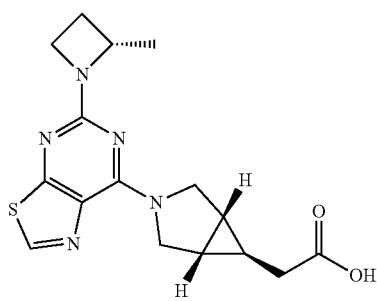

wherein R$_1$, R$_b$, T$_1$, T$_2$, n and L$_2$ are as defined herein.

The present invention still comprises other embodiments resulting from any combinations of the above variables.

The present invention also provides the following compounds or pharmaceutically acceptable salts thereof:

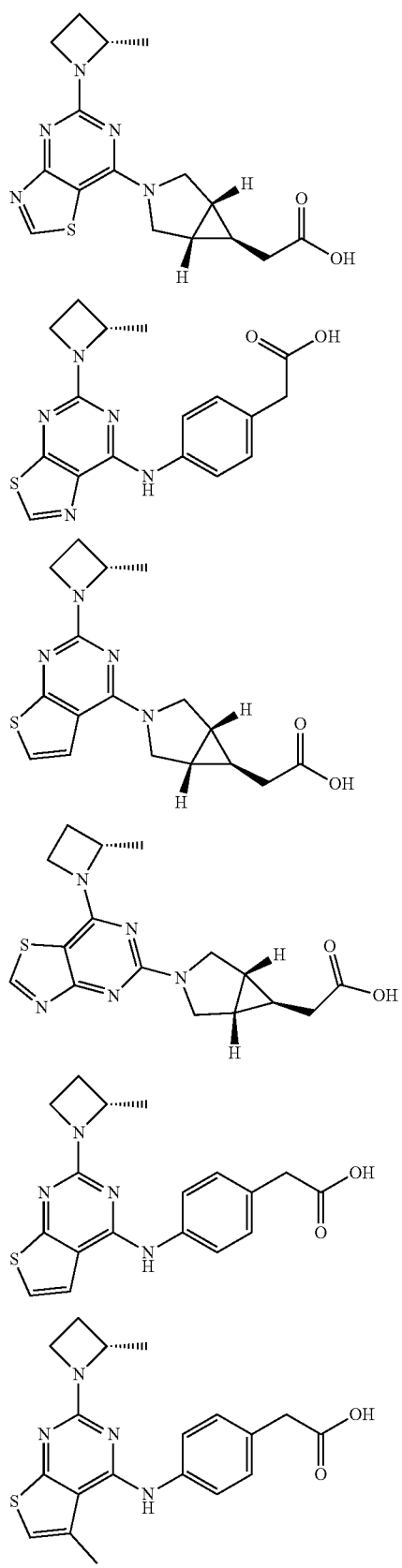
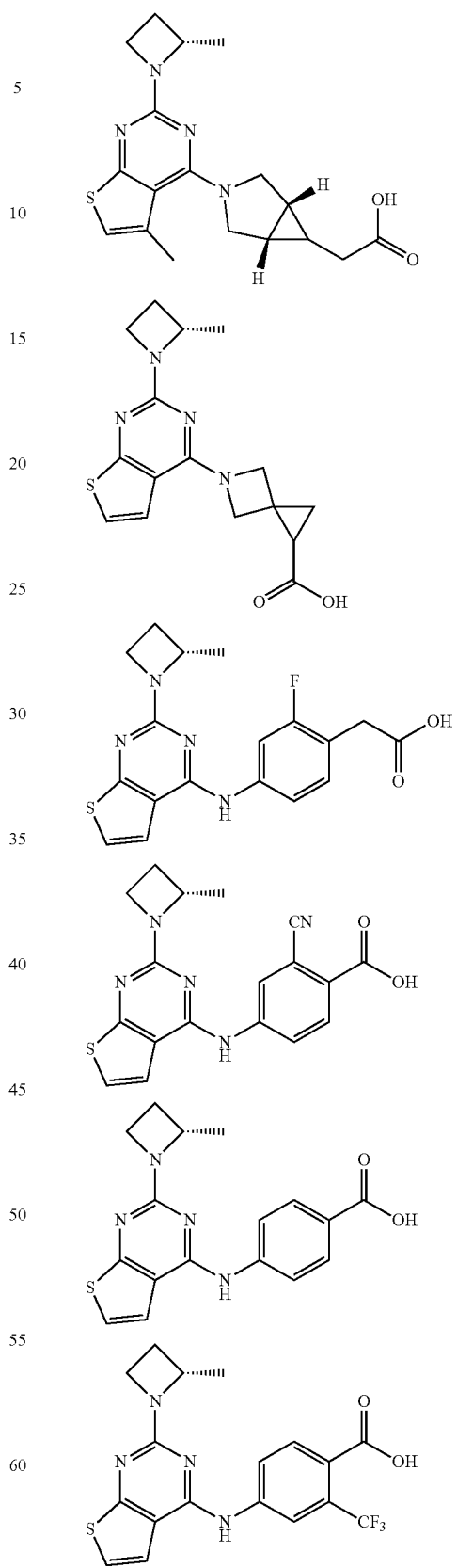

37
-continued
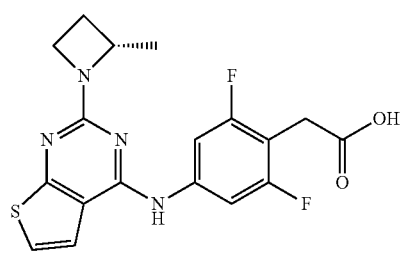
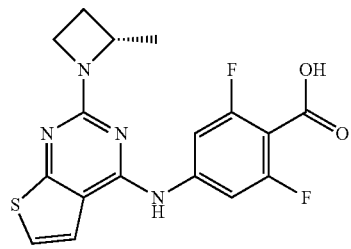
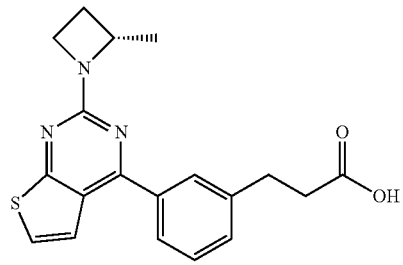
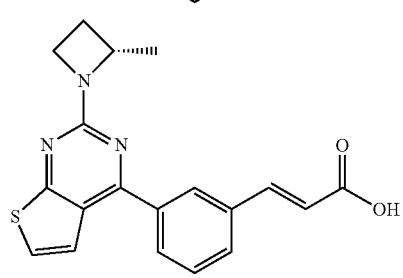
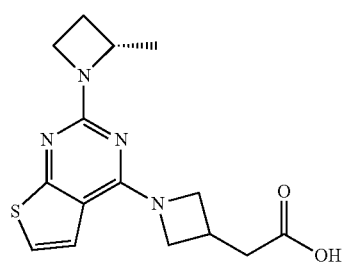
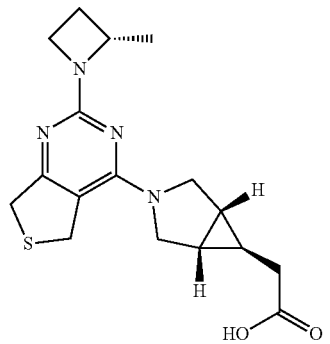
38
-continued
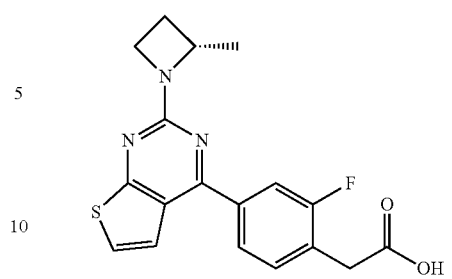
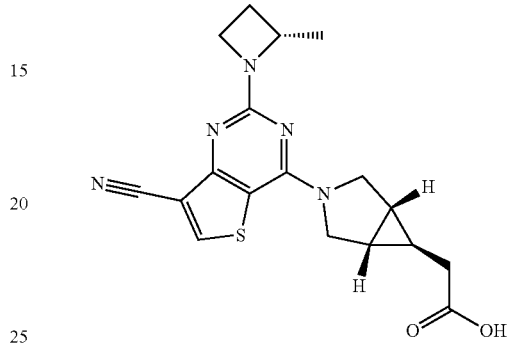
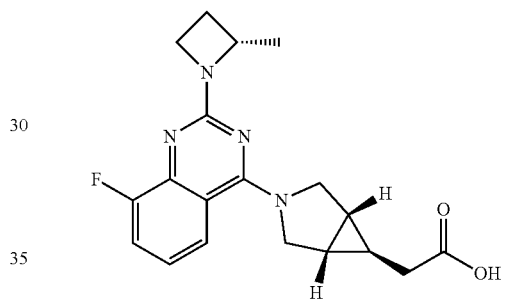

39
-continued
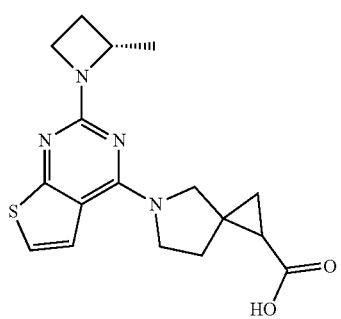
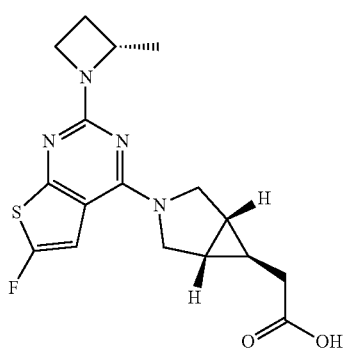
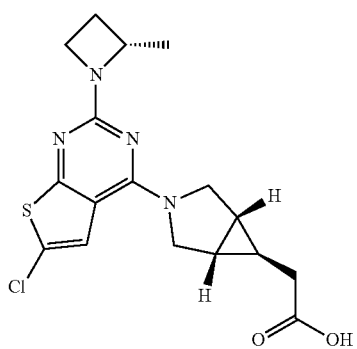
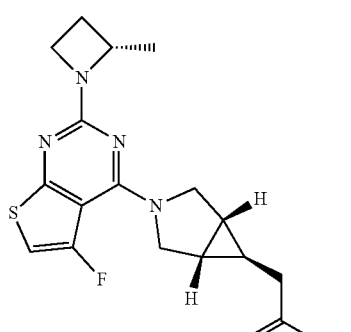
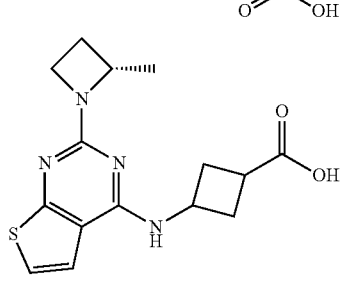
40
-continued
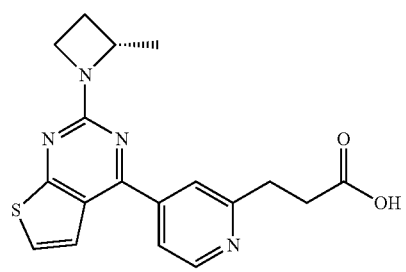
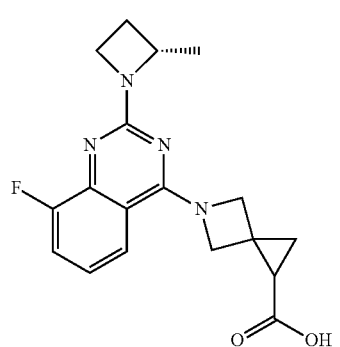
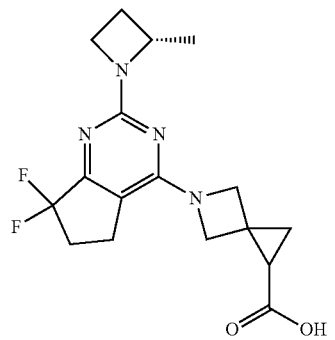
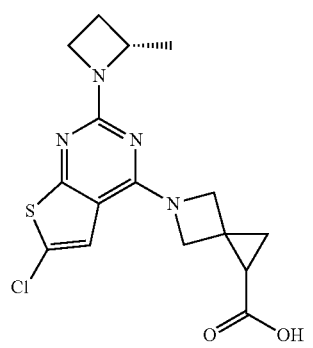
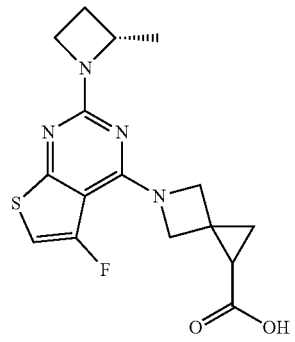

41
-continued
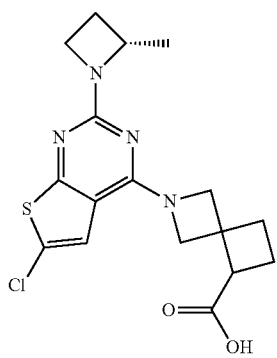
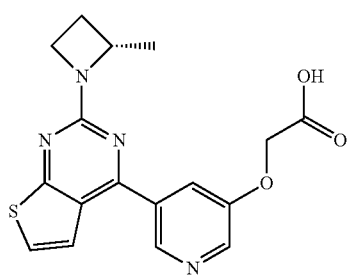
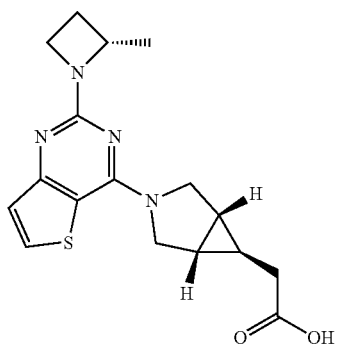
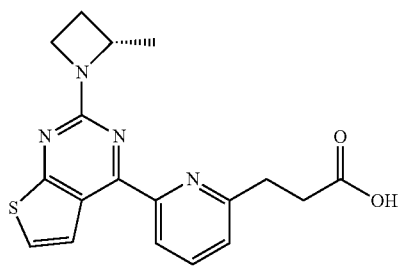
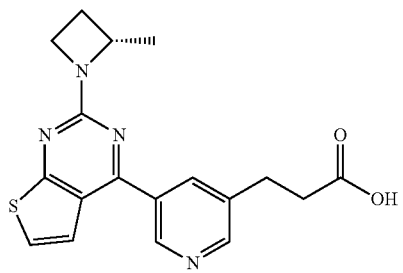
42
-continued
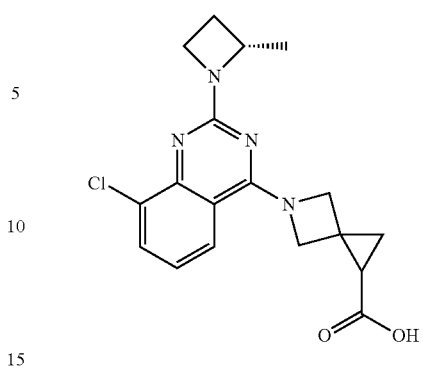
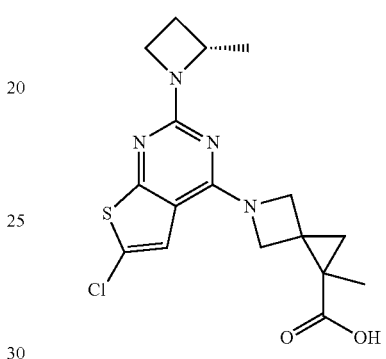
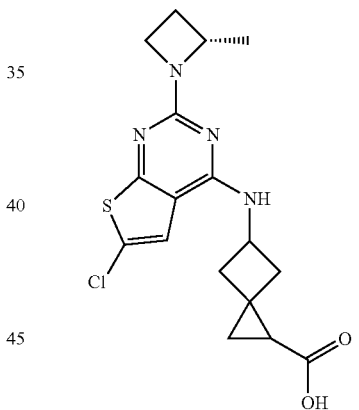
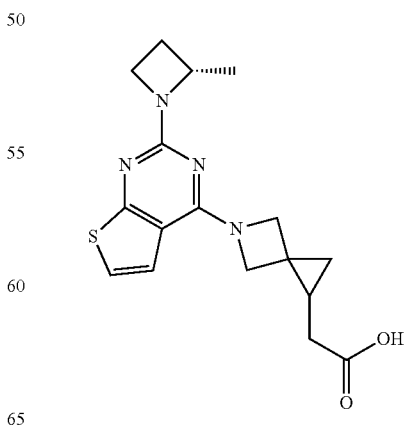

43
-continued
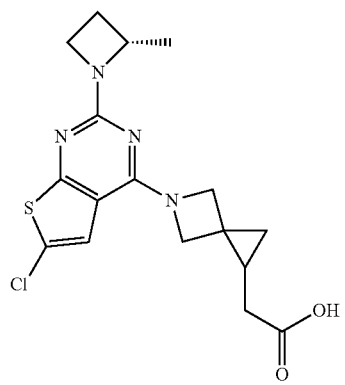
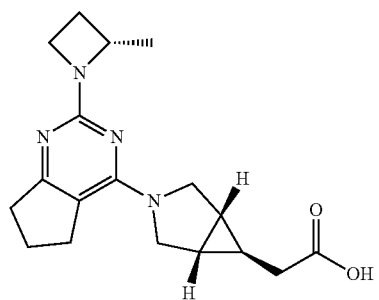
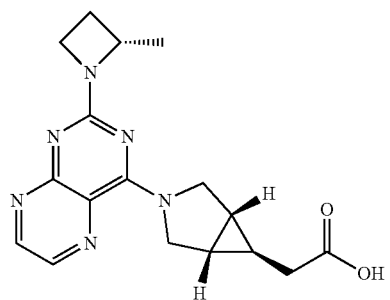
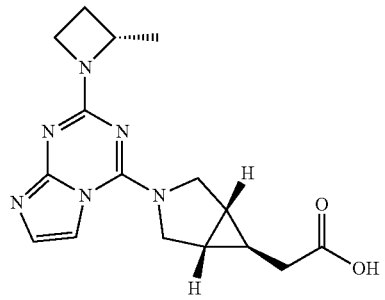
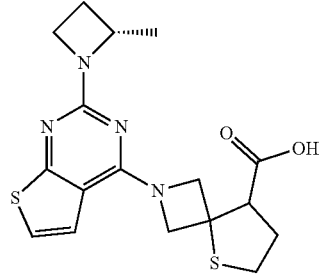
44
-continued
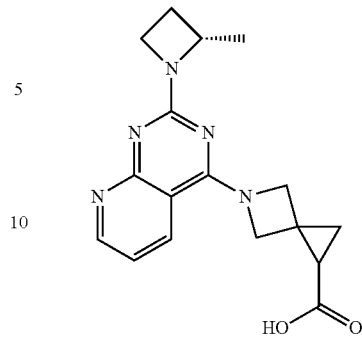
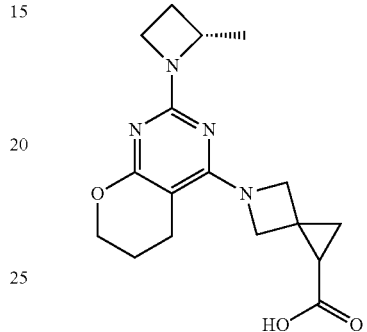
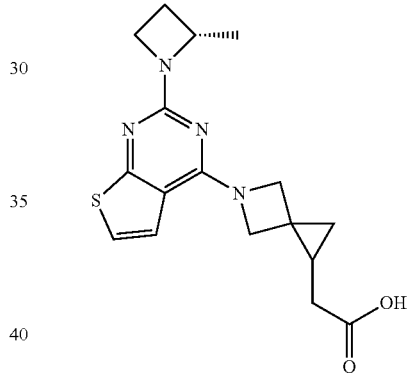
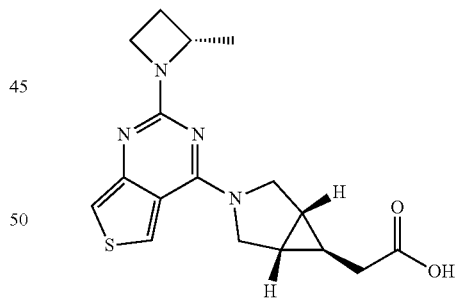
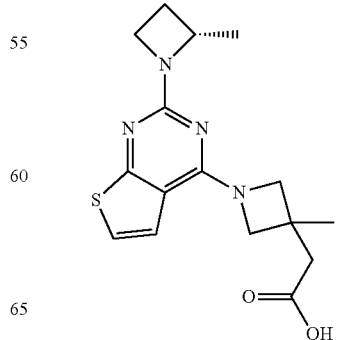

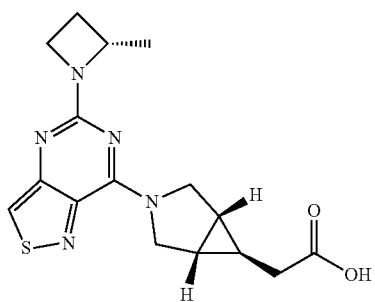
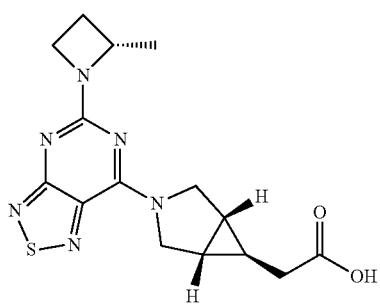
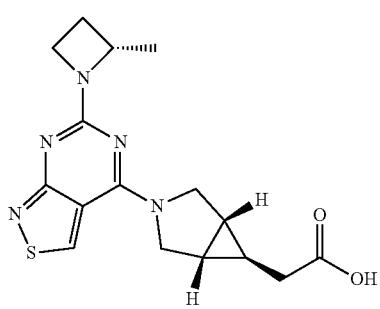
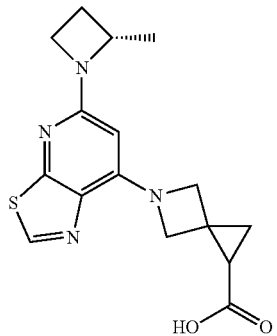
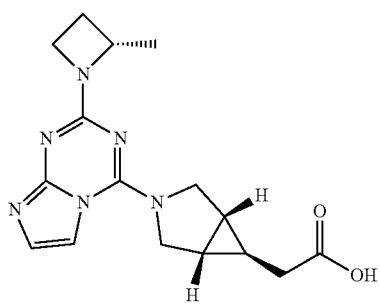
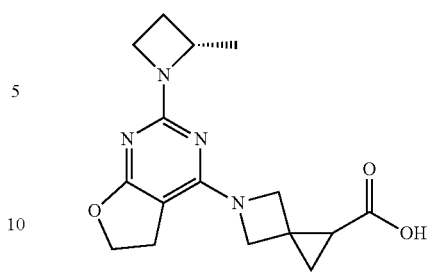
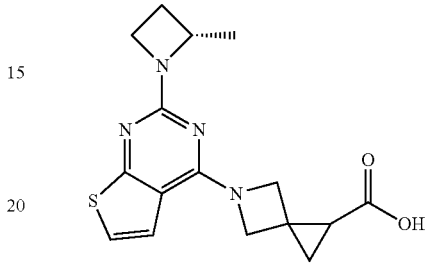
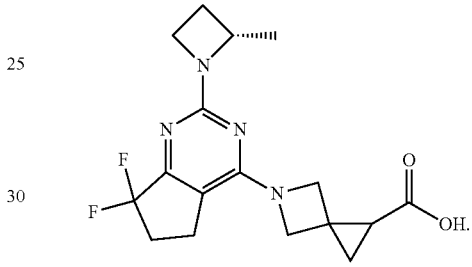
The present invention also provides the compound as described above, or a pharmaceutically acceptable salt thereof, selected from the group consisting of:
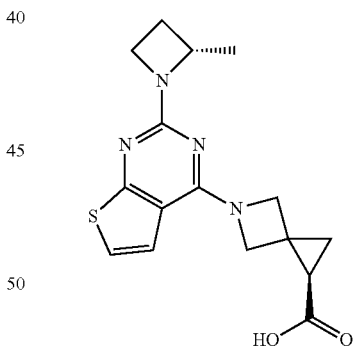
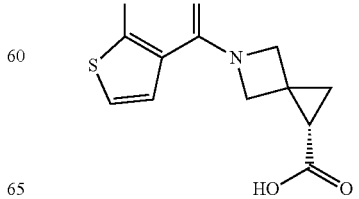

47
-continued

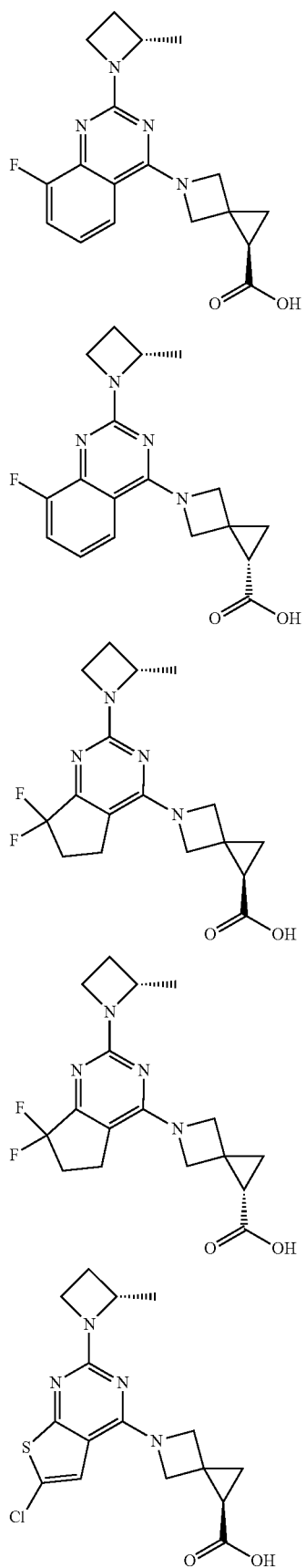

48
-continued

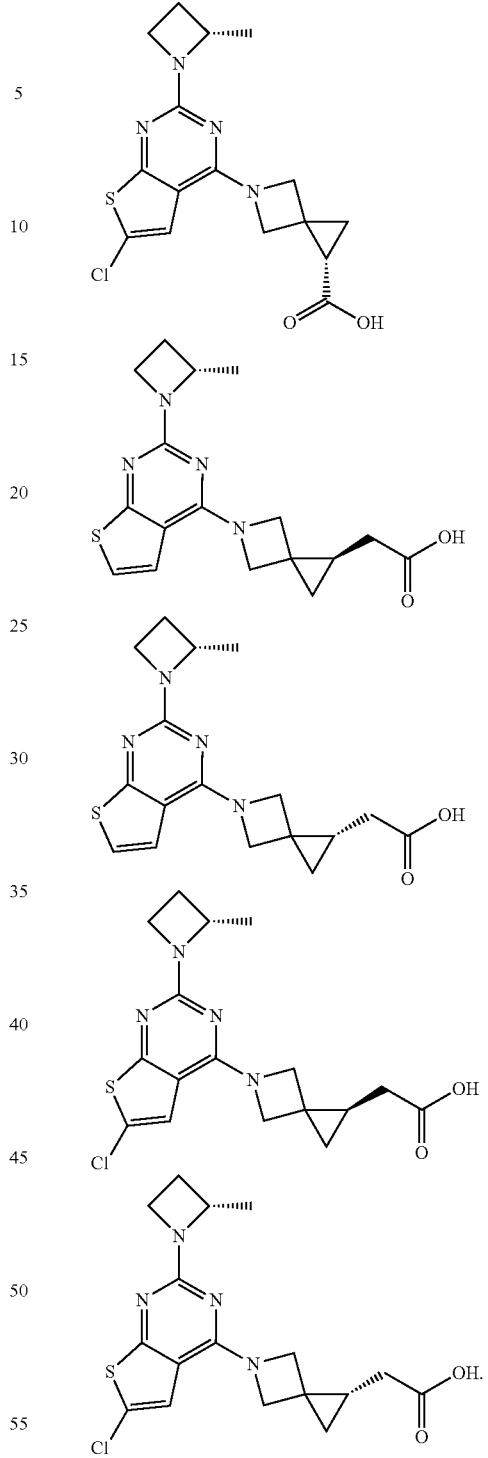

The present invention also provides a use of the compound as described above, or a pharmaceutically acceptable salt thereof, for the preparation of a therapeutic KHK inhibitor-related medicament.

In some embodiments of the present invention, the use described above is characterized in that the KHK inhibitor-related medicament is a medicament for the treatment of non-alcoholic fatty liver disease (NAFLD) and non-alcoholic steatohepatitis (NASH).

Technical Effect

As a novel KHK inhibitor, the compound of the present invention has strong inhibitory activity against human-sourced KHK enzyme, excellent metabolic stability in liver microsomes, high selectivity to hepatic tissue in rats and mice, and strong inhibitory effect on in vivo fructose metabolism.

DEFINITIONS AND DESCRIPTION

Unless otherwise specified, the following terms and phrases used herein are intended to have the following meanings. A specific term or phrase should not be considered indefinite or unclear without a specific definition, but should be understood in its ordinary meaning. When a trade name appears herein, it is intended to refer to its corresponding commercial product or its active ingredient.

As used herein, the term "pharmaceutically acceptable" refers to those compounds, materials, compositions, and/or dosage forms which are, within the scope of sound medical judgment, suitable for use in contact with the tissues of human beings and animals without excessive toxicity, irritation, allergic response, or other issues or complications, which is commensurate with a reasonable benefit/risk ratio.

The term "pharmaceutically acceptable salts" refers to salts of the compounds of the present invention, which is prepared from the compound having specific substituents found by the present invention with relatively non-toxic acids or bases. When the compounds of the present invention contain relatively acidic functional groups, base addition salts can be obtained by contacting such compounds with a sufficient amount of bases, either in a neat solution or in a suitable inert solvent. Pharmaceutically acceptable base addition salts include sodium, potassium, calcium, ammonium, organic amine or magnesium salts or similar salts. When the compounds of the present invention contain relatively basic functional groups, acid addition salts can be obtained by contacting such compounds with a sufficient amount of acids, either in a neat solution or in a suitable inert solvent. Examples of pharmaceutically acceptable acid addition salts include salts of inorganic acids including, for example, hydrochloric acid, hydrobromic acid, nitric acid, carbonic acid, bicarbonate, phosphoric acid, monohydrogen phosphate, dihydrogen phosphate, sulfuric acid, hydrogen sulfate, hydroiodic acid, phosphorous acid, and the like; and salts of organic acids including, for example, acetic acid, propionic acid, isobutyric acid, maleic acid, malonic acid, benzoic acid, succinic acid, suberic acid, fumaric acid, lactic acid, mandelic acid, phthalic acid, benzenesulfonic acid, p-toluenesulfonic acid, citric acid, tartaric acid and methanesulfonic acid and the like; and also salts of amino acids such as arginine and the like, and salts of organic acids such as glucuronic acid and the like. Certain specific compounds of the present invention contain both basic and acidic functional groups and thus can be converted into any base or acid addition salts.

The pharmaceutically acceptable salt of the present invention can be synthesized from a parent compound containing an acidic group or basic group by conventional chemical methods. Generally, such salts are prepared by a method comprising reacting these compounds in free acid or base form with a stoichiometric amount of an appropriate base or acid in water or an organic solvent or in a mixture of both.

Unless otherwise specified, the term "$C_{1-3}$ alkyl" is used to denote a saturated straight or branched chain hydrocarbon group consisting of 1 to 3 carbon atoms. Said $C_{1-3}$ alkyl includes $C_{1-2}$ and $C_{2-3}$ alkyl and the like; it can be monovalent (e.g. methyl), divalent (e.g. methylene), or polyvalent (e.g. methine). Examples of $C_{1-3}$ alkyl include, but are not limited to, methyl (Me), ethyl (Et), propyl (including n-propyl and isopropyl), and the like.

Unless otherwise specified, "$C_{3-6}$ cycloalkyl" denotes a saturated cyclic hydrocarbon group consisting of 3 to 6 carbon atoms, which is a monocyclic and bicyclic ring system, including $C_{3-5}$, $C_{4-5}$ and $C_{5-6}$ cycloalkyls and the like; it may be monovalent, divalent or polyvalent. Examples of $C_{3-6}$ cycloalkyl include, but are not limited to, cyclopropyl, cyclobutyl, cyclopentyl, cyclohexyl,

and the like.

Unless otherwise specified, "4-8 membered heterocycloalkyl" denotes a saturated cyclic group consisting of 4 to 8 ring atoms, including monocyclic, as well as spirocyclic, fused and bridged bicyclic or polycyclic ring systems. Unless otherwise specified, the ring optionally contains 1, 2 or 3 heteroatoms independently selected from the group consisting of O, S and N. The 4-7 membered ring includes 4-6 membered, 4-5 membered, 5-6 membered, 5-7 membered, 6-7 membered, and 7-8 membered rings, etc. The term "4-7 membered heterocycloalkyl" includes piperidinyl,

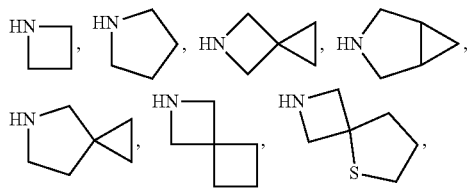

and the like, but does not include phenyl. The term "ring" also includes ring systems containing at least one ring, wherein each "ring" independently meets the above definition.

Unless otherwise specified, "4-7 membered heterocycloalkyl" denotes a saturated cyclic group consisting of 4 to 7 ring atoms, including monocyclic, as well as spirocyclic, fused and bridged bicyclic or polycyclic ring systems. Unless otherwise specified, the ring optionally contains 1, 2 or 3 heteroatoms independently selected from the group consisting of O, S and N. The 4-7 membered ring includes 4-6 membered, 4-5 membered, 5-6 membered, 5-7 membered and 6-7 membered rings and the like. The term "4-7 membered heterocycloalkyl" includes piperidinyl,

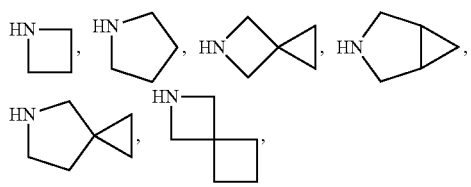

and the like, but does not include phenyl. The term "ring" also includes ring systems containing at least one ring, wherein each "ring" independently meets the above definition.

Unless otherwise specified, the terms "5-6 membered heteroaromatic ring" and "5-6 membered heteroaryl" can be used interchangeably herein. The term "5-6 membered heteroaryl" denotes a monocyclic group with a conjugated π-electron system consisting of 5 to 6 ring atoms, wherein 1, 2, 3 or 4 of the ring atoms are heteroatoms independently selected from the group consisting of O, S and N, and the remainder are carbon atoms, and wherein the nitrogen atom is optionally quaternized, and the nitrogen and sulfur heteroatoms may optionally be oxidized (i.e. NO and $S(O)_p$, p being 1 or 2). The 5-6 membered heteroaryl may be attached to the remainder of the molecule through a heteroatom or a carbon atom. The 5-6 membered heteroaryl group includes 5- and 6-membered heteroaryl groups. Examples of 5-6 membered heteroaryl include, but are not limited to, pyrrolyl (including N-pyrrolyl, 2-pyrrolyl and 3-pyrrolyl, etc.), pyrazolyl (including 2-pyrazolyl and 3-pyrazolyl, etc.), imidazolyl (including N-imidazolyl, 2-imidazolyl, 4-imidazolyl and 5-imidazolyl, etc.), oxazolyl (including 2-oxazolyl, 4-oxazolyl and 5-oxazolyl, etc.), triazolyl (1H-1,2,3-triazolyl, 2H-1,2,3-triazolyl, 1H-1,2,4-triazolyl and 4H-1,2,4-triazolyl, etc.), tetrazolyl, isoxazolyl (3-isoxazolyl, 4-isoxazolyl and 5-isoxazolyl, etc.), thiazolyl (including 2-thiazolyl, 4-thiazolyl and 5-thiazolyl, etc.), furanyl (including 2-furanyl and 3-furanyl, etc.), thienyl (including 2-thienyl and 3-thienyl, etc.), pyridinyl (including 2-pyridinyl, 3-pyridinyl and 4-pyridinyl, etc.), pyrazinyl or pyrimidinyl (including 2-pyrimidinyl and 4-pyrimidinyl, etc.).

Unless otherwise specified, the terms "halo" or "halogen", by itself or as part of another substituent, means a fluorine, chlorine, bromine, or iodine atom.

Unless otherwise indicated, the term "isomer" is intended to include geometric isomers, cis-trans isomers, stereoisomers, enantiomers, optical isomers, diastereomers, and tautomers.

The compounds of the present invention may exist in specific geometric or stereoisomeric forms. The present invention contemplates all such compounds, including cis- and trans-isomers, (−)- and (+)-enantiomers, (R)- and (S)-enantiomers, diastereomers, (D)-isomers, (L)-isomers, and racemic and other mixtures thereof, such as enantiomerically or diastereomerically enriched mixtures, all these mixtures being within the scope of the present invention. Additional asymmetric carbon atoms may be present in substituents such as alkyl groups. All these isomers and mixtures thereof are included within the scope of the present invention.

Unless otherwise indicated, the term "enantiomer" or "optical isomer" refers to stereoisomers that are mirror images of one another.

Unless otherwise indicated, the term "cis-trans isomer" or "geometric isomer" results from the inability of a double bond, or a single bond of a ring-forming carbon atom to rotate freely.

Unless otherwise indicated, the term "diastereomers" refer to stereoisomers in which molecules have two or more chiral centers and are not mirror image of each other.

Unless otherwise indicated, "(+)" means dextrorotatory, "(−)" means levorotatory, and "(±)" means racemic.

Unless otherwise indicated, a wedge-shaped solid bond ( ) and a wedge-shaped dashed bond ( ) represent the absolute configuration of a stereocenter; a straight solid bond ( ) and a straight dashed bond ( ) represent the absolute configuration of a stereocenter, but cannot be particularly determined to be whether a wedge-shaped solid-line bond ( ) or a wedge-shaped dashed-line bond ( ) a wavy line ( ) represents a wedge-shaped solid bond ( ) or a wedge-shaped dashed bond ( ), or the wavy line ( ) represents a straight solid bond ( ) or a straight dashed bond ( ).

Optically active (R)- and (S)-isomers, as well as D and L isomers, can be prepared by chiral synthesis or chiral reagents or other conventional techniques. If an enantiomer of a compound of the present invention is desired, it may be prepared by asymmetric synthesis or by derivatization with a chiral auxiliary, where the resulting diastereomeric mixture is separated and the auxiliary group is cleaved to provide the pure desired enantiomer. Alternatively, where the molecule contains a basic functional group such as an amino group or an acidic functional group such as a carboxy group, a diastereomeric salts are formed with an appropriate optically active acid or base, followed by resolution of the diastereomers by conventional methods well known in the art and subsequent recovery of the pure enantiomers. In addition, separation of enantiomers and diastereomers is usually accomplished by using chromatography which employs chiral stationary phases, optionally in combination with chemical derivatization (e.g. generation of carbamates from amines).

The compounds of the present invention may contain unnatural proportions of atomic isotopes at one or more of the atoms that constitute the compounds. For example, the compounds may be labeled with radioactive isotopes, such as tritium ($^3$H), iodine-125 ($^{125}$I) or C-14 ($^{14}$C). For another example, a deuterated drug can be formed by replacing hydrogen with deuterium. The bond formed by deuterium and carbon is stronger than the bond formed by ordinary hydrogen and carbon. The deuterated drug has the advantages of reduced toxic side effects, increased drug stability, enhanced therapeutic efficacy, and prolonged biological half-life of the drug, compared with an undeuterated drug. All isotopic variations of the compounds of the present invention, whether radioactive or not, are intended to be encompassed within the scope of the present invention.

The term "optional" or "optionally" means that the subsequently described event or circumstance may, but not necessarily occur, and that the description includes instances where said event or circumstance occurs and instances where said event or circumstance does not occur.

The term "substituted" means that any one or more hydrogen atoms on the designated atom are replaced substituted by substituents which may include deuterium and hydrogen variants, provided that the valency of the designated atom is normal and that the substituted compound is stable. When a substituent is oxygen (i.e. =O), it means that two hydrogen atoms are substituted. Oxygen substitution does not occur on aromatic groups. The term "optionally substituted" means that it may or may not be substituted and, unless otherwise specified, the type and number of substituents may be arbitrary where they can be achieved in chemistry.

When any variable (e.g. R) occurs more than one time in the constitution or structure of a compound, its definition on each occurrence is independent. Therefore, for example, if a group is substituted with 0-2 R, then said group may optionally be substituted with up to two R, and R in each instance has independent options. Also, combinations of substituents and/or variables thereof are permissible only if such combinations result in stable compounds.

When the number of a linking group is zero, such as —(CRR)$_0$—, it means that the linking group is a single bond.

When the number of a substituent is zero, it means that the substituent is absent. For example, -A-(R)$_0$ means that the structure is actually -A.

When a substituent is vacant, it means that the substituent is absent. For example, when X in A-X is vacant, it means that the structure is actually A.

When one of the variables is selected from a single bond, it means that the two groups to which it is attached are directly attached. For example, when L in A-L-Z represents a single bond, it means that the structure is actually A-Z.

When a bond to a substituent can be cross-linked to two or more atoms in a ring, such substituent can be bonded to any atom in the ring. For example, the structural unit

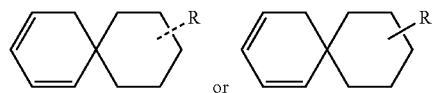

means that the substituent R may be substituted at any position in the cyclohexyl or cyclohexadiene. When it is not indicated through which atom the listed substituent is attached to the substituted group, such substituent can be bonded through any of its atoms. For example, a pyridyl group as a substituent can be attached to the substituted group through any of the carbon atoms in the pyridine ring.

When the listed linking group does not indicate the linking direction, the linking direction is arbitrary. For example, the linking group L in

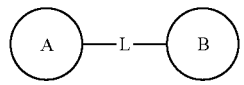

is -M-W—, then the -M-W— can connect ring A and ring B in the same direction as the reading order from left to right to form

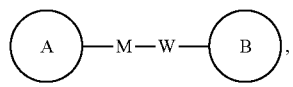

and can also connect ring A and ring B in the opposite direction to the reading order from left to right to form

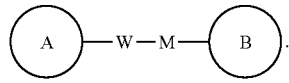

Combinations of said linking groups, substituents and/or variants thereof are permissible only if such combinations result in stable compounds.

Unless otherwise specified, when a certain group has one or more attachable positions, any one or more of the positions of the group can be attached to other groups by chemical bonds. When a chemical bond is attached in such a way that it is not definitely positioned and there is a H atom at an attachable position, then when a chemical bond is attached, the number of H atoms at that position will correspondingly decrease as a function of the number of the attached chemical bonds so as to become a group of corresponding valency. The chemical bond linking the position to another group can be represented by a straight solid bond

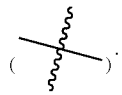

), a straight dashed bond ( ), or a wavy line

For example, a straight solid bond in —OCH$_3$ indicates attachment to another group through the oxygen atom in the group; the straight dashed bonds in

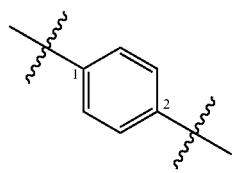 [SMILES: *c1ccc(*)cc1]

indicate that the two ends of the nitrogen atom in this group are attached to other groups; the wavy lines in

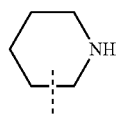

indicate that 1- and 2-position carbon atoms in the phenyl group are attached to other groups;

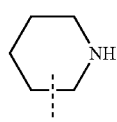

indicates that any attachable position on the piperidinyl can be attached to other groups by one chemical bond, including at least four patterns of attachment

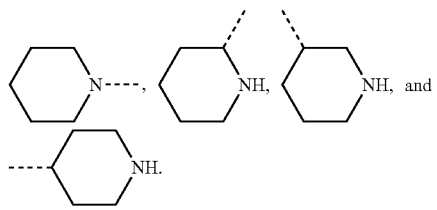

Even though an H atom is depicted on the —N— group,

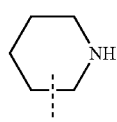

still includes the

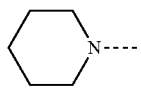

group in such a linking pattern, that is, when one chemical bond is attached, the H at that position is reduced by one to become the corresponding monovalent piperidinyl.

Unless otherwise specified, the number of ring atoms is generally defined as the number of ring members, e.g., a "5-7 membered ring" means a "ring" having 5-7 atoms arranged in the ring.

The term "protecting group" includes, but is not limited to, an "amino protecting group", a "hydroxy protecting group" or a "sulfydryl protecting group". The term "amino protecting group" refers to a protecting group suitable for preventing side reactions at the nitrogen position of an amino group. Representative amino protecting groups include, but are not limited to: formyl; acyl, such as alkanoyl (e.g., acetyl, trichloroacetyl or trifluoroacetyl); alkoxycarbonyl such as tert-butoxycarbonyl (Boc); arylmethoxycarbonyl such as carbobenzoxy (Cbz) and 9-fluorenylmethoxycarbonyl (Fmoc); arylmethyl such as benzyl (Bn), trityl (Tr), 1,1-bis-(4'-methoxyphenyl)methyl; silyl such as trimethylsilyl (TMS) and tert-butyldimethylsilyl (TBS) and the like. The term "hydroxyl protecting group" refers to a protecting group suitable for preventing side reactions at a hydroxyl group. Representative hydroxyl protecting groups include, but are not limited to: alkyl such as methyl, ethyl, and t-butyl; acyl such as alkanoyl (e.g., acetyl); arylmethyl such as benzyl (Bn), p-methoxybenzyl (PMB), 9-fluorenylmethyl (Fm) and diphenylmethyl (benzhydryl, DPM); silyl such as trimethylsilyl (TMS) and tert-butyldimethylsilyl (TBS) and the like.

The compounds of the present invention can be prepared by a variety of synthetic methods well known to those skilled in the art, including the specific embodiments set forth below, the embodiments formed by the combination with other chemical synthetic methods, and equivalent alternative embodiments well known to those skilled in the art. Preferred embodiments include, but are not limited to, the examples of the present invention.

The structure of the compound of the present invention can be confirmed by conventional methods well known to those skilled in the art. If the present invention relates to the absolute configuration of the compound, the absolute configuration can be confirmed by conventional technical means in the art. For example, the absolute configuration can be confirmed via single crystal X-ray diffraction (SXRD), by collecting the diffraction intensity data of the cultivated single crystal with a Bruker D8 venture diffractometer, with a light source of CuKα radiation and a scanning mode: (φ/ω) scanning, followed by analyzing the crystal structure using the direct method (Shelxs97) after collecting relevant data.

The solvents used in the present invention are commercially available.

The present invention uses the following abbreviations: aq represents water; HATU represents O-(7-azabenzotriazole-1-yl)-N,N,N,N-tetramethyluronium hexafluorophosphate; eq represents equivalent and equal quantity; DCM represents dichloromethane; PE represents petroleum ether; DMSO represents dimethyl sulfoxide; EtOAc represents ethyl acetate; EtOH represents ethanol; MeOH represents methanol; Cbz represents benzyloxycarbonyl, an amine protecting group; Boc represents tert-butoxycarbonyl, an amine protecting group; r.t. represents room temperature; min represents minute; O/N represents overnight; THF represents tetrahydrofuran; Boc$_2$O represents di-tert-butyl dicarbonate; TFA represents trifluoroacetic acid; DIPEA represents diisopropylethyl amine; iPrOH represents 2-propanol; DMA represents N,N-dimethylformamide; DIBALH represents a solution of diisobutylaluminum hydride in tetrahydrofuran; FA represents formic acid; ACN represents acetonitrile; NCS represents N-chlorosuccinimide; mp represents melting point; Prep-HPLC represents preparative high performance liquid chromatography; and TLC represents thin layer chromatography.

Compounds are named according to conventional nomenclature in the art or using ChemDraw® software, and the commercially available compounds adopt the names in supplier's catalogues. Compound B-8 was synthesized according to the method reported in the literature (Org. Lett., Vol. 13, No. 4, 2011), and compound G-1 was obtained according to the method reported in the patent (WO2012131588).

EMBODIMENTS

The present invention will be described in more detail by way of examples which are not meant to impose any disadvantageous limitation to the invention. While the invention has been described herein in detail and with reference to specific embodiments thereof, it will be apparent to one skilled in the art that various changes and modifications can be made to the specific embodiments of the invention, without departing from the spirit and scope of the invention.

Intermediate A-1

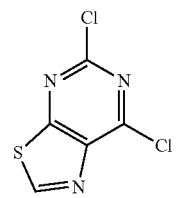

A-1

Synthetic Scheme:

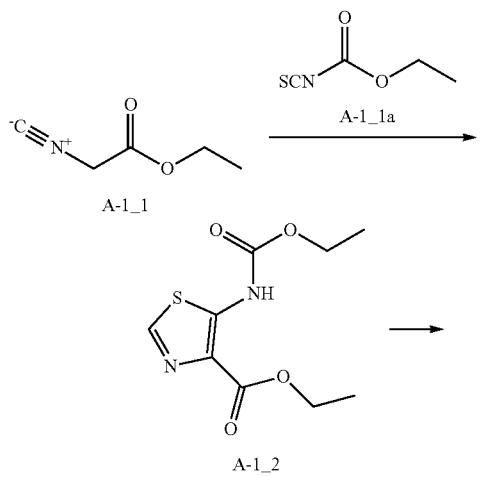

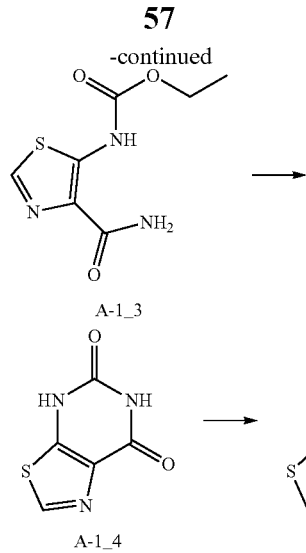

Step 1: Synthesis of Compound A-1_2

Compound A-1_1 (600.0 mg, 5.30 mmol) was added to a solution of potassium tert-butoxide (655.19 mg, 5.84 mmol) in tetrahydrofuran (15.0 mL) at -40° C., then A-1_1a (730.47 mg, 5.57 mmol) was added dropwise slowly, and the reaction was stirred at 0° C. for 1.5 h. After completion of the reaction, 3 mL acetic acid was slowly added at 0° C., and stirred for 20 min. 80 mL water was added, and the mixed liquid was extracted twice with EtOAc (50 mL). The organic phase was dried and then rotary-evaporated to dryness to remove the solvent, obtaining a crude product. The crude product was purified by automated column chromatography (100-200 mesh, eluant: PE:EtOAc=100:1-100:50) to afford Compound A-1_2. $^1$H NMR (400 MHz, CDCl$_3$) δ=10.07 (br s, 1H), 8.31 (s, 1H), 4.46 (q, J=7.2 Hz, 2H), 4.33 (q, J=7.2 Hz, 2H), 1.46 (t, J=7.2 Hz, 3H), 1.36 (t, J=7.2 Hz, 3H).

Step 2: Synthesis of Compound A-1_3

Compound A-1_2 (826.0 mg, 3.38 mmol) was added to EtOH (0.8 mL) and stirred at 40° C. for 20 min at which time the solid was completely dissolved. H$_2$O (2.0 mL) was added, and stirred for 10 min. Then, 30% aqueous ammonia (5.92 g, 50.63 mmol) was added, heated to 80° C. and stirred for 2 h, and filtered. The filter cake was washed with ethanol (1×5 mL) and vacuum-dried to afford Compound A-1_3 which was used directly in the next step. $^1$H NMR (400 MHz, DMSO-d$_6$) δ=11.00-10.33 (m, 1H), 8.58 (s, 1H), 7.99-7.66 (m, 2H), 4.23 (q, J=7.2 Hz, 2H), 1.26 (t, J=7.2 Hz, 3H).

Step 3: Synthesis of Compound A-1_4

Compound A-1_3 (400.0 mg, 1.86 mmol) was dissolved in N-methylpyrrolidinone (5.0 mL), potassium tert-butoxide (625.63 mg, 5.58 mmol) was added, and the mixture was stirred at 110° C. for 1 h. The reaction system was a light pink suspension. After completion of the reaction, 4 mL acetic acid and 20 mL water were added, stirred at room temperature for 1 h, and filtered. The filter cake was dried to afford Compound A-1_4. $^1$H NMR (400 MHz, DMSO-d$_6$) δ=12.64-11.52 (m, 1H), 11.27 (br s, 1H), 8.70 (s, 1H).

Step 4: Synthesis of Compound A-1

Compound A-1_4 (229.0 mg, 1.35 mmol) was added to phosphorus oxychloride (4.3 mL), DIPEA (2 g, 15.47 mmol) was added, and the reaction was stirred at 110° C. for 30 h. After completion of the reaction, the reaction liquid was cooled to room temperature, and rotary-evaporated to remove the solvent, obtaining a crude product. The crude product was purified by automated column chromatography (100-200 mesh, eluant: PE:EtOAc=100:1-100:50) to afford Compound A-1.

Intermediate A-8

Synthetic Scheme:

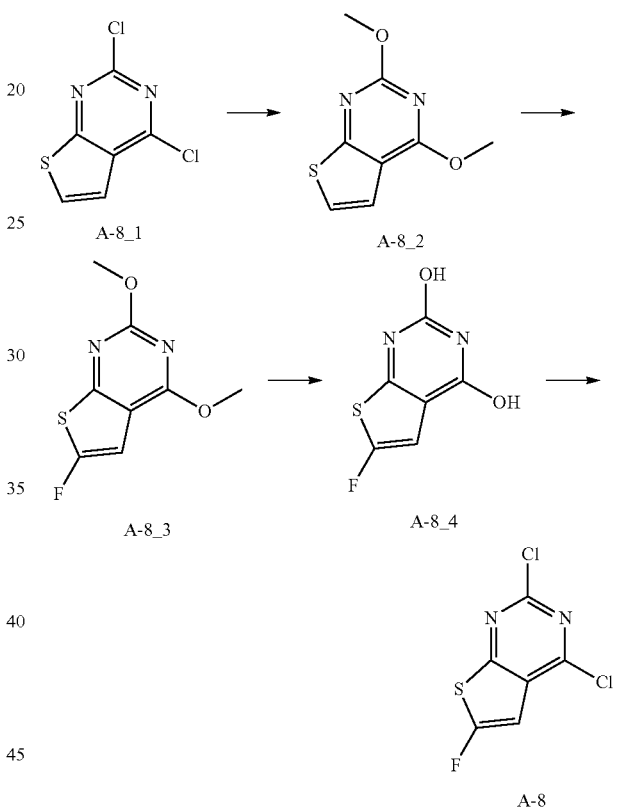

Step 1: Synthesis of Compound A-8_2

To a solution of Compound A-8_1 (2.05 g, 10.00 mmol) in MeOH (50 mL) was added sodium methoxide (3.24 g, 59.98 mmol), and the mixture was stirred at 0° C. for 12 h. TLC (PE:EtOAc=3:1) showed that the reaction was complete, LCMS showed that the reaction was relatively clean, and the target product MS was detected. The reaction liquid was directly rotary-evaporated to dryness. To the residue 100 mL of dichloromethane was added, slurried at room temperature for half an hour, and filtered. The filter cake was washed with dichloromethane (20 mL×2). The filtrate was rotary-evaporated to dryness to afford A-8_2.

Step 2: Synthesis of Compound A-8_3

To a solution of Compound A-8_2 (1.0 g, 5.10 mmol) in THF (10 mL) was added n-butyl lithium (2.5 M, 3.06 mL)

dropwise at −70° C. under N₂ protection, the mixture was stirred for 1 h, then a solution of N-fluorobenzenesulfonimide (NFSI) (3.21 g, 10.19 mmol) in THF (30 mL) was added dropwise, the mixture was further stirred for 15 min, then warmed to 25° C. and stirred for 30 min. TLC (PE:EtOAc=3:1) showed that the reaction was complete, and the target product MS was detected by LCMS. The reaction liquid was carefully quenched with water (50 mL). After extraction with ethyl acetate (30 mL×3), the organic layers were combined and rotary-evaporated to dryness to afford a crude product. The crude product was purified by a flash column (ISCO®; 24 g SepaFlash® silica column, eluant: 0-18% EtOAc/PE, flow rate: 30 mL/min) to afford Compound A-8_3.

Step 3: Synthesis of Compound A-8_4

To a solution of Compound A-8_3 (600 mg, 2.60 mmol) in THF (3 mL) was added concentrated hydrochloric acid (12 M, 10 mL), and the mixture was stirred at 90° C. for 12 h. LCMS showed that the reaction was complete and the target product MS was detected. The reaction liquid was filtered to collect the precipitated solid. The filter cake was washed with a small amount of ethyl acetate (0.5 mL×2), and the water was drained as much as possible. Then, the solid was suspended in 50 mL ethyl acetate and rotary-evaporated to dryness to afford Compound A-8_4. ¹H NMR (400 MHz, DMSO-d6) δ=11.86 (s, 1H), 11.27 (s, 1H), 11.32-11.23 (m, 1H), 7.20 (s, 1H).

Step 4: Synthesis of Compound A-8

To a suspension of Compound A-8_4 (400 mg, 1.97 mmol) in POCl₃ (16.50 g, 107.61 mmol) was added DIPEA (765.44 mg, 5.92 mmol) dropwise, and the mixture turned into reddish brown clear liquid. The mixture was stirred at 110° C. for 12 h. TLC (PE:EtOAc=3:1) showed that the reaction was complete. The reaction liquid was cooled to room temperature, and then concentrated under reduced pressure to remove excess POCl₃. The residue was dissolved with ethyl acetate (50 mL), and washed with 50 mL water. The aqueous phase was extracted with ethyl acetate (20 mL×2). The organic phases were combined, washed with saturated brine (10 mL), and rotary-evaporated to dryness to afford crude product A-8 which was directly used in the next step.

Intermediate A-9

Synthetic Scheme:

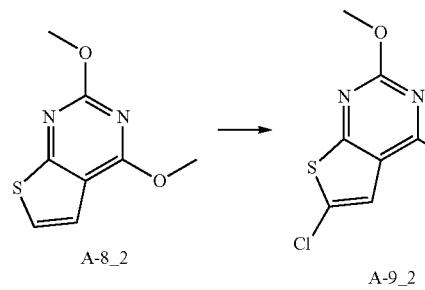

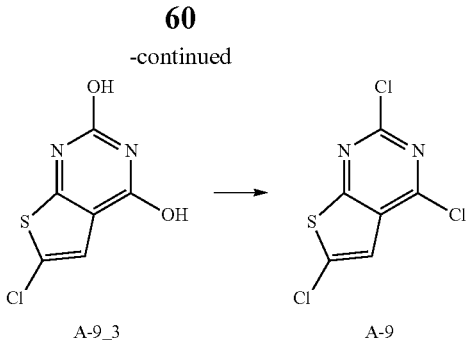

Step 1: Synthesis of Compound A-9_2

To a solution of Compound A-8_2 (1 g, 5.10 mmol) in THF (15 mL) was added NCS (1.02 g, 7.64 mmol), and the mixture was reacted under stirring at 80° C. for 16 h. TLC (PE:EtOAc=3:1) showed incomplete consumption of the starting materials with about half left, and LCMS also showed half of the starting materials left. Additional NCS (0.5 g, 0.75 eq) was added, and the mixture was further reacted under stirring at 80° C. for 6 h. TLC (PE:EtOAc=3:1) showed that the reaction was almost complete. The reaction liquid was directly rotary-evaporated to dryness. The crude product was purified by a flash column (ISCO®; 24 g SepaFlash® silica column, eluant: 0-18% EtOAc/PE, flow rate: 20 mL/min) to afford Compound A-9_2. ¹H NMR (400 MHz, CDCl₃) δ=7.11 (s, 1H), 4.11 (s, 3H), 4.06 (s, 3H).

For the remaining two synthetic procedures, reference is made to the procedures of Steps 3 and 4 for Intermediate A-8, and the obtained crude Intermediate A-9 can be directly used in the next step without further purification.

Intermediate A-10

Synthetic Scheme:

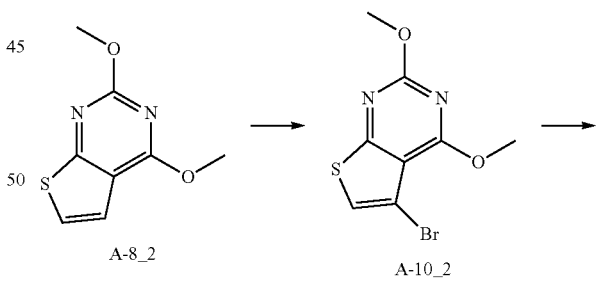

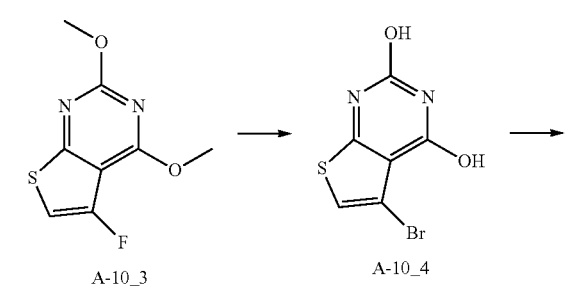

-continued

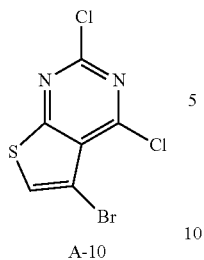

A-10

Step 1: Synthesis of Compound A-10_2

To a solution of Compound A-8_2 (1 g, 5.10 mmol) in THF (15 mL) was added NBS (1.36 g, 7.64 mmol), and the mixture was reacted under stirring at 80° C. for 12 h. The reaction liquid was rotary-evaporated to dryness. The crude product was purified by a flash column (ISCO®; 40 g SepaFlash® silica column, eluant: 0-18% EtOAc/PE, flow rate: 30 mL/min) to afford Compound A-10_2. $^1$H NMR (400 MHz, CDCl$_3$) δ=7.19 (d, J=0.8 Hz, 1H), 4.02 (s, 3H), 3.96 (s, 3H).

Step 2: Synthesis of Compound A-10_3

To a solution of Compound A-10_2 (0.2 g, 726.95 μmol) in THF (2.5 mL) was added n-butyl lithium (2.5 M, 450 μL) dropwise at −70° C. under N$_2$ protection. After stirring at −70° C. for 1 h, a solution of N-fluorobenzenesulfonimide (NFSI) (460 mg, 1.46 mmol) in THF (5 mL) was added dropwise, the mixture was further reacted under stirring at −70° C. for 15 min, then warmed to 25° C. and stirred for 30 min. TLC (PE:EtOAc=3:1) showed the reaction was complete. The reaction liquid was carefully quenched with water (50 mL), and extracted with ethyl acetate (30 mL×3). The organic phases were combined and rotary-evaporated to dryness to afford a crude product. The crude product was purified by a flash column (ISCO®; 12 g SepaFlash® silica column, eluant: 0-18% EtOAc/PE, flow rate: 20 mL/min) to afford Compound A-10_3. $^1$H NMR (400 MHz, CDCl$_3$) δ=6.53 (br s, 1H), 4.01 (br s, 3H), 3.95 (br s, 3H).

For the remaining two synthetic procedures, reference is made to the procedures of Steps 3 and 4 for Intermediate A-8, and the obtained crude Intermediate A-10 can be directly used in the next step without further purification.

Intermediate A-11

Synthetic Scheme:

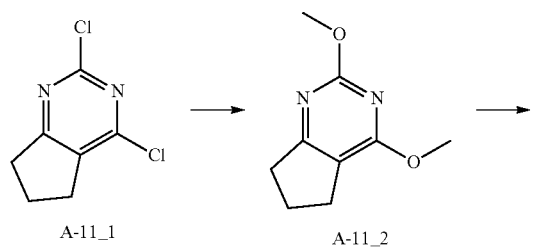

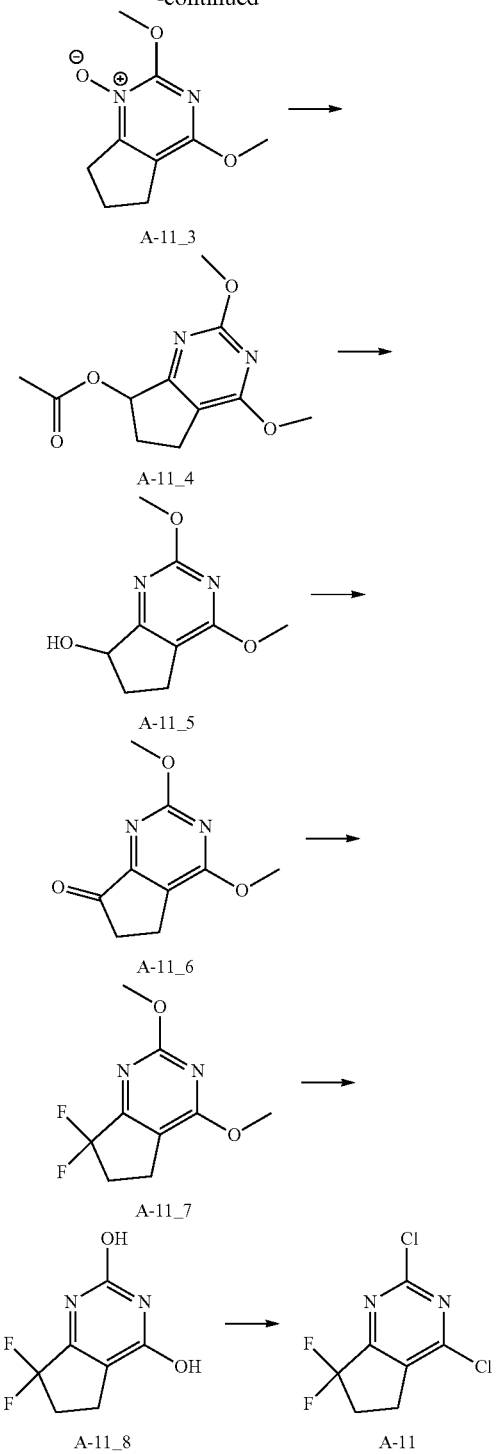

Step 1: Synthesis of Compound A-11_2

A-11_1 (50 g, 264.49 mmol), NaOMe (100 g, 1.85 mol) were dissolved in MeOH (500 mL), and the reaction was stirred at 80° C. for 12 h under nitrogen protection. LC-MS showed disappearance of starting material signal and generation of product signal, and TLC (petroleum ether:ethyl acetate=3:1) showed formation of a new spot. The reaction liquid was directly rotary-evaporated to dryness, added with water (500 mL), and extracted with EtOAc (400 mL). The organic phase was rotary-evaporated to dryness to afford A-11_2.

Step 2: Synthesis of Compound A-11_3

To a 3000 mL three-necked flask, A-11_2 (90 g, 499.44 mmol) and CHCl$_3$ (1000 mL) were added, followed by m-chloroperoxybenzoic acid (287.23 g, 1.41 mmol, 85% purity), and the reaction was stirred at 30° C. for 12 h under nitrogen protection. LCMS showed that the starting material signal did not disappear and a product signal was generated, and TLC (dichloromethane:methanol=10:1) showed formation of a new spot. The reaction liquid was filtered, and the filter cake was washed with dichloromethane (500 mL). The filtrate was slowly added to saturated sodium sulfite solution (500 g sodium sulfite was prepared into 2.5 L solution), stirred for one hour to quench the oxidant. The layers were separated, and the aqueous phase was washed with 1000 mL dichloromethane. The organic phases were combined, rotary-evaporated to dryness, added with 1000 mL methyl tert-butyl ether, and washed with saturated sodium carbonate solution (500 mL×3). The aqueous phases were combined, and washed with 500 mL methyl tert-butyl ether. The (sodium carbonate solution) aqueous phases were combined, and extracted with chloroform (2 L×4). The chloroform organic phases were combined, and rotary-evaporated to dryness to afford A-11_3. $^1$H NMR (400 MHz, CDCl$_3$) δ=4.24-4.11 (m, 3H), 4.06-3.95 (m, 3H), 3.20 (t, J=7.8 Hz, 2H), 2.86 (t, J=7.7 Hz, 2H), 2.28-2.15 (m, 2H).

Step 3: Synthesis of Compound A-11_4

To a 1000 mL one-neck flask, A-11_3 (59 g, 300.71 mmol) was added, and acetic anhydride (250 mL) was added, and the reaction was stirred at 80° C. for 5 h under nitrogen protection. LCMS showed disappearance of starting material signal and generation of product signal, and TLC (petroleum ether:ethyl acetate=3:1) showed formation of a new spot. The reaction liquid was slowly added to water (500 mL) and extracted with ethyl acetate (300 mL×2). The organic phase was directly rotary-evaporated to dryness to afford a crude product. The crude product was purified by a flash silica column (ISCO cake, 330 g SepaFlash silica column, eluant: 0-10% EtOAc/PE, flow rate: 100 mL/min) to afford A-11_4. $^1$H NMR (400 MHz, CDCl$_3$) δ=6.12-5.90 (m, 1H), 4.02 (d, J=7.0 Hz, 6H), 2.95-2.82 (m, 1H), 2.78-2.57 (m, 2H), 2.14 (s, 3H), 2.08-1.96 (m, 1H).

Step 4: Synthesis of Compound A-11_5

To a 1000 mL single-neck flask, A-11_4 (40 g, 167.9 mmol) and THF (400 mL)/H$_2$O (100 mL) were added, followed by LiOH·H$_2$O (14 g, 335.8 mmol), and the reaction was stirred at 20° C. for 12 h under nitrogen protection. LCMS showed disappearance of starting material signal and generation of product signal. The reaction liquid was directly rotary-evaporated to dryness. The crude product was purified by a flash silica column (ISCO 330 g SepaFlash silica column, eluant: 0-20% EtOAc/PE, flow 35 mL/min) to afford A-11_5. $^1$H NMR (400 MHz, CDCl$_3$) δ=5.10 (t, J=7.0 Hz, 1H), 4.10-3.96 (m, 6H), 2.88 (ddd, J=2.8, 8.9, 15.4 Hz, 1H), 2.70-2.48 (m, 2H), 2.12-1.94 (m, 1H).

Step 5: Synthesis of Compound A-11_6

To a 5 L three-necked flask, A-11_5 (150 g, 764.52 mmol) and DCM (1500 mL) were added, followed by Dess-Martin periodinane (660 g, 1.56 mol), and the reaction was stirred at 20° C. for 12 h under nitrogen protection. LCMS showed disappearance of starting material signal and generation of product signal, and TLC (petroleum ether:ethyl acetate=3:1) showed formation of a new spot. The reaction liquid was filtered directly, and the filter cake was washed with ethyl acetate (200 mL). The filtrate was directly rotary-evaporated to dryness. Purification by a flash silica column (ISCO cake, 330 g SepaFlash flash silica column, eluant: 0-10% EtOAc/PE, flow rate: 100 mL/min) affords A-11_6. $^1$H NMR (400 MHz, CDCl$_3$) δ=4.02 (d, J=8.3 Hz, 6H), 2.92-2.82 (m, 2H), 2.71-2.62 (m, 2H).

Step 6: Synthesis of Compound A-11_7

To a 1000 mL one-neck flask, A-11_6 (50 g, 257.48 mmol) and DCM (500 mL) were added, followed by DAST (122 g, 756.88 mmol, 100 mL), and the reaction was stirred at 30° C. for 20 h under nitrogen protection. The reaction liquid was slowly added to ice water (2000 mL) to quench, and the filter cake was washed with dichloromethane (2000 mL). The filtrate was directly rotary-evaporated to dryness. Purification by a flash silica column (ISCO cake, 330 g SepaFlash silica column, eluant: 0-10% EtOAc/PE, flow rate: 100 mL/min) affords A-11_7. $^1$H NMR (400 MHz, CDCl$_3$) δ=3.98 (d, J=5.1 Hz, 6H), 2.83-2.70 (m, 2H), 2.62-2.41 (m, 2H).

Step 7: Synthesis of Compound A-11_8

To a 1000 mL one-neck flask, A-11_7 (50 g, 231.28 mmol) and THF (100 mL) were added, followed by concentrated hydrochloric acid (500 mL), and the reaction was stirred at 80° C. for 12 h under nitrogen protection. The reaction liquid was slowly cooled to room temperature, the turbid liquid was filtered, and the filter cake was washed with ethyl acetate (50 mL) to afford A-11_8. $^1$H NMR (400 MHz, CDCl$_3$) δ=11.85 (br s, 1H), 11.36-11.12 (m, 1H), 2.61-2.52 (m, 4H).

Step 8: Synthesis of Compound A-11

To a 1000 mL single-neck flask, A-11_8 (34 g, 180.72 mmol) was added, and POCl3 (206 mL) was added, and the reaction was stirred at 120° C. for 12 h under nitrogen protection. The reaction liquid was rotary-evaporated to dryness, diluted with dichloromethane (500 mL) and then slowly added to water (1500 mL) to quench, and then extracted with dichloromethane (1000 mL×3). The organic phases were combined, and rotary-evaporated to dryness to afford A-11. $^1$H NMR (400 MHz, CDCl$_3$) δ=3.16-3.01 (m, 2H), 2.85-2.65 (m, 2H).

Intermediate B-5

Synthetic Scheme:

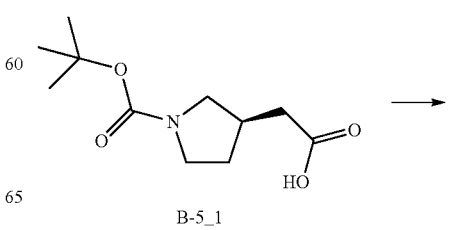

B-5_1

-continued

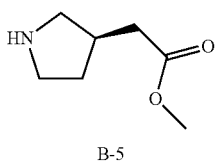

B-5

Step 1: Synthesis of Hydrochloride Salt of Compound B-5

Compound B-5_1 (2 g, 8.72 mmol) and HCl/MeOH (4 M, 2.18 mL) were added to MeOH (20 mL), and the reaction was stirred at 70° C. for 1 h. LCMS showed the reaction was complete. The reaction liquid was rotary-evaporated to dryness to afford crude hydrochloride salt of Compound B-5, which was used directly in the next step without further purification.

Intermediate B-6

Synthetic Scheme:

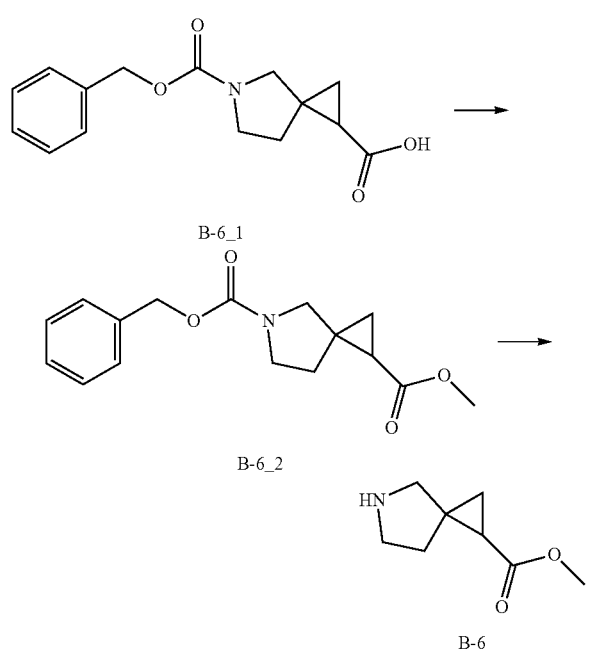

Step 1: Synthesis of Compound B-6_2

In a 50 mL round-bottomed flask, Compound B-6_1 (1.2 g, 4.36 mmol) was dissolved in HCl/MeOH (20 mL), and the reaction flask was stirred at 70° C. for 1 h. TLC (PE:EtOAc=1:1) showed the reaction was complete. The reaction liquid was depressurized to afford Compound B-6_2.

Step 2: Synthesis of Compound B-6

In a 100 mL round-bottomed flask, Compound B-6_2 (600 mg, 2.07 mmol) was dissolved in MeOH (10 mL), the air in the flask was purged with nitrogen, then Pd/C (220.69 mg, 207.38 μmol) was added, the air in the flask was replaced with a hydrogen balloon for three times, and under the hydrogen balloon (15 psi) atmosphere, the mixture was stirred at 10° C. for 10 min. TLC (PE:EtOAc=1:1) showed the reaction was complete and the starting material spot disappeared. The reaction liquid was filtered through Celite, the filter cake was washed with MeOH (50 mL), and the collected filtrate was concentrated under reduced pressure. After concentration, Compound B-6 was obtained. $^1$H NMR (400 MHz, CD$_3$OD) δ=3.72 (d, J=1.6 Hz, 3H), 3.51-3.39 (m, 3H), 3.27 (br d, J=19.2 Hz, 1H), 2.21-1.97 (m, 3H), 1.41-1.27 (m, 2H).

Intermediate G-2

Synthetic Scheme:

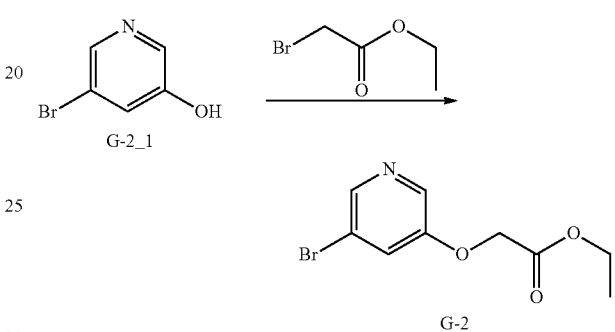

Step 1: Synthesis of Compound G-2

In a 100 mL round-bottomed flask, Compound G-2_1 (500 mg, 2.87 mmol) and potassium carbonate (1.19 g, 8.61 mmol) were dissolved in THF (5 mL), then ethyl bromoacetate (958 mg, 5.74 mmol, 634.44 μL) was added, and the reaction was stirred at 60° C. for 12 h. TLC (PE:EtOAc=1:1) showed the reaction was complete and the starting material spot disappeared. After completion of the reaction, the solvent was removed by rotary-evaporation to dryness to afford a crude product. The crude product was purified by automated column chromatography (100-200 mesh, eluant: PE:EtOAc=100:1-100:50) to afford G-2. $^1$H NMR (400 MHz, CDCl$_3$) δ 8.35 (s, 1H), 8.27 (d, J=2.5 Hz, 1H), 7.39 (t, J=2.1 Hz, 1H), 4.67 (s, 2H), 4.30 (q, J=7.3 Hz, 2H), 1.34-1.30 (m, 3H).

Intermediate H-1

Synthetic Scheme:

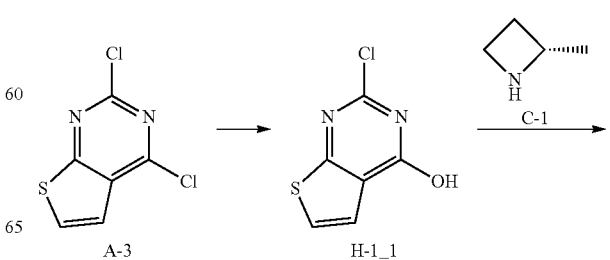

-continued

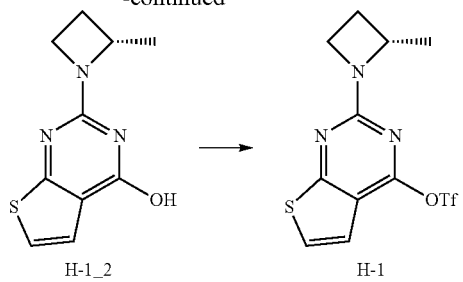

Intermediate B-10

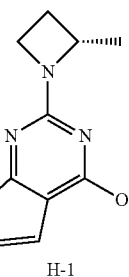

Step 1: Synthesis of Compound H-1_1

A-3 (5 g, 24.38 mmol) and NaOH (4.88 g, 121.91 mmol) were dissolved in THF (25 mL)/H$_2$O (25 mL), and the reaction was stirred at 20° C. for 12 h under nitrogen protection. LC-MS showed disappearance of starting material signal and generation of product signal, and TLC (petroleum ether:ethyl acetate=3:1) showed formation of a new spot. The reaction liquid was adjusted to pH 2.3 with dilute hydrochloric acid (2 M), added with water (20 mL), and extracted with EtOAc (60 mL). The organic phase was rotary-evaporated to dryness to afford H-1_1.

Step 2: Synthesis of Compound H-1_2

To a 250 mL three-necked flask, H-1_1 (4.5 g, 24.11 mmol) and acetonitrile (100 mL) were added, followed by C-1 (9.51 g, 31.35 mmol) and potassium carbonate (10.00 g, 72.34 mmol), and the reaction was stirred at 80° C. for 12 h under nitrogen protection. LCMS showed that the starting material signal did not disappear and a product signal was generated, and TLC (petroleum ether:ethyl acetate=3:1) showed formation of a new spot. The reaction liquid was filtered directly. The filter cake was washed with ethyl acetate (30 mL), and the filtrate was directly rotary-evaporated to dryness to afford H-1_2. 1H NMR (400 MHz, CDCl$_3$) δ11.01 (br s, 1H), 7.24 (d, J=6.0 Hz, 1H), 6.80 (d, J=6.0 Hz, 1H), 4.81-4.58 (m, 1H), 4.32 (dt, J=5.3, 8.9 Hz, 1H), 4.21-4.02 (m, 1H), 2.70-2.49 (m, 1H), 2.15-2.01 (m, 1H), 1.58 (d, J=6.5 Hz, 3H).

Step 3: Synthesis of Compound H-1

To a 250 mL three-necked flask, H-1_2 (5 g, 22.60 mmol) was added and dissolved with dichloromethane (50 mL). Trifluoroacetic anhydride (6.86 g, 67.79 mmol, 9.44 mL) was slowly added dropwise at 0° C., and the reaction was stirred at 20° C. for 12 h under nitrogen protection. LCMS showed disappearance of starting material signal and generation of product signal, and TLC (petroleum ether:ethyl acetate=3:1) showed formation of a new spot. The reaction liquid was slowly added to ice water (200 mL), adjusted to pH 7-8 with saturated sodium bicarbonate solution, and extracted with ethyl acetate (200 mL×2). The organic phase was directly rotary-evaporated to dryness to afford a crude product. The crude product was purified by flash silica column (eluant: 0-20% EtOAc/PE, flow rate: 35 mL/min) to afford Compound H-1. H NMR (400 MHz, CDCl$_3$) δ 7.06-6.91 (m, 2H), 4.55-4.42 (m, 1H), 4.12-3.93 (m, 2H), 2.55-2.37 (m, 1H), 2.06-1.89 (m, 1H), 1.48 (d, J=6.0 Hz, 3H).

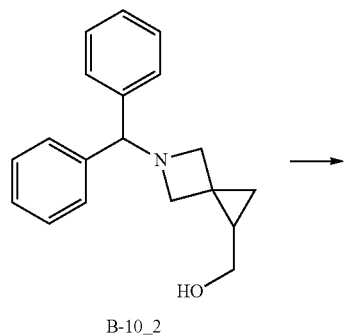

B-10_2

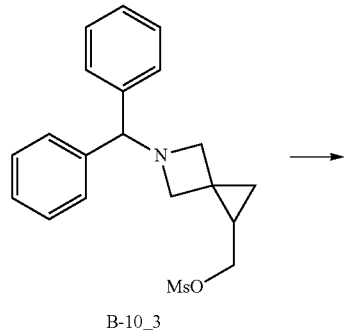

B-10_3

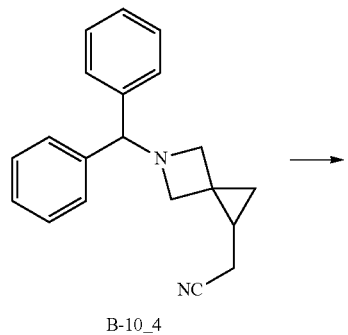

B-10_4

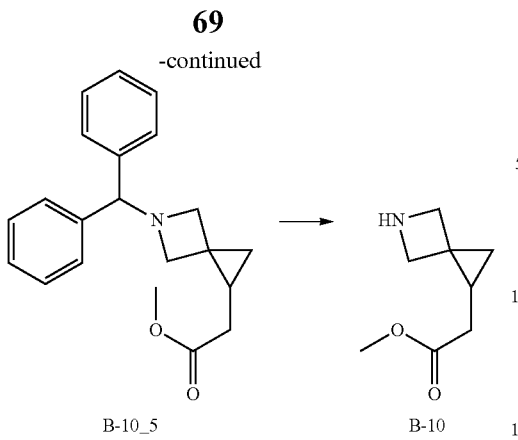

Step 1: Synthesis of Compound B-10_2

B-101 (3 g, 9.76 mmol) was dissolved in DCM (50 mL), the reaction temperature was lowered to −70° C., DIBALH (1 M, 19.52 mL) was slowly added to the reaction liquid at −70° C., and the reaction was stirred at −70° C. for 1 h. LCMS showed disappearance of starting material signal and generation of product signal. Methanol (20 mL) was slowly added dropwise at −70° C. to quench the reaction. After slowly recovering to room temperature, methanol (100 mL) was added, stirred and filtered. The filter cake was washed with 20 mL methanol, and the organic phase was rotary-evaporated to dryness. The crude product was purified by automated column chromatography (100-200 mesh, eluant: PE:EtOAc=100: 1-100:40) to afford Compound B-10_2. 1H NMR (400 MHz, CDCl$_3$) δ 7.35 (d, J=7.0 Hz, 4H), 7.24-7.17 (m, 4H), 7.15-7.07 (m, 2H), 4.46 (s, 1H), 3.48 (dd, J=6.3, 11.3 Hz, 1H), 3.33-3.17 (m, 5H), 1.15-1.03 (m, 1H), 0.68 (dd, J=5.5, 8.5 Hz, 1H), 0.31 (t, J=5.5 Hz, 1H).

Step 2: Synthesis of Compound B-10_3

B-10_2 (1 g, 3.58 mmol) and TEA (543.30 mg, 5.37 mmol, 747.32 μL) were dissolved in DCM (5 mL), the reaction solution was slowly lowered to 0° C., MsCl (0.62 g, 5.41 mmol, 418.92 μL) was slowly added dropwise at 0° C., and the reaction was stirred at 20° C. for 1 h. TLC (petroleum ether:ethyl acetate=3:1) showed disappearance of starting material signal and formation of a new spot. The reaction liquid was slowly added to ice water (40 mL) to quench, adjusted to about pH 7 by adding saturated aqueous sodium bicarbonate solution, and extracted with DCM (50 mL×2). The organic phase was rotary-evaporated to dryness to afford Compound B-10_3.

Step 3: Synthesis of Compound B-10_4

B-10_3 (1.1 g, 1.54 mmol, 50% purity) was dissolved in DMSO (12 mL), NaCN (247.50 mg, 5.05 mmol) was added slowly, and the reaction was stirred at 80° C. for 12 h. LCMS showed disappearance of starting material signal and generation of product signal. TLC (petroleum ether:ethyl acetate=3:1) showed disappearance of the starting material signal and formation of a new spot. The reaction liquid was slowly added to ice water (30 mL), and extracted with ethyl acetate (40 mL×2). The organic phases were combined, washed with saturated brine (40 mL). The organic phase was rotary-evaporated to dryness. The aqueous phase was slowly added to basic sodium hypochlorite solution to quench. The crude product was purified by flash silica column (ISCO®; 20 g SepaFlash® silica column, eluant: 0-20% ethyl acetate/petroleum ether, flow rate: 35 mL/min) to afford Compound B-10_4.

Step 4: Synthesis of Compound B-10_5

To a 50 mL single-neck flask, B-10_4 (0.6 g, 2.19 mmol) was added, then HCl/MeOH (4 M, 6.00 mL) was added slowly, and the reaction was stirred at 80° C. for 12 h. LCMS showed disappearance of starting material signal and generation of product signal. The reaction liquid was directly rotary-evaporated to dryness to afford Compound B-10_5.

Step 5: Synthesis of Compound B-10

B-10_5 (0.4 g, 1.24 mmol) was dissolved in MeOH (10 mL), Pd/C (0.05 g, 1.24 mmol, 10% palladium content) was added under nitrogen protection, the reaction was set up in a hydrogenation chamber and stirred at 50° C. for 12 h after replaced with hydrogen three times, and H$_2$ (2.51 mg, 1.24 mmol) pressure was maintained at 45 psi. LCMS showed disappearance of starting material signal. TLC (petroleum ether:ethyl acetate=3:1) showed disappearance of the starting material signal and formation of a new spot. The reaction liquid was filtered through Celite, and the filter cake was washed with methanol (30 mL). The filtrate was rotary-evaporated to dryness to afford Compound B-10. 1H NMR (400 MHz, CD$_3$OD) δ 4.28-4.11 (m, 4H), 3.74 (s, 3H), 2.54-2.42 (m, 1H), 2.29-2.16 (m, 1H), 1.35-1.26 (m, 1H), 0.67-0.56 (m, 1H), 0.69-0.54 (m, 1H).

Example 1

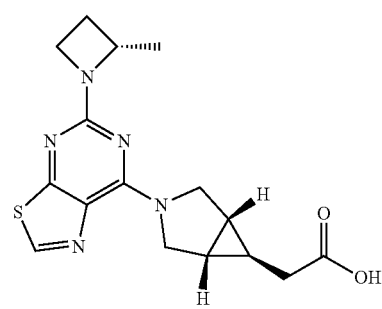

WX001

Synthetic Scheme:

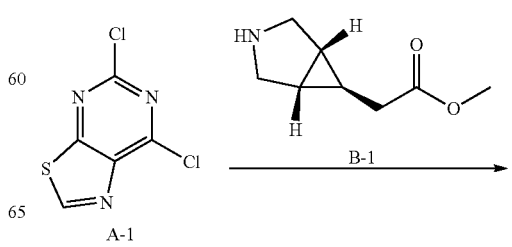

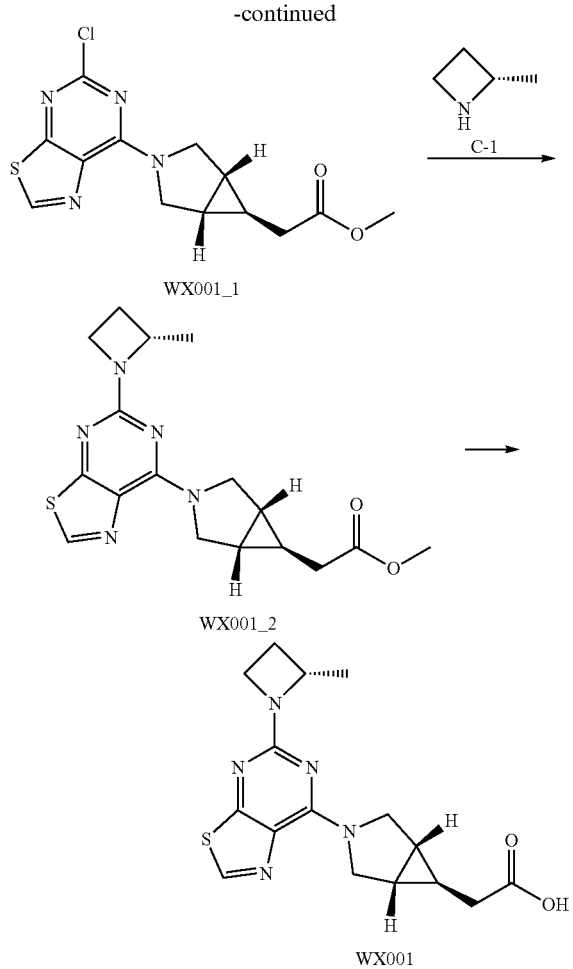

Step 1: Synthesis of Compound WX001_1

Compound B-1 (Intermediate B-1 was synthesized by the method for synthesizing methyl (1R,5S,6S)-3-azabicyclo[3.1.0]hex-6-ylacetate hydrochloride reported on page 53 of the patent WO2017115205A1) (3.7 g, 23.84 mmol) was dissolved in DCM (200.0 mL), lowered to −65° C., and a solution of Compound A-1 (4.9 g, 23.78 mmol) in DCM (100.0 mL) was slowly added dropwise, followed by slow dropwise addition of DIPEA (7.68 g, 59.45 mmol). The reaction was stirred at −65° C. for 1 h, then warmed to 25° C. and stirred for 2 h. After completion of the reaction, the solvent was removed by rotary evaporation to give a crude product. The crude product was purified by automated column chromatography (100-200 mesh, eluant: PE:EtOAc=100:1-100:50) to afford WX001_1 $^1$H NMR (400 MHz, CDCl$_3$) δ=8.68 (s, 1H), 4.78 (m, 1H), 4.26 (m, 1H), 4.04 (m, 1H), 3.74 (m, 1H), 3.71 (s, 3H), 2.42-2.27 (m, 2H), 1.69 (m, 1H), 1.65-1.50 (m, 1H), 0.96 (m, 1H).

Step 2: Synthesis of Compound WX001_2

Compound WX001_1 (3.9 g, 12.01 mmol) was added in batches to a solution of the hydrochloride salt of C-1 (1.5 g, 21.09 mmol) in THF (100.0 mL), followed by dropwise addition of DIPEA (3.10 g, 24.02 mmol), and the reaction was stirred at 65° C. for 12 h. After completion of the reaction, the solvent was removed by rotary evaporation to give a crude product. The crude product was purified by automated column chromatography (100-200 mesh, eluant: PE:EtOAc=100:1-100:50) to afford compound WX001_2. $^1$H NMR (400 MHz, CDCl$_3$) δ=8.27 (s, 1H), 4.71 (m, 1H), 4.51-4.40 (m, 1H), 4.18 (m, 1H), 4.08-3.85 (m, 3H), 3.80-3.60 (m, 4H), 2.42-2.26 (m, 3H), 1.96 (m, 1H), 1.64 (m, 2H), 1.54 (d, J=6.3 Hz, 3H), 1.02-0.93 (m, 1H).

Step 3: Synthesis of Compound WX001

Compound WX001_2 (4.0 g, 11.13 mmol) was dissolved in THF (100.0 mL) and H$_2$O (100.0 mL), lithium hydroxide monohydrate (1.40 g, 33.38 mmol) was added, and the reaction was stirred at 20° C. for 4 h. After completion of the reaction, 200 mL water was added, and 1N hydrochloric acid was added to adjust pH to 4-5. The solvent was removed by rotary evaporation. The product was dissolved by addition of 25 mL DMSO, and filtered to remove the insoluble inorganic salts. The solution of the crude product in DMSO was purified by Prep-HPLC (separation method: Welch Xtimate C18 150 mm*25 mm*5 μm; Mobile phase: [water (0.225% FA)-ACN]; B(ACN) %: 45%-75%, 8 min) to afford Compound WX001.

Examples 35, 42, 43

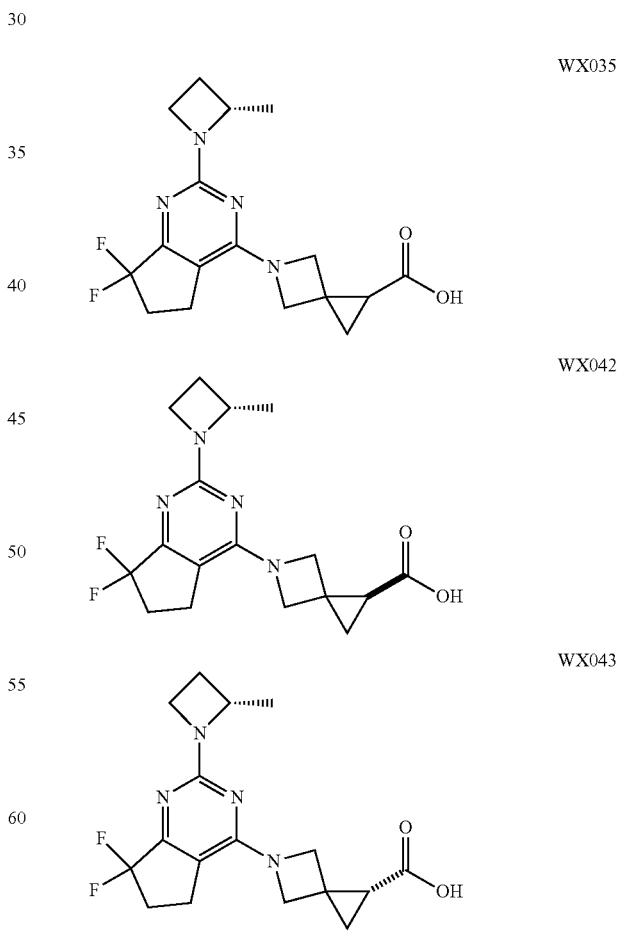

Synthetic Scheme:

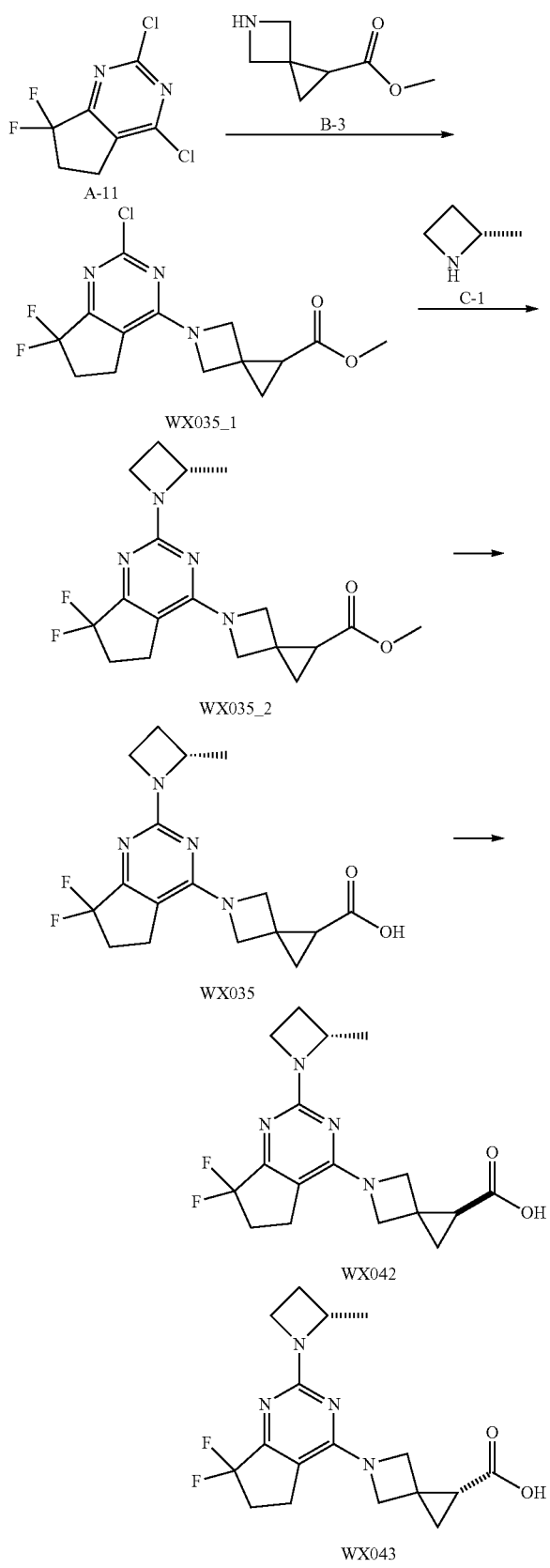

Step 1: Synthesis of Compound WX035_1

Compound B-3 (40 g, 129.28 mmol) was dissolved in DCM (300.0 mL), cooled to 0° C., and a solution of Compound A-11 (27 g, 119.99 mmol) in DCM (200.0 mL) was slowly added dropwise, followed by slow dropwise addition of DIPEA (46.52 g, 359.97 mmol) slowly added dropwise. The reaction was stirred at 0° C. for 3 h. After completion of the reaction, the solvent was removed by rotary evaporation to dryness to give a crude product. The crude product was purified by automated column chromatography (100-200 mesh, eluant: PE:EtOAc=100:1-100:50) to afford WX035_1. $^1$H NMR (400 MHz, CDCl$_3$) δ=4.73-4.23 (m, 4H), 3.72 (d, J=5.5 Hz, 3H), 3.07-2.90 (m, 2H), 2.67-2.48 (m, 2H), 1.93 (br d, J=9.5 Hz, 1H), 1.72-1.51 (m, 1H), 1.75-1.49 (m, 1H).

Step 2: Synthesis of Compound WX035_2

Compound WX035_1 (35 g, 106.15 mmol) was added in batches to a solution of hydrochloride salt of C-1 (38.65 g, 127.38 mmol) in acetonitrile (350.0 mL), then K$_2$CO$_3$ (44 g, 318.44 mmol) was added dropwise, and the reaction was stirred at 80° C. for 12 h. The reaction was complete and then directly filtered, and the filtrate was rotary-evaporated to dryness to afford WX035_2. $^1$H NMR (400 MHz, CDCl$_3$) δ=4.49-4.35 (m, 2H), 4.33-4.17 (m, 3H), 4.07 (dt, J=5.0, 8.8 Hz, 1H), 3.74 (s, 3H), 2.87-2.77 (m, 2H), 2.53-2.36 (m, 3H), 1.97-1.86 (m, 2H), 1.50 (d, J=6.0 Hz, 3H), 1.39 (t, J=5.5 Hz, 1H), 1.32-1.26 (m, 1H), 1.30-1.24 (m, 1H).

Step 3: Synthesis of Compound WX035

Compound WX035_2 (36 g, 98.8 mmol) was dissolved in THF (350.0 mL) and H$_2$O (70.0 mL), lithium hydroxide monohydrate (8.29 g, 197.59 mmol) was added, and the reaction was stirred at 20° C. for 12 h. After completion of the reaction, 200 mL water was added, and 1N hydrochloric acid was added to adjust pH to 5-6. Extract was performed with ethyl acetate (300 mL). The solvent was removed by rotary evaporation. The product was dissolved by addition of 25 mL MeOH, and filtered to remove the insoluble inorganic salts. The solution of the crude product in DMSO was purified by Prep-HPLC (separation method: column type: Phenomenex Luna C8 250*50 mm*10 μm; Mobile phase: [H$_2$O (0.1% TFA)-MeOH]; B %: 5%-60%, 25 min) to afford Compound WX035.

Step 3: Synthesis of Compounds WX042 & 043

Compound WX035 (35 g, 99.9 mmol) was separated by SFC (column type: DAICEL CHIRALPAK IG (250 mm*30 mm, 10 μm); Mobile phase: B: [0.1% NH$_3$H$_2$O MeOH]; B %: 40%-40%, 8 min) to afford Compounds WX042 (ee %: 99.58%, RT=3.061 min) and WX043 (ee %: 98.76%, RT=3.922).

Examples in the following table were synthesized with reference to the synthesis method in Example 1 (replacing Compound A-1 with the parent core fragment A and replacing Compound B-1 with fragment B in Step 1, respectively).

| Example | Parent core fragment A | Fragment B | Structure of the target compound | Compound No. |
|---|---|---|---|---|
| 2 | 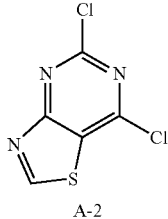<br>A-2 | 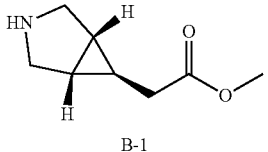<br>B-1 | 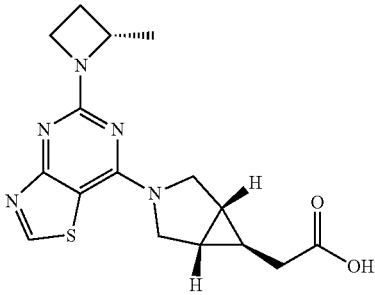 [SMILES: C[C@H]1CCN1c1nc(N2C[C@@H]3[C@@H](CC(=O)O)[C@@H]3C2)c2scnc2n1] | WX002 |
| 3 | 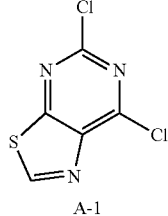<br>A-1 | 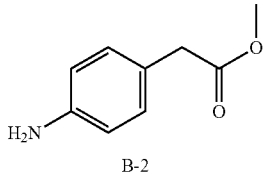<br>B-2 | 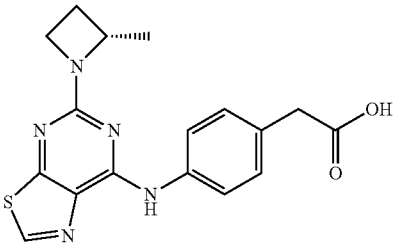 | WX003 |
| 4 | 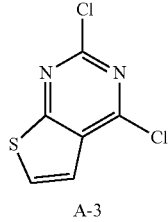<br>A-3 | 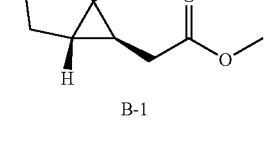<br>B-1 | 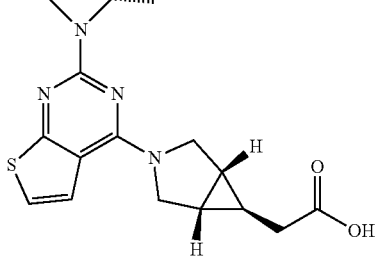 | WX004 |
| 6 | 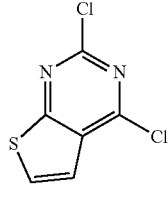<br>A-3 | 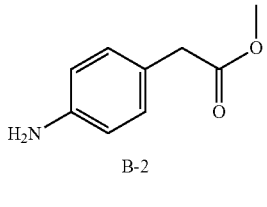<br>B-2 | 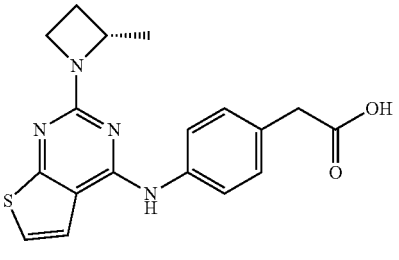 [SMILES: C[C@H]1CCN1c1nc(Nc2ccc(CC(=O)O)cc2)c2ncsc2n1] | WX006 |
| 7 | 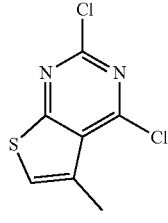<br>A-4 | 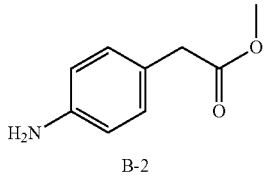<br>B-2 | 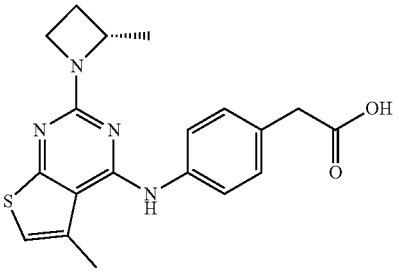 [SMILES: Cc1csc2nc(N3CC[C@@H]3C)nc(Nc3ccc(CC(=O)O)cc3)c12] | WX007 |

-continued

| Example | Parent core fragment A | Fragment B | Structure of the target compound | Compound No. |
|---|---|---|---|---|
| 8 | A-4 | B-1 | | WX008 |
| 9 | A-3 | B-3 | | WX009 |
| 18 | A-3 | B-4 | | WX018 |
| 21 | A-5 | B-1 | | WX021 |
| 24 | A-6 | B-1 | | WX024 |

-continued
| Example | Parent core fragment A | Fragment B | Structure of the target compound | Compound No. |
|---|---|---|---|---|
| 25 | 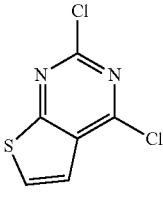<br>A-3 | <br>Hydrochloride salt of B-5 | 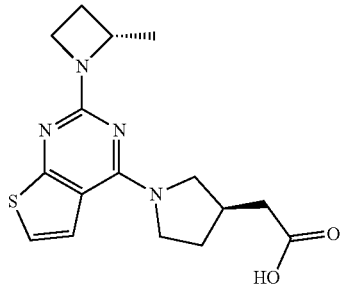 [SMILES: C[C@H]1CCN1c1nc(N2CC[C@H](CC(=O)O)C2)c2ccsc2n1] | WX025 |
| 26 | 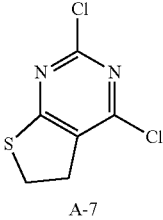<br>A-7 | 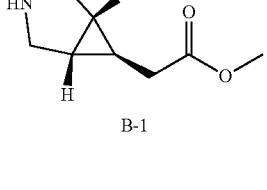<br>B-1 | 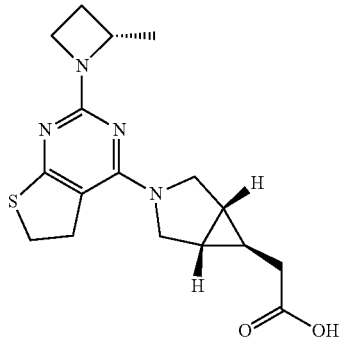 [SMILES: C[C@H]1CCN1c1nc2c(c(N3C[C@@H]4[C@@H](CC(=O)O)[C@@H]4C3)n1)CCS2] | WX026 |
| 27 | 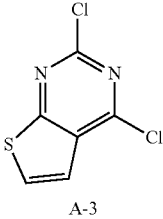<br>A-3 | 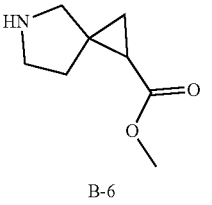<br>B-6 | 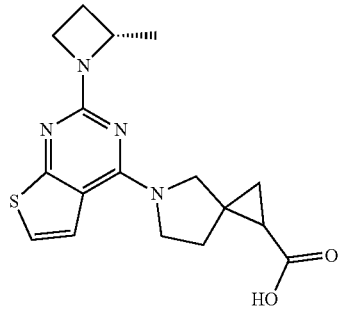 [SMILES: C[C@H]1CCN1c1nc(N2CCC3(CC3C(=O)O)C2)c2ccsc2n1] | WX027 |
| 28 | 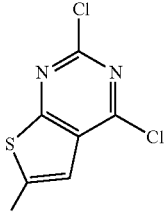<br>A-8 | 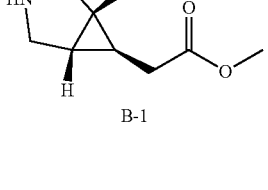<br>B-1 | 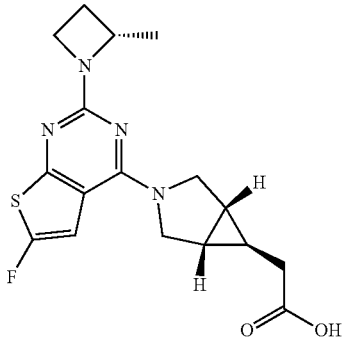 [SMILES: C[C@H]1CCN1c1nc(N2C[C@@H]3[C@@H](CC(=O)O)[C@@H]3C2)c2cc(F)sc2n1] | WX028 |

-continued
| Example | Parent core fragment A | Fragment B | Structure of the target compound | Compound No. |
|---|---|---|---|---|
| 29 | 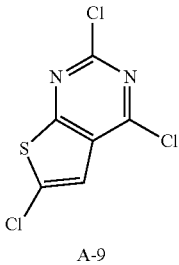 [SMILES: Clc1nc(Cl)c2cc(Cl)sc2n1 ; "A-9"]<br>A-9 | 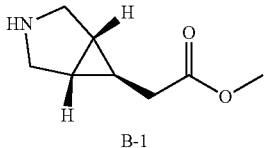<br>B-1 | 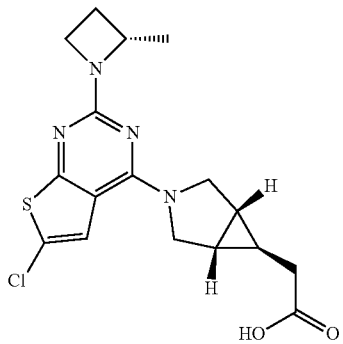 [SMILES: C[C@H]1CCN1c1nc(N2C[C@@H]3[C@@H](CC(=O)O)[C@@H]3C2)c2cc(Cl)sc2n1] | WX029 |
| 30 | 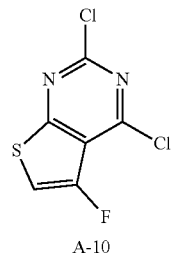<br>A-10 | 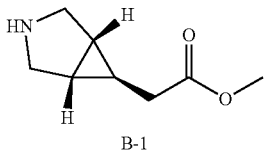<br>B-1 | 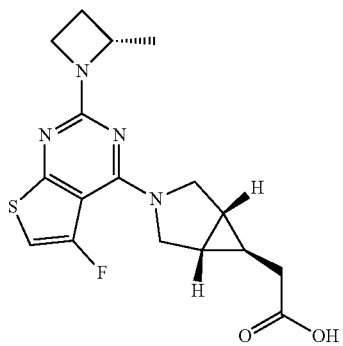 [SMILES: C[C@H]1CCN1c1nc(N2C[C@@H]3[C@@H](CC(=O)O)[C@@H]3C2)c2c(F)csc2n1] | WX030 |
| 32 | 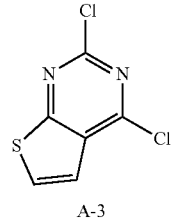<br>A-3 | 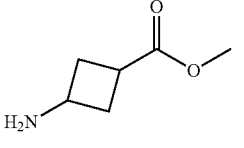<br>B-7 | 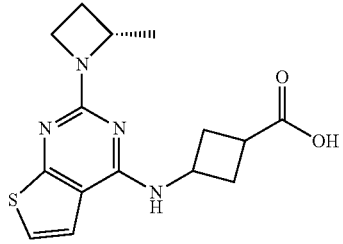 [SMILES: C[C@H]1CCN1c1nc(NC2CC(C(=O)O)C2)c2ccsc2n1] | WX032 |
| 34 | 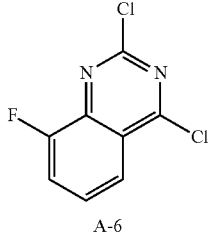<br>A-6 | 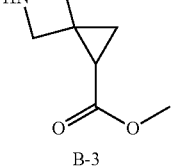<br>B-3 | 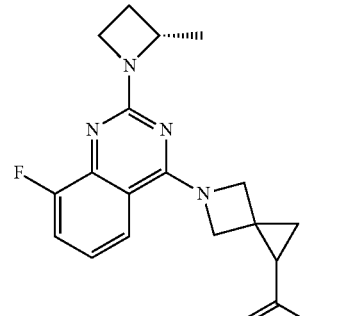 | WX034 |

-continued
| Example | Parent core fragment A | Fragment B | Structure of the target compound | Compound No. |
|---|---|---|---|---|
| 36 | 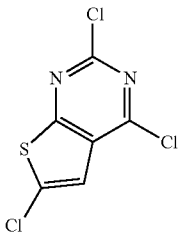<br>A-9 | 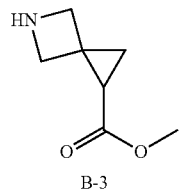<br>B-3 | 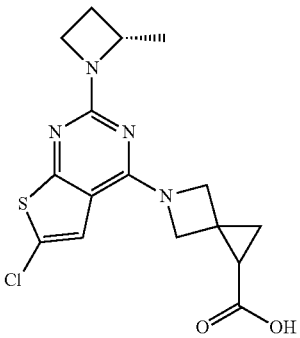 [SMILES: C[C@H]1CCN1c1nc(N2CC3(CC3C(=O)O)C2)c2cc(Cl)sc2n1] | WX036 |
| 37 | 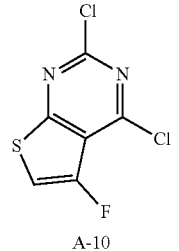<br>A-10 | 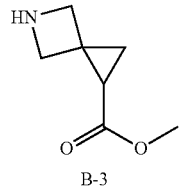<br>B-3 | 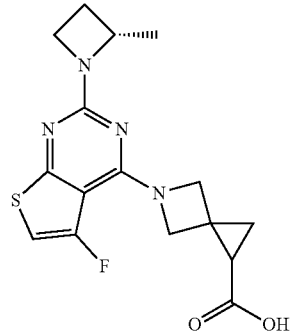 [SMILES: C[C@H]1CCN1c1nc(N2CC3(CC3C(=O)O)C2)c2c(F)csc2n1] | WX037 |
| 38 | 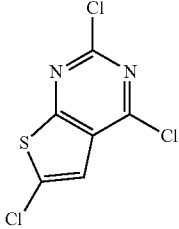<br>A-9 | 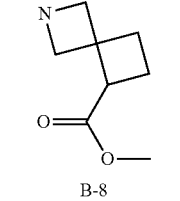<br>B-8 | 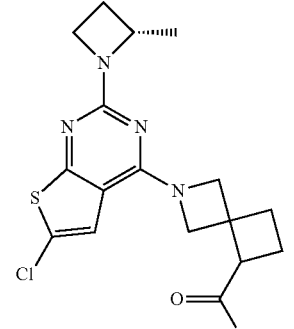 | WX038 |
| 46 | 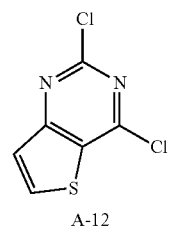<br>A-12 | 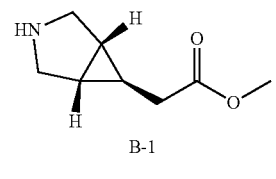<br>B-1 | 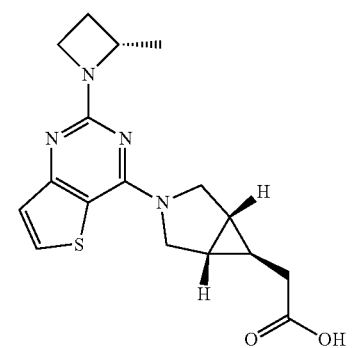 [SMILES: C[C@H]1CCN1c1nc(N2C[C@@H]3[C@@H](CC(=O)O)[C@@H]3C2)c2sccc2n1] | WX046 |

-continued
| Example | Parent core fragment A | Fragment B | Structure of the target compound | Compound No. |
|---|---|---|---|---|
| 49 | 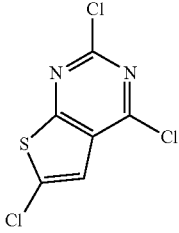<br>A-9 | 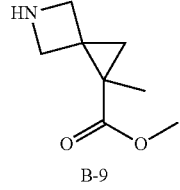<br>B-9 | 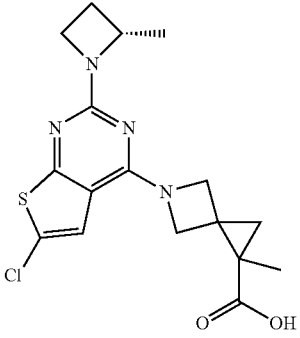 [SMILES: C[C@H]1CCN1c1nc(N2CC3(C2)CC3(C)C(=O)O)c2cc(Cl)sc2n1] | WX049 |
| 50 | 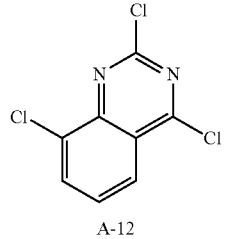<br>A-12 | 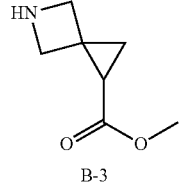<br>B-3 | 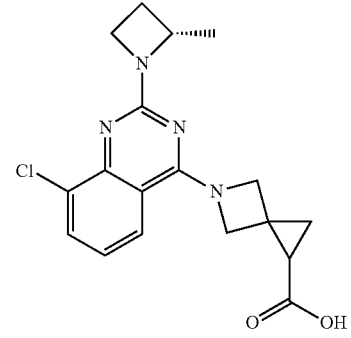 [SMILES: C[C@H]1CCN1c1nc(N2CC3(CC3C(=O)O)C2)c2cccc(Cl)c2n1] | WX050 |
| 51 | 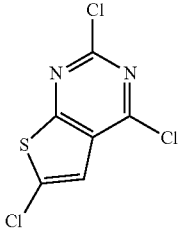<br>A-9 | 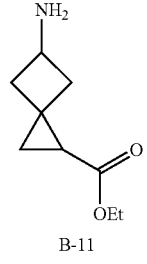<br>B-11 | 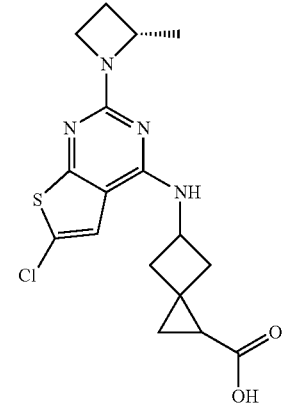 [SMILES: C[C@H]1CCN1c1nc(NC2CC3(C2)CC3C(=O)O)c2cc(Cl)sc2n1] | WX051 |
| 52 | 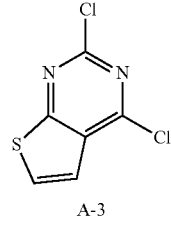<br>A-3 | 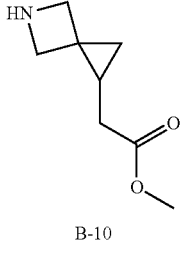<br>B-10 | 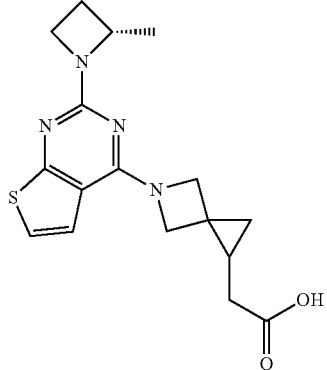 [SMILES: C[C@H]1CCN1c1nc(N2CC3(CC3CC(=O)O)C2)c2ccsc2n1] | WX052 |

-continued

| Example | Parent core fragment A | Fragment B | Structure of the target compound | Compound No. |
|---|---|---|---|---|
| 53 | A-9 | B-10 | | WX053 |

The compounds shown in the following table were obtained from racemic compounds by SFC resolution

| Racemic compound | Conditions for SFC resolution | Example | Compound structure | Compound No. | Retention time (min) |
|---|---|---|---|---|---|
| WX009 | Column: DAICEL CHIRALPAK IG (250 mm*30 mm, 10 μm); Mobile phase: A: CO$_2$, B: [0.1% NH$_3$H$_2$O MeOH]; B %: 45%-45%, 8 min | 19 | | WX019 | 1.656 |
| | | 20 | | WX020 | 1.924 |

-continued

| Racemic compound | Conditions for SFC resolution | Example | Compound structure | Compound No. | Retention time (min) |
|---|---|---|---|---|---|
| WX034 | Column: DAICEL CHIRALPAK IG (250 mm*30 mm, 10 μm); Mobile phase: A: $CO_2$, B: ethanol (0.05% DEA); B %: 5%-40%, 5.5 min; 5%, 1.5 min) | 40 | | WX040 | 3.308 |
| | | 41 | | WX041 | 3.558 |
| WX036 | Column: DAICEL CHIRALPAK IG (250 mm*30 mm, 10 μm); Mobile phase: A: $CO_2$, B: ethanol (0.05% DEA); B %: 5%-40%, 4 min; 40%, 2.5 min; 5%, 1.5 min) | 44 | | WX044 | 2.536 |
| | | 45 | | WX045 | 2.878 |

-continued

| Racemic compound | Conditions for SFC resolution | Example | Compound structure | Compound No. | Retention time (min) |
|---|---|---|---|---|---|
| WX052 | Column: DAICEL CHIRALCEL OD-H (250 mm*30 mm, 5 μm); Mobile phase: A: $CO_2$, B: 0.1% $NH_3H_2O$ MeOH]; B %: 55%, 8 min | 54 | | WX054 | 3.305 |
| | | 55 | | WX055 | 4.503 |
| WX053 | Column: (s,s) WHELK-O1 (250 mm*30 mm, 5 μm); Mobile phase: A: $CO_2$, B: [0.1% $NH_3H_2O$ EtOH]; B %: 55%-55%, 8 min | 56 | | WX056 | 4.700 |
| | | 57 | | WX057 | 5.047 |

Example 23

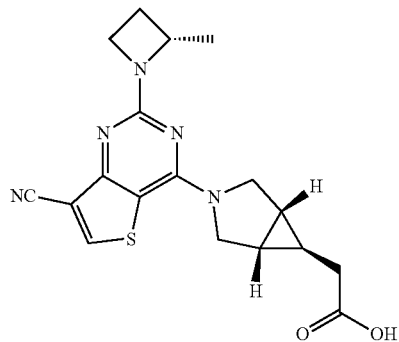

Synthetic Scheme:

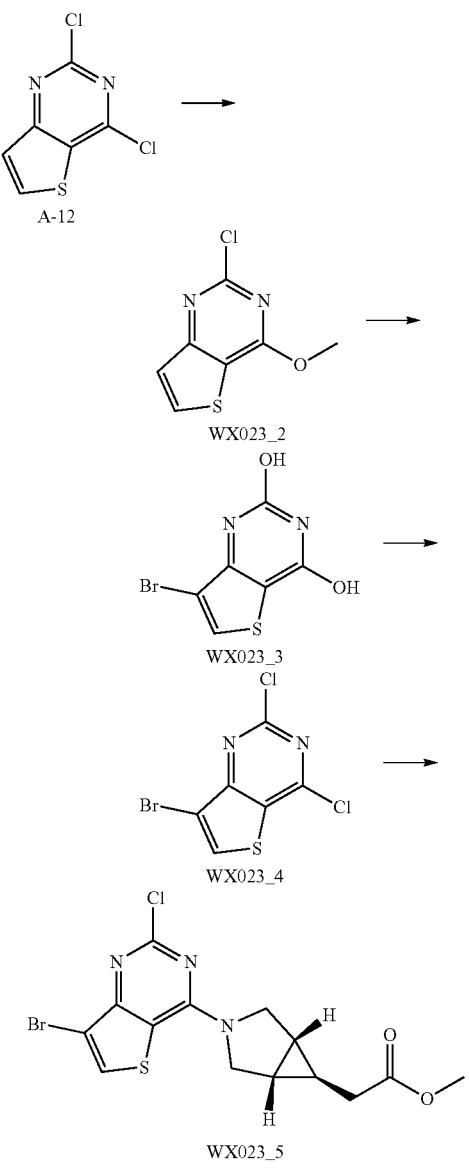

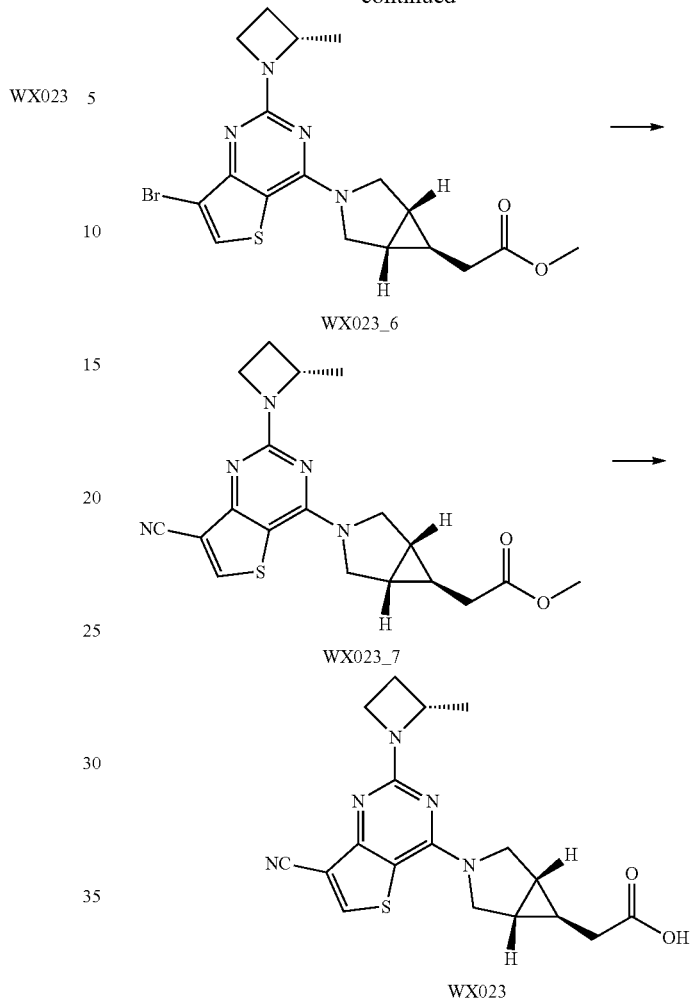

Step 1: Synthesis of Compound WX023_2

Compound A-12 (10 g, 48.77 mmol) and NaOMe (21.08 g, 390.12 mmol) were dissolved in MeOH (200 mL), and the reaction was stirred at 80° C. for 12 h under nitrogen protection. TLC (petroleum ether:ethyl acetate=3:1) showed formation of a new spot. The reaction liquid was directly rotary-evaporated to dryness, added with water (60 mL), and extracted with ethyl acetate (80 mL×2). The organic phases were combined and rotary-evaporated to dryness to afford WX023_2.

Step 2: Synthesis of Compound WX023_3

Compound WX023_2 (1 g, 5.10 mmol) and Br$_2$ (1.22 g, 7.64 mmol, 394.07 µL) were dissolved in HOAc (20 mL), and the reaction was stirred at 120° C. for 12 h under nitrogen protection. TLC (petroleum ether:ethyl acetate=3:1) showed formation of a new spot. The reaction liquid was cooled to room temperature, directly rotary-evaporated to dryness, and added with water (20 mL) with stirring for 30 min. The mixture was filtered, and the filter cake was washed with water (10 mL) and collected to afford Compound WX023_3.

Step 3: Synthesis of Compound WX023_4

To a 50 mL single-neck flask, Compound WX023_3 (900.00 mg, 3.64 mmol) and DIPEA (1.41 g, 10.93 mmol) were added, followed by POCl$_3$ (14.85 g, 96.85 mmol), and the reaction was stirred at 120° C. for 12 h under nitrogen protection. TLC (petroleum ether:ethyl acetate=3:1) showed formation of a new spot. The reaction liquid was slowly added to water (50 mL) and extracted with dichloromethane (50 mL×3). The filtrate was directly rotary-evaporated to dryness. The crude product was purified by flash silica column (ISCO®; 40 g SepaFlash® silica column, eluant: 0-15% EtOAc/PE, flow rate: 35 mL/min) to afford Compound WX023_4.

Step 4: Synthesis of Compound WX023_5

Compound WX023_4 (0.2 g, 704.32 μmol), Intermediate B-1 (131.17 mg, 845.19 μmol), and DIPEA (273.08 mg, 2.11 mmol) were dissolved in DCM (2 mL), and the reaction was stirred at 40° C. for 12 h under nitrogen protection. TLC (petroleum ether:ethyl acetate=3:1) showed formation of a new spot. The reaction liquid was filtered directly. The filter cake was washed with ethyl acetate (20 mL) and the filtrate was directly rotary-evaporated to dryness to afford Compound WX023_5.

Step 5: Synthesis of Compound WX023_6

Compound WX023_5 (0.2 g, 496.66 μmol), Intermediate C-1 (166.00 mg, 547.10 μmol), and K$_2$CO$_3$ (204.00 mg, 1.48 mmol) were dissolved in acetonitrile (3 mL), and the reaction was stirred at 90° C. for 12 h under nitrogen protection. LCMS showed disappearance of starting material signal and generation of product signal. The reaction liquid was filtered. The filter cake was washed with ethyl acetate (20 mL) and the filtrate was rotary-evaporated to dryness to afford Compound WX023_6.

Step 6: Synthesis of Compound WX023_7

Compound WX023_6 (0.2 g, 457.30 μmol) and Zn(CN)$_2$ (161.09 mg, 1.37 mmol, 87.08 μL) were dissolved in DMA (2 mL), tri-tert-butylphosphine palladium (233.70 mg, 457.30 μmol) was added under nitrogen protection, and the reaction was stirred at 130° C. for 12 h under nitrogen protection. LCMS showed disappearance of starting material signal and generation of product signal. The reaction liquid was filtered. The filter cake was washed with ethyl acetate (20 mL), and the filtrate was rotary-evaporated to dryness and purified by a flash silica column (ISCO®; 12 g SepaFlash® silica column, eluant: 0-20% EtOAc/PE, flow rate: 35 mL/min) to afford Compound WX023_7.

Step 7: Synthesis of Compound WX023

Compound WX023_7 (120 mg, 312.93 μmol) and LiOH·H$_2$O (39.40 mg, 938.80 μmol) were dissolved in THF (2 mL)/H$_2$O (2 mL), and the reaction was stirred at 20° C. for 12 h under nitrogen protection. LCMS showed disappearance of starting material signal and generation of product signal. The reaction was adjusted to pH 7-8 with 1M dilute hydrochloric acid and extracted with ethyl acetate (20 mL). The organic phase was rotary-evaporated to dryness. The residue was purified by HPLC (column type: Welch Xtimate C18 100 mm*25 mm*3 μm; Mobile phase: [water (0.225% FA)-ACN]; B(ACN) %: 6%-46%, 8 min) to afford Compound WX023.

Example 5

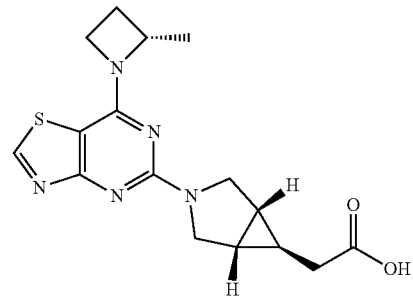

WX005

Synthetic Scheme:

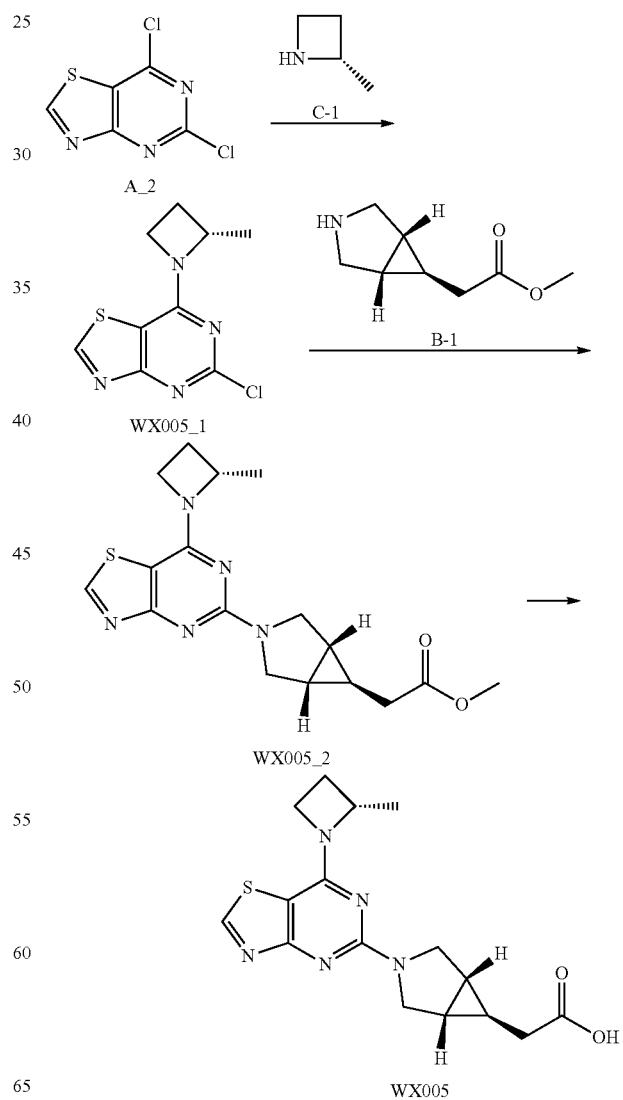

Step 1: Synthesis of Compound WX005_2

A-2 (100 mg, 485.31 μmol) was dissolved in DCM (20 mL) at 25° C. and then cooled to −78° C., hydrochloride salt of C-1 (51.93 mg, 485.31 μmol) and DIPEA (188.17 mg, 1.46 mmol, 253.59 mL) were added slowly (within 15 min), and the reaction returned to 25° C. and was stirred for 2 h. Detection by TLC (PE:EtOAc=10:1) showed the reaction was complete. The solvent was directly concentrated under reduced pressure to afford a crude product. The crude product was purified by automated column chromatography (100-200 mesh, eluant: PE:EtOAc=100:1 to 100:50) to afford Compound WX005_1. LCMS (5-95/1.5 min): 0.930 min, [M+H]$^+$=240.9.

Step 2: Synthesis of Compound WX005_2

WX005_1 (100 mg, 415.43 μmol) was dissolved in THF (15 mL) at 25° C., B-1 (64.47 mg, 415.43 μmol) and DIPEA (161.08 mg, 1.25 mmol, 217.08 mL) were added, and the reaction was stirred at 70° C. for 24 h. Detection by TLC (PE:EtOAc=10:1) showed the reaction was complete. The solvent was directly concentrated under reduced pressure to afford a crude product. The crude product was purified by automated column chromatography (100-200 mesh, eluant: PE:EtOAc=100:1-100:50) to afford Compound WX005_2. LCMS (10-80/7 min): 2.516 min, [M+H]$^+$=360.2.

Step 3: Synthesis of Compound WX005

Compound WX005_2 (30 mg, 83.46 μmol) was dissolved in H$_2$O (5 mL) and THF (5 mL) at 25° C., LiOH·H$_2$O (10.51 mg, 250.39 μmol) was added, and the reaction was stirred at 25° C. for 0.5 h. Detection by TLC (PE:EtOAc=10:1) showed the reaction was complete. The solvent was directly concentrated under reduced pressure to afford a crude product. The crude product was purified by Prep-HPLC (separation method: Welch Xtimate C18 150 mm*25 mm*5 μm; Mobile phase: [water (0.225% FA)-ACN]; B (ACN) %: 45%-75%, 8 min) to afford Compound WX005.

Example 10

WX010

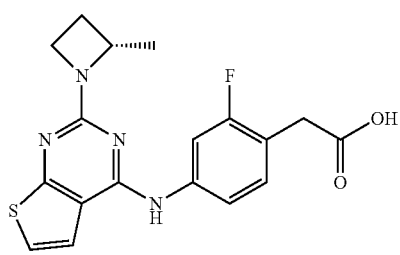

Synthetic Scheme:

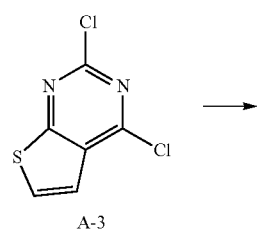

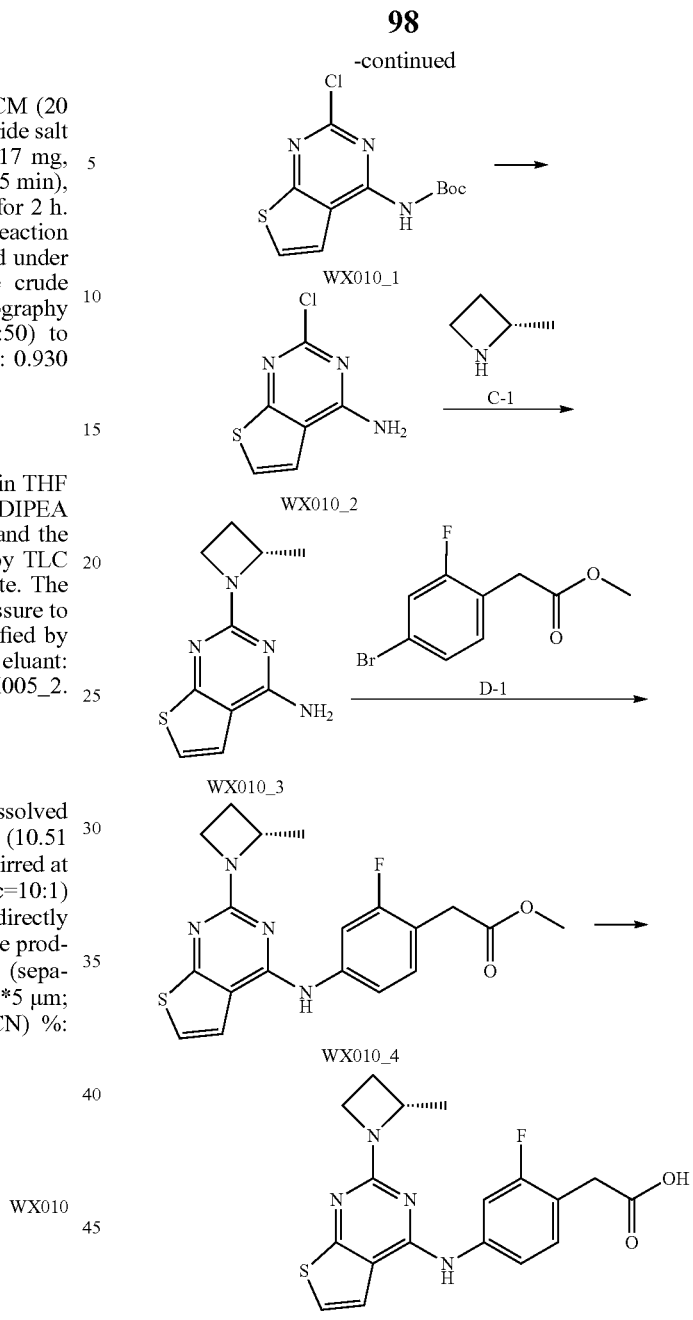

Step 1: Synthesis of Compound WX010_1

To a 10 mL thumb bottle, A-3 (5 g, 24.38 mmol) and tert-butyl carbamate (4.28 g, 36.57 mmol) were added and dissolved with THF (50 mL), and purged with nitrogen, Cs$_2$CO$_3$ (23.83 g, 73.15 mmol), Pd(dba)$_2$ (701.01 mg, 1.22 mmol) and Xantphos (705.41 mg, 1.22 mmol, 0.05 eq) were added, and purged with nitrogen, and the reaction was stirred at 80° C. for 12 h. The reaction was added to 60 mL water, and extracted with DCM (60 mL×2). The organic phases were combined, washed with saturated brine (60 mL), and rotary-evaporated to dryness to afford a crude product. The crude product was purified by automated column chromatography (100-200 mesh, eluant: PE:EtOAc=100:1-100:50) to afford WX010_1.

¹H NMR (400 MHz, DMSO-d6) δ=10.74 (s, 1H), 7.82 (d, J=6.3 Hz, 1H), 7.74 (d, J=6.0 Hz, 1H), 1.52 (s, 9H).

Step 2: Synthesis of Compound WX010_2

To a 100 mL eggplant-shaped flask, WX010_1 (5 g, 17.50 mmol) was added and dissolved with DCM (50 mL), and then TFA (71.76 g, 629.32 mmol) was slowly added, and the reaction was stirred at 20° C. for 12 h. The reaction liquid was directly rotary-evaporated to dryness, added with ethyl acetate (50 mL), and washed with saturated sodium bicarbonate solution (30 mL×2). The organic phase was rotary-evaporated to dryness to afford WX010_2. ¹H NMR (400 MHz, DMSO-d6) δ=8.02 (br s, 2H), 7.62-7.52 (m, 2H).

Step 3: Synthesis of Compound WX010_3

To a 10 mL thumb bottle, WX010_2 (3 g, 16.16 mmol) and C-1 (1.24 g, 24.24 mmol) were added and dissolved with DMF (30 mL), the temperature was lowered to 0° C., DIPEA (6.27 g, 48.48 mmol) was added, and the reaction was stirred at 80° C. for 12 h. The reaction liquid was added to 20 mL water, and extracted with DCM (20 mL×2). The organic phases were combined and washed with saturated brine (20 mL). The organic phase was rotary-evaporated to dryness to afford a crude product. The crude product was purified by automated column chromatography (100-200 mesh, eluant: PE:EtOAc=100:1-100:50) to afford WX010_3. ¹H NMR (400 MHz, CDCl₃) δ=6.96 (d, J=6.0 Hz, 1H), 6.82 (d, J=6.0 Hz, 1H), 5.36-4.97 (m, 2H), 4.59-4.42 (m, 1H), 4.17-3.91 (m, 2H), 2.42 (dtd, J=4.9, 8.6, 10.8 Hz, 1H), 1.97 (tdd, J=6.7, 8.9, 10.7 Hz, 1H), 1.55 (d, J=6.3 Hz, 3H).

Step 4: Synthesis of Compound WX010_4

Compound WX010_3 (220 mg, 1.01 mmol), D-1 (245 mg, 1.01 mmol), and cesium carbonate (989.60 mg, 3.04 mmol) were added to THF (5 mL) in a 10 mL thumb bottle under N₂ protection, followed by addition of Pd₂(dba)₃ (46.35 mg, 50.62 μmol) and Xantphos (29.29 mg, 50.62 μmol), and the reaction was stirred at 70° C. for 12 h. LCMS showed that the reaction was complete. The reaction liquid was filtered and washed with EtOAc (20 mL). After the filtrate was washed with water (20 mL), the organic phase was directly rotary-evaporated to dryness. The crude product was purified by automated column chromatography (100-200 mesh, eluant: PE:EtOAc=100:1-100:40) to afford Compound WX010_4.

Step 5: Synthesis of Compound WX010

To a 10 mL thumb bottle, Compound WX010_4 (68 mg, 183.56 μmol) was added and dissolved with THF (2 mL) and H₂O (2 mL), then LiOH·H₂O (7.70 mg, 183.56 μmol) was added, and the reaction was stirred at 20° C. for 1 h. LCMS showed that the reaction was complete. The reaction liquid was directly rotary-evaporated to dryness, dissolved by adding 3 mL MeOH, and filtered. The filtrate was purified by Prep-HPLC (separation method: Welch Xtimate C18 150 mm*25 mm*5 μm; Mobile phase: [water (0.225% FA)-ACN]; B (ACN) %: 45%-75%, 8 min) to afford Compound WX010.

Examples in the following table were synthesized with reference to the synthetic method in Example 10 (replacing Compound D-1 with fragment D in Step 1).

| Example | Fragment D | Structure of the target compound | Compound No. |
|---|---|---|---|
| 11 | 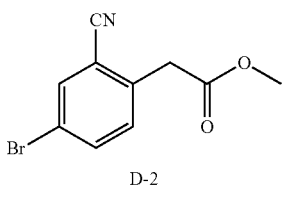 D-2 | 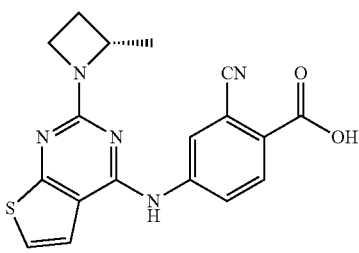 [SMILES: C[C@H]1CCN1c1nc(Nc2ccc(C(=O)O)c(C#N)c2)c2ccsc2n1] | WX011 |
| 12 | 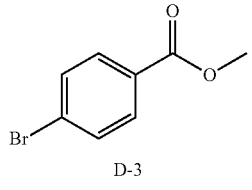 D-3 | 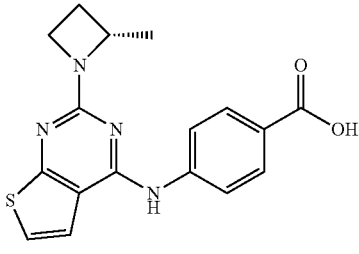 [SMILES: C[C@H]1CCN1c1nc(Nc2ccc(C(=O)O)cc2)c2ccsc2n1] | WX012 |
| 13 | 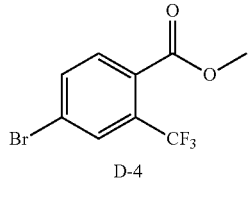 D-4 | 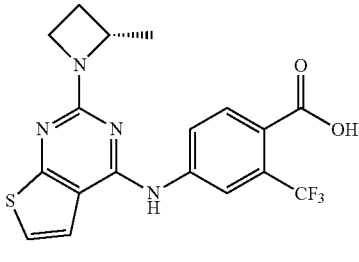 [SMILES: C[C@H]1CCN1c1nc(Nc2ccc(C(=O)O)c(C(F)(F)F)c2)c2ccsc2n1] | WX013 |

-continued
| Example | Fragment D | Structure of the target compound | Compound No. |
|---|---|---|---|
| 14 | 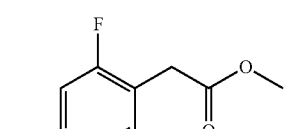 D-5 | 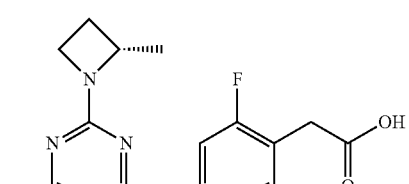 | WX014 |
| 15 | 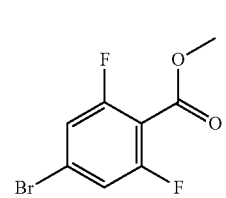 D-6 | 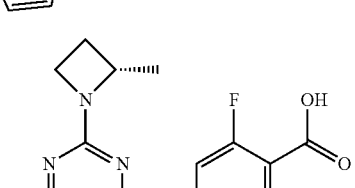 | WX015 |
Example 16
WX016
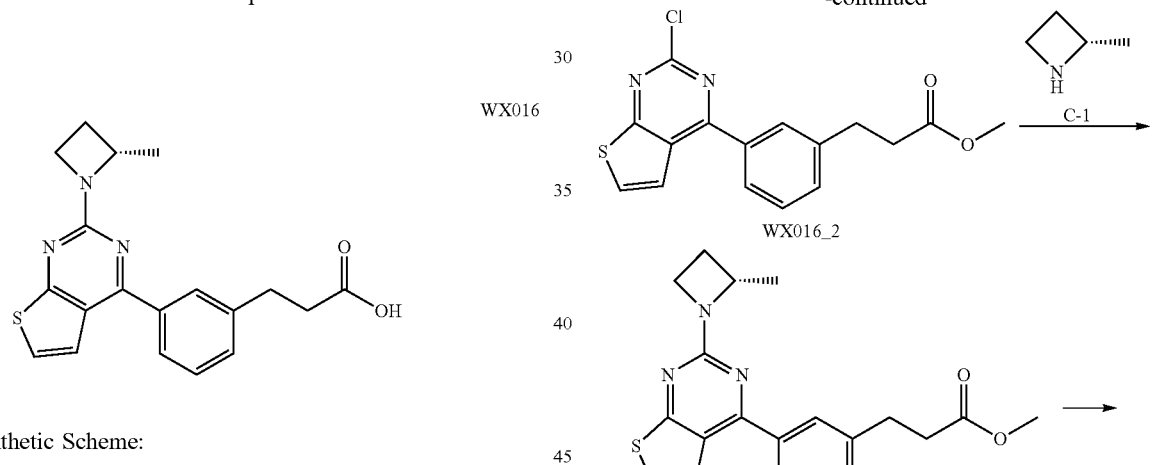
Synthetic Scheme:
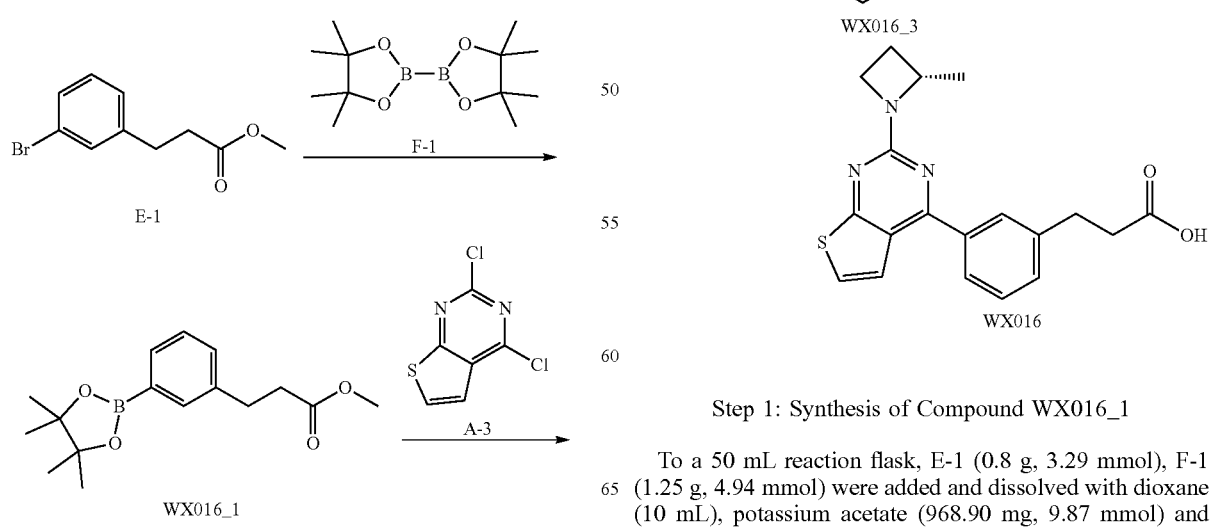
Step 1: Synthesis of Compound WX016_1
To a 50 mL reaction flask, E-1 (0.8 g, 3.29 mmol), F-1 (1.25 g, 4.94 mmol) were added and dissolved with dioxane (10 mL), potassium acetate (968.90 mg, 9.87 mmol) and Pd(dppf)Cl$_2$ (134.37 mg, 183.64 μmol) were added, and the reaction was stirred at 90° C. for 12 h. LCMS showed that the reaction was completed. The reaction liquid was added with 20 mL water, and extracted with EtOAc (20 mL×2). The organic phases were combined, washed with saturated brine (20 mL), and then rotary-evaporated to dryness. The crude product was purified by automated column chromatography (100-200 mesh, eluant: PE:EtOAc=100:1-100:10) to afford Compound WX016_1. $^1$H NMR (400 MHz, CDCl$_3$) δ7.61-7.55 (m, 2H), 7.25-7.21 (m, 2H), 3.60 (s, 3H), 2.89 (t, J=8.0 Hz, 2H), 2.62-2.51 (m, 2H), 1.27 (s, 12H).

Step 2: Synthesis of Compound WX016_2

To a 50 mL reaction flask, Compound WX016_1 (0.2 g, 689.27 μmol) and A-3 (0.19 g, 921.76 μmol) were added and dissolved in toluene (1 mL)/EtOH (0.5 mL)/H$_2$O (0.5 mL), K$_2$CO$_3$ (254.79 mg, 1.84 mmol, 2 eq) and Pd(PPh$_3$)$_4$ (53.26 mg, 46.09 μmol) were added, and the reaction was stirred at 90° C. for 9 h. LCMS detected the product MS. The reaction Step 4: Synthesis of Compound WX016

To a 10 mL thumb bottle, Compound WX016_3 (115 mg, 316.31 μmol) was added and dissolved with THF (2 mL) and H$_2$O (2 mL), then LiOH·H$_2$O (13.27 mg, 316.31 μmol) was added, and the reaction was stirred at 20° C. for 12 h. LCMS showed the reaction was complete. The reaction liquid was directly rotary-evaporated to dryness, dissolved by addition of MeOH (3 mL) and filtered. The filtrate was purified by Prep-HPLC (separation method: Welch Xtimate C18 150 mm*25 mm*5 μm; Mobile phase: [water (0.225% FA)-ACN]; B(ACN) %: 45%-75%, 8 min) to afford Compound WX016.

Examples in the following table were synthesized with reference to the synthetic method in Example 16 (replacing Compound E-1 with fragment E in Step 1).

| Example | Fragment E | Structure of the target compound | Compound No. |
|---|---|---|---|
| 17 | 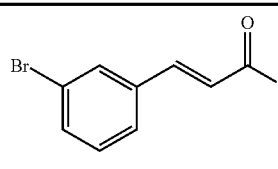 E-2 | 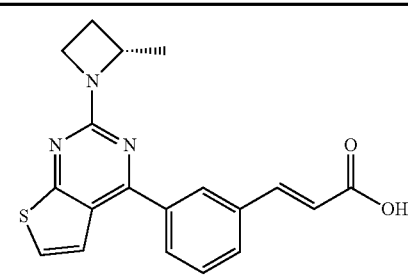 | WX017 |
| 22 | 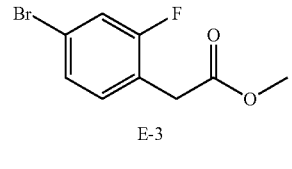 E-3 | 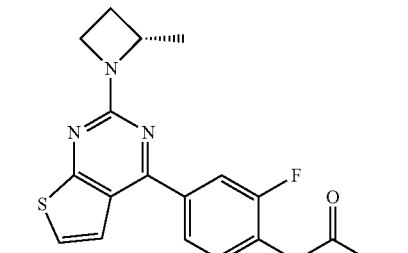 | WX022 | was added to 20 mL water, and extracted with EtOAc (20 mL×2). The organic phases were combined, washed with saturated brine (20 mL). The organic phase was rotary-evaporated to dryness. The crude product was purified by automated column chromatography (100-200 mesh, eluant: PE:EtOAc=100:1-100:40) to afford Compound WX016_2.

Step 3: Synthesis of Compound WX016_3

To a 10 mL thumb bottle, Compound WX016_2 (115 mg, 348.11 μmol) and hydrochloride salt of C-1 (74.47 mg, 696.23 μmol) were added and dissolved with THF (1 mL), then DIPEA (121.27 mL, 696.23 μmol) was added, and the reaction was stirred at 70° C. for 9 h. LCMS showed that the reaction was complete. The reaction liquid was directly rotary-evaporated to dryness to afford crude WX016-3. The crude product was used directly in the next reaction.

Example 33

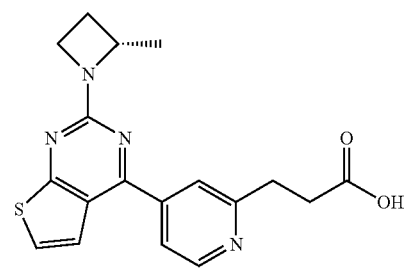

WX033

Synthetic Scheme:

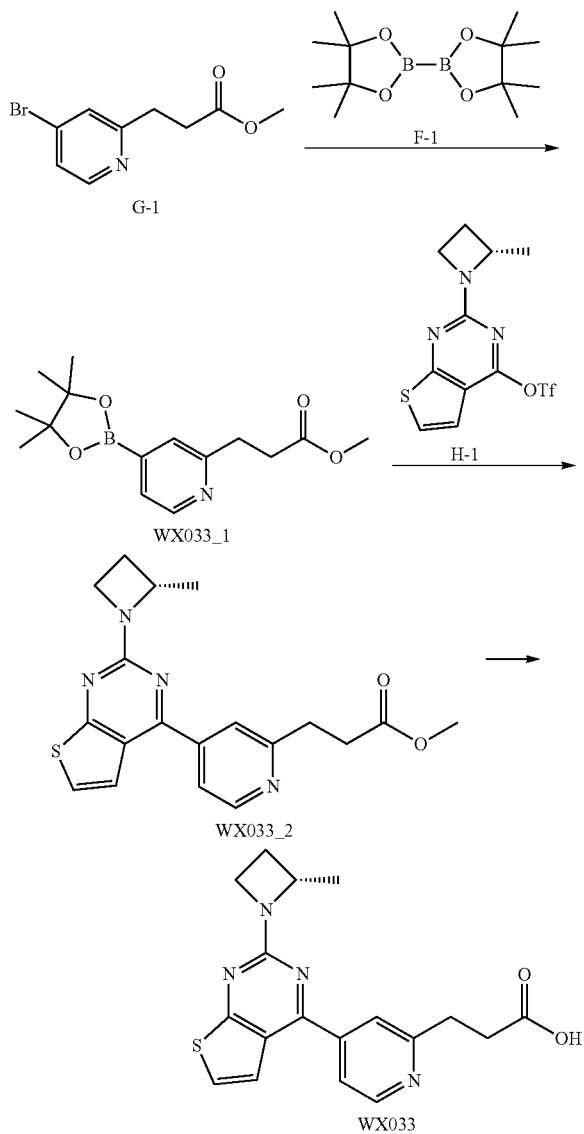

Step 1: Synthesis of Compound WX033_1

To a 50 mL reaction flask, G-1 (200 mg, 819.39 µmol) and F-1 (312.11 mg, 1.23 mmol) were added and dissolved with dioxane (10 mL), potassium acetate (160.83 mg, 1.64 mmol) and Pd(dppf)Cl$_2$ (59.96 mg, 81.94 µmol) were added, and the reaction was stirred at 90° C. for 12 h. LCMS showed that the reaction was completed. The reaction liquid was added with 20 mL water, and extracted with EtOAc (20 mL×2). The organic phases were combined, washed with saturated brine (20 mL), and rotary-evaporated to dryness. The crude Compound WX033_1 was used directly in the next step without purification.

Step 2: Synthesis of Compound WX033_2

To a 50 mL reaction flask, Compound WX033_1 (197.62 mg, 416.03 µmol) and H-1 (140 mg, 396.22 µmol) were added and dissolved with dioxane (8 mL), K$_3$PO$_4$ (2 M, 396.22 µL) and Pd(dppf)Cl$_2$ (28.99 mg, 39.62 µmol) were added, and the reaction was stirred at 90° C. for 4 h. LCMS detected the product MS. The reaction was added to 20 mL water, and extracted with EtOAc (20 mL×2). The organic phases were combined, washed with saturated brine (20 mL), and rotary-evaporated to dryness. The crude product was purified by automated column chromatography (100-200 mesh, eluant: PE:EtOAc=100:1-100:50) to afford Compound WX033_2. $^1$H NMR (400 MHz, CDCl$_3$) δ 8.70 (d, J=5.2 Hz, 1H), 7.71-7.67 (m, 1H), 7.63-7.61 (m, 1H), 7.29 (s, 1H), 7.07 (d, J=6.0 Hz, 1H), 4.63-4.58 (m, 1H), 4.25-4.15 (m, 2H), 3.70 (s, 3H), 3.25 (t, J=7.6 Hz, 2H), 2.89 (t, J=7.6 Hz, 2H), 2.54-2.49 (m, 1H), 2.04-2.00 (m, 1H), 1.62 (d, J=6.4 Hz, 3H).

Step 3: Synthesis of Compound WX033

To a 10 mL thumb bottle, Compound WX033_2 (150 mg, 272.76 µmol) was added and dissolved with THF (2 mL) and H$_2$O (2 mL), then sodium hydroxide (2 M, 681.91µ) was added, and the reaction was stirred at 20° C. for 12 h. LCMS showed that the reaction was complete. The reaction liquid was directly rotary-evaporated to dryness, dissolved by addition of MeOH (3 mL) and filtered. The filtrate was purified by Prep-HPLC (separation method: Welch Xtimate C18 150 mm*25 mm*5 µm; Mobile phase: [water (0.225% FA)-ACN]; B(ACN) %: 45%-75%, 8 min) to afford Compound WX033. $^1$H NMR (400 MHz, CDCl$_3$) δ 8.69-8.60 (m, 1H), 7.88-7.79 (m, 1H), 7.77-7.69 (m, 1H), 7.48-7.39 (m, 1H), 7.32-7.23 (m, 1H), 4.68-4.55 (m, 1H), 4.24-4.04 (m, 2H), 3.22 (t, J=7.2 Hz, 2H), 2.84 (t, J=7.2 Hz, 2H), 2.63-2.48 (m, 1H), 2.14-2.03 (m, 1H), 1.61 (d, J=6.4 Hz, 3H).

Examples in the following table were synthesized with reference to the synthetic method in Example 33 (replacing Compound G-1 with fragment G in Step 1).

| Example | Fragment G | Target compound structure | Compound No. |
|---|---|---|---|
| 39 | G-2 | | WX039 |

-continued

| Example | Fragment G | Target compound structure | Compound No. |
|---|---|---|---|
| 47 | 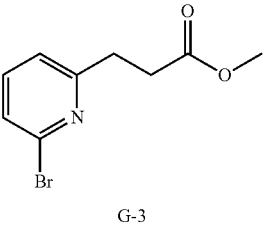<br>G-3 | 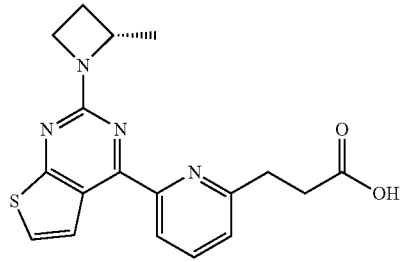 [SMILES: C[C@H]1CCN1c1nc(-c2cccc(CCC(=O)O)n2)c2ccsc2n1] | WX047 |
| 48 | 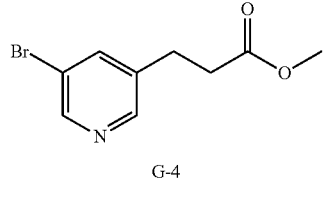<br>G-4 | 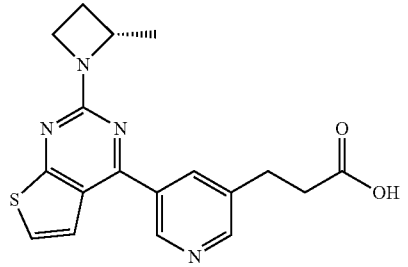 [SMILES: C[C@H]1CCN1c1nc(-c2cncc(CCC(=O)O)c2)c2ccsc2n1] | WX048 |

The $^1$H NMR and MS data for each Example are shown in Table 1:

TABLE 1

$^1$H NMR and MS Data

| Example | Compound No. | $^1$H NMR | MS m/z: Calculated (M)/ Found (M + H) |
|---|---|---|---|
| 1 | WX001 | $^1$H NMR (400 MHz, CD$_3$OD) δ 8.45(s, 1H), 4.76-4.53(m, 2H), 4.49-4.40(m, 1H), 4.14(m, 1H), 4.02-3.90(m, 2H), 3.60(m, 1H), 2.46-2.35(m, 1H), 2.21(m, 2H), 2.02-1.90(m, 1H), 1.57(m, 2H), 1.52(d, J = 6.0 Hz, 3H), 0.89(m, 1H) | 345.1/346.3 |
| 2 | WX002 | $^1$H NMR (400 MHz, CD$_3$OD) δ 8.47(s, 1H), 4.61(br s, 1H), 4.40-4.52(m, 1H), 4.21(br s, 1H), 3.87-4.06(m, 3H), 3.63(br s, 1 H), 2.36-2.53(m, 1H), 2.22(br s, 2H), 1.93-2.04(m, 1H), 1.58(br s, 2H), 1.54(d, J = 6.27 Hz, 3H), 0.91(dt, J = 6.78, 3.64 Hz, 1H) | 345.1/346.3 |
| 3 | WX003 | $^1$H NMR (400 MHz, CD$_3$OD) δ 8.65(s, 1H), 7.80(br d, J = 8.3 Hz, 2H), 7.32(br d, J = 8.3 Hz, 2H), 4.60-4.48(m, 1H), 4.12-3.96(m, 2H), 3.60(s, 2H), )2.57-2.42(m, 1H), 2.07-1.98(m, 1H), 1.57(br d, J = 6.3 Hz, 3H) | 355.1/356.4 |
| 4 | WX004 | $^1$H NMR (400 MHz, CD$_3$OD) δ 12.10(br s, 1H), 7.39(d, J = 6.0 Hz, 1H), 6.98(d, J = 6.0 Hz, 1H), 4.37-4.27(m, 1H), 4.03-3.93(m, 2H), 3.90-3.80(m, 2H), 3.80-3.65(m, 2H), 2.36-2.29(m, 1H), 2.26(br d, J = 7.2 Hz, 2H), 1.90(quin, J = 8.4 Hz, 1H), 1.62(br s, 2H), 1.45(d, J = 6.0 Hz, 3H), 0.75(td, J = 3.6, 6.8 Hz, 1H) | 344.1/344.9 |
| 5 | WX005 | $^1$H NMR (400 MHz, DMSO-d$_6$) δ 8.65(s, 1 H), 4.67(br s, 1 H), 4.02-4.49(m, 3 H), 3.71-3.87(m, 2 H), 3.39-3.45(m, 2 H), 2.23(br s, 2 H), 1.99(br s, 1 H), 1.55(br d, J = 6.13 Hz, 3 H), 1.49(br s, 2 H), 0.72(dt, J = 6.72, 3.46 Hz, 1 H) | 345.1/346.3 |
| 6 | WX006 | $^1$H NMR (400 MHz, CD$_3$OD) δ 7.81(d, J = 8.5 Hz, 2H), 7.49(d, J = 6.0 Hz, 1H), 7.27(d, J = 8.5 Hz, 2H), 7.01(d, J = 6.0 Hz, 1H), 4.54-4.42(m, 1H), 4.11-3.92(m, 2H), 3.59(s, 2H), 2.55-2.39(m, 1H), 2.07-1.97(m, 1H), 1.54(d, J = 6.0 Hz, 3H) | 345.1/355.2 |
| 7 | WX007 | $^1$H NMR (400 MHz, CD$_3$OD) δ 7.60(d, J = 8.5 Hz, 2H), 7.37(d, J = 8.3 Hz, 2H), 6.97(s, 1H), 4.67-4.55(m, 1H), 4.26-4.10(m, 2H), 3.66(s, 2H), 2.72(s, 3H), 2.66-2.54(m, 1H), 2.15-2.03(m, 1H), 1.45(d, J = 6.3 Hz, 3H) | 368.1/369.0 |

TABLE 1-continued $^1$H NMR and MS Data

| Example | Compound No. | $^1$H NMR | MS m/z: Calculated (M)/ Found (M + H) |
|---|---|---|---|
| 8 | WX008 | $^1$H NMR (400 MHz, CD$_3$OD) δ 6.97(s, 1H), 4.79-4.68(m, 1H),4.46(br d, J = 11.8Hz, 1H), 4.37(br d, J = 11.8 Hz, 1H), 4.27-4.12(m, 2H), 3.93-3.80(m, 2H), 2.71-2.61(m, 1H), 2.51(s, 3H), 2.36-2.26(m, 2H), 2.19-2.08(m, 1H), 1.61(d, J = 6.3 Hz, 5H), 0.63(tt, J = 3.4, 7.0 Hz, 1H) | 358.1/359.0 |
| 9 | WX009 | $^1$H NMR (400 MHz, CD$_3$OD) δ 7.12(d, J = 5.8 Hz, 1H), 6.92(d, J = 6.0 Hz, 1H), 4.55-4.28(m, 5H), 4.03-3.88(m, 2H), 2.47-2.33(m, 1H), 2.01-1.91(m, 1H), 1.86-1.75(m, 1H), 1.50(dd, J = 2.1, 6.1 Hz, 3H), 1.31(t, J = 5.0 Hz, 1H), 1.16(dd, J = 4.8, 8.3 Hz, 1H) | 330.1/331.1 |
| 10 | WX010 | $^1$H NMR (400 MHz, CD$_3$OD) δ 7.96(dd, J = 1.8, 12.8 Hz, 1H), 7.58-7.41(m, 2H), 7.24(t, J = 8.5 Hz, 1H), 7.05(d, J = 6.0 Hz, 1H), 4.61-4.46(m, 1H), 4.19-3.93(m, 2H), 3.64(s, 2H), 2.57-2.39(m, 1H), 2.07-1.94(m, 1H), 1.56(d, J = 6.3 Hz, 3H) | 372.1/373.2 |
| 11 | WX011 | $^1$H NMR (400 MHz, DMSO-d$_6$) δ 9.90(s, 1H), 8.78(s, 1H), 8.13-7.99(m, 2H), 7.68(d, J = 6.0 Hz, 1H), 7.21(d, J = 6.0 Hz, 1H), 4.51-4.40(m, 1H), 4.03-3.92(m, 2H), 2.45-2.38(m, 1H), 2.02-1.90(m, 1H), 1.52(br d, J = 6.0 Hz, 3H) | 365.1/366.1 |
| 12 | WX012 | $^1$H NMR (400 MHz, CD$_3$OD) δ 8.05-7.96(m, 4H), 7.57(d, J = 5.8 Hz, 1H), 7.11(d, J = 6.0 Hz, 1H), 4.64-4.53(m, 1H), 4.21-4.01(m, 2H), 2.63-2.43(m, 1H), 2.14-1.97(m, 1H), 1.58(d, J = 6.0 Hz, 3H) | 340.1/341.2 |
| 13 | WX013 | $^1$H NMR (400 MHz, CD$_3$OD) δ 8.68(s, 1H), 8.04(dd, J = 2.0, 8.5 Hz, 1H), 7.88(d, J = 8.5 Hz, 1H), 7.55(d, J = 6.0 Hz, 1H), 7.08(d, J = 6.0 Hz, 1H), 4.64-4.47(m, 1H), 4.21-3.95(m, 2H), 2.61-2.45(m, 1H), 2.11-1.94(m, 1H), 1.55(d, J = 6.3 Hz, 3H) | 408.1/109.2 |
| 14 | WX014 | $^1$H NMR (400 MHz, CD$_3$OD) δ 7.65(br d, J = 10.0 Hz, 2H), 7.47(d, J = 6.0 Hz, 1H), 7.03(d, J = 6.0 Hz, 1H), 4.59-4.40(m, 1H), 4.16-3.91(m, 2H), 3.64(s, 1H), 3.75-3.58(m, 1H), 3.38-3.28(m, 1H), 3.26(br s, 1H), 2.56-2.41 (m, 1H), 2.04-1.93(m, 1H), 1.56(d, J = 6.3 Hz, 3H) | 390.1/391.2 |
| 15 | WX015 | $^1$H NMR (400 MHz, CD$_3$OD) δ 7.77(d, J = 11.3 Hz, 2H), 7.54(d, J = 6.0 Hz, 1H), 7.1 1(d, J = 6.0 Hz, 1H), 4.65-4.53(m, 1H), 4.66-4.53(m, 1H), 4.17-4.12(m, 1H), 4.10-4.02(m, 1H), 2.60-2.50(m, 1H), 2.10-2.03(m, 1H), 1.61(d, J = 6.3 Hz, 3H) | 376.1/377.0 |
| 16 | WX016 | $^1$H NMR (400 MHz, CD$_3$OD) δ 7.78-7.72(m, 2H), 7.50-7.42(m, 2H), 7.37(d, J = 6.4 Hz, 1H), 7.20(d, J = 6.0 Hz, 1H), 4.65-4.56(m, 1H), 4.19-4.12(m, 1H), 4.12-4.05(m, 1H), 3.05(t, J = 7.6 Hz, 2H), 2.70(t, J = 7.6 Hz, 2H), 2.52(dtd, J = 5.2, 8.8, 10.8 Hz, 1H), 2.11-2.04(m, 1H), 1.61(d, J = 6.4 Hz, 3H) | 353.1/354.1 |
| 17 | WX017 | $^1$H NMR (400 MHz, CD$_3$OD) δ 8.10(s, 1H), 7.95(d, J = 7.6 Hz, 1H), 7.84-7.74(m, 2H), 7.67-7.59(m, 1H), 7.38(d, J = 6.4 Hz, 1H), 7.25(d, J = 6.0 Hz, 1H), 6.59(d, J = 16.0 Hz, 1H), 4.66-4.57(m, 1H), 4.22-4.08(m, 2H), 2.60-2.47(m, 1H), 2.12-2.05(m, 1H), 1.62(d, J = 6.4 Hz, 3H) | 351.1/352.1 |
| 18 | WX018 | $^1$H NMR (400 MHz, CD$_3$OD δ 7.13(d, J = 6.02 Hz, 1H), 6.94(d, J = 6.02 Hz, 1H), 4.31-4.62(m, 3H), 3.85-4.13(m, 4H), 2.97-3.21(m, 1H), 2.74(d, J = 7.78 Hz, 2H), 2.43(dtd, J = 10.85, 8.56, 8.56, 4.89 Hz, 1H), 1.90-2.08(m, 1H), 1.52(d, J = 6.27 Hz, 3H) | 318.1/319.0 |
| 19 | WX019 | $^1$H NMR (400 MHz, CD$_3$OD) δ 7.12(d, J = 6.0 Hz, 1H), 6.93(d, J = 6.0 Hz, 1H), 4.56-4.31(m, 5H), 4.10-3.86(m, 2H), 2.43(dtd, J = 4.8, 8.5, 10.8 Hz, 1H), 2.06-1.89(m, 2H), 1.52(d, J = 6.3 Hz, 3H), 1.34(d, J = 7.3 Hz, 2H) | 330.1/331.1 |
| 20 | WX020 | $^1$H NMR (400 MHz, CD$_3$OD) δ 7.11(d, J = 6.0 Hz, 1H), 6.93(d, J = 6.0 Hz, 1H), 4.56-4.31(m, 5H), 4.10-3.84(m, 2H), 2.52-2.35(m, 1H), 2.08-1.85(m, 2H), 1.52(d, J = 6.0 Hz, 3H), 1.34(d, J = 7.5 Hz, 2H) | 330.1/331.1 |
| 21 | WX021 | $^1$H NMR (400 MHz, CD$_3$OD) δ 4.52-4.63(m, 1H), 4.38(t, J = 2.76 Hz, 2H), 3.98-4.15(m, 6H), 3.69-3.84(m, 2H), 2.64-2.82(m, 1H), 2.49-2.61(m, 1H), 2.33(d, J = 7.03 Hz, 2H), 1.99-2.14(m, 2H), 1.50-1.56(m, 3H), 1.35-1.47(m, 1H) | 346.1/347.2 |
| 22 | WX022 | $^1$H NMR (400 MHz, DMSO-d$_6$) δ 7.67(s, 1H), 7.56(br d, J = 8.8 Hz, 1H), 7.43(s, 2H), 7.35(br d, J = 9.5 Hz, 1H), 4.58-4.46(m, 1H), 4.10-3.97(m, 2H), 3.78(s, 2H), 2.48-2.39(m, 1H), 2.06-1.94(m, 1H), 1.54(d, J = 6.3 Hz, 3H) | 357.1/358.2 |

TABLE 1-continued

<sup>1</sup>H NMR and MS Data

| Example | Compound No. | <sup>1</sup>H NMR | MS m/z: Calculated (M)/ Found (M + H) |
|---|---|---|---|
| 23 | WX023 | <sup>1</sup>H NMR (400 MHz, CDCl<sub>3</sub>) δ 8.13(s, 1H), 4.58-4.41(m, 1H), 4.15(t, J = 11.0 Hz, 2H), 4.10-3.96(m, 2H), 3.80(br t, J = 9.5 Hz, 2H), 2.46-2.33(m, 3H), 2.03-1.93(m, 1H), 1.68(br s, 2H), 1.56(d, J = 6.0 Hz, 3H), 1.03(tt, J = 3.5, 7.0 Hz, 1H) | 369.1/370.1 |
| 24 | WX024 | <sup>1</sup>H NMR (400 MHz, CD<sub>3</sub>OD) δ 7.94(br d, J = 8.5 Hz, 1H), 7.50-7.41(m, 1H), 7.23-7.15(m, 1H), 4.72-4.62(m, 1H), 4.40-4.30(m, 2H), 4.30-4.20(m, 1H), 4.28-4.08(m, 1H), 4.01(br t, J = 10.2 Hz, 2H), 2.60-2.49(m, 1H), 2.28(br d, J = 7.0 Hz, 2H), 2.10-2.00(m, 1H), 1.71 (br s, 2H), 1.58(d, J = 6.3 Hz, 3H), 0.81(td, J = 3.4, 6.6 Hz, 1H) | 356.1/357.1 |
| 25 | WX025 | <sup>1</sup>H NMR (400 MHz, CD<sub>3</sub>OD) δ 7.39(d, J = 6.1 Hz, 1H), 6.92(d, J = 6.1 Hz, 1H), 4.57-4.43(m, 1H), 4.12-4.01(m, 2H), 3.94(td, J = 8.4, 16.4 Hz, 2H), 3.76(br d, J = 7.3 Hz, 1H), 3.43(brt, J = 9.4 Hz, 1H), 2.68(td, J = 7.4, 14.8 Hz, 1H), 2.51(d, J = 7.3 Hz, 2H), 2.47-2.39(m, 1H), 2.26(br d, J = 4.8 Hz, 1H), 2.07-1.93(m, 1H), 1.82-1.70(m, 1H), 1.54(d, J = 6.1 Hz, 3H) | 332.1/333.0 |
| 26 | WX026 | <sup>1</sup>H NMR (400 MHz, CDCh) δ 4.43-4.25(m, 1H), 4.03-3.90(m, 2H), 3.90-3.82(m, 2H), 3.62-3.36(m, 2H), 3.36-3.21(m, 2H), 3.14(br t, J = 7.8 Hz, 2H), 2.31(br d, J = 4.9 Hz, 1H), 2.26(br d, J = 7.3 Hz, 2H), 1.99-1.78(m, 1H), 1.44(br s, 2H), 1.40(d, J = 6.1 Hz, 3H), 0.89(td, J = 3.6, 6.8 Hz, 1H) | 346.1/347.1 |
| 27 | WX027 | <sup>1</sup>H NMR (400 MHz, CD<sub>3</sub>OD) δ 7.38(t, J = 6.0 Hz, 1H), 6.90(d, J = 6.0 Hz, 1H), 4.46(sxt, J = 6.4 Hz, 1H), 4.06-3.87(m, 5H), 3.85-3.68(m, 1H), 2.49-2.32(m, 1H), 2.30-1.88(m, 4H), 1.53(d, J = 6.0 Hz, 3H), 1.37-1.33(m, 1H), 1.27(brs, 1H) | 344.1/345.1 |
| 28 | WX028 | <sup>1</sup>H NMR (400 MHz, CD<sub>3</sub>OD) δ 7.21(d, J = 3.3 Hz, 1H), 4.76-4.64(m, 1H), 4.29-3.78(m, 6H), 2.69-2.58(m, 1H), 2.37(d, J = 7.0 Hz, 2H), 2.17-2.07(m, 1H), 1.77(br s, 1H), 1.87-1.62(m, 1H), 1.60(d, J = 6.3 Hz, 3H), 0.88(tt, J = 3.5, 7.1 Hz, 1H) | 362.1/363.0 |
| 29 | WX029 | <sup>1</sup>H NMR (400 MHz, CD<sub>3</sub>OD) δ 7.53(s, 1H), 4.74-4.63(m, 1H), 4.29-3.74(m, 3H), 4.29-3.74(m, 1H), 4.29-3.74(m, 1H), 4.29-3.74(m, 1H), 2.67-2.57(m, 1H), 2.37(d, J = 7.0 Hz, 2H), 2.17-2.07(m, 1H), 1.77(br s, 2H), 1.59(d, J = 6.3 Hz, 3H), 0.88(tt, J = 3.5, 7.0 Hz, 1H) | 378.1/379.0 |
| 30 | WX030 | <sup>1</sup>H NMR (400 MHz, CD<sub>3</sub>OD) δ 7.21(d, J = 3.5 Hz, 1H), 4.75.4.64(m, 1H), 4.26-3.74(m, 6H), 2.70-2.58(m, 1H), 2.37(d, J = 7.3 Hz, 2H), 2.19-2.07(m, 1H), 1.77(br s, 2H), 1.60(d, J = 6.3 Hz, 3H), 0.88(tt, J = 3.5, 7.0 Hz, 1H) | 362.1/363.0 |
| 32 | WX032 | <sup>1</sup>H NMR (400 MHz, CD<sub>3</sub>OD) δ 7.30(d, J = 6.0 Hz, 1H), 6.93(d, >6.0 Hz, 1H), 4.88-4.77(m, 1H), 4.54-4.41(m, 1H), 4.08-3.88(m, 2H), 3.19-3.03(m, 1H), 2.79-2.62(m, 2H), 2.51-2.36(m, 3H), 2.03-1.90(m, 1H), 1.56(d, >6.3 Hz, 3H) | 318.1/319.1 |
| 33 | WX033 | <sup>1</sup>H NMR (400 MHz, CD<sub>3</sub>OD) δ 8.69-8.60(m, 1H), 7.88-7.79(m, 1H), 7.77-7.69(m, 1H), 7.48-7.39(m, 1H), 7.32-7.23(m, 1H), 4.68-4.55(m, 1H), 4.24-4.04(m, 2H), 3.22(t, J = 7.2 Hz, 2H), 2.84(t, J = 7.2 Hz, 2H), 2.63-2.48(m, 1H), 2.14-2.03(m, 1H), 1.61(d, J = 6.4 Hz, 3H) | 354.1/354.8 |
| 34 | WX034 | <sup>1</sup>H NMR (400 MHz, CD<sub>3</sub>OD) δ ppm 7.58(d, J = 8.28 Hz, 1H), 7.48(dd, >10.79, 8.03 Hz, 1H), 7.22(td, >8.03, 5.02 Hz, 1H), 4.43-4.80(m, 5H), 4.27(td, >9.16, 5.52 Hz, 1H), 4.08-4.19(m, 1H), 2.49-2.65(m, 1H), 1.91-2.15(m, 2H), 1.57(dd, >6.27, 2.51 Hz, 3H), 1.27-1.40(m,2H) | 342.1/343.2 |
| 35 | WX035 | H NMR (400 MHz, CD<sub>3</sub>OD) δ ppm 4.22-4.50(m, 5H), 3.86-4.12(m, 2H), 2.88(br d, >3.76 Hz, 2H), 2.32-2.55(m,3H), 1.84-2.04(m, 2H), 1.49(dd,>6.02, 1.51 Hz, 3H), 1.22-1.37(m, 2H) | 350.1/351.1 |
| 36 | WX036 | <sup>1</sup>H NMR (400 MHz, CDCh) δ 6.84(s, 1H), 4.70(br d, J = 6.0 Hz, 2H), 4.48-4.18(m, 4H), 2.61(br d, >8.3 Hz, 1H), 2.06(br s, 2H), 1.56(dd, >2.9, 6.1 Hz, 3H), 1.51(br d, >3.8 Hz, 1H), 1.46-1.39(m, 1H), 1.46-1.39(m, 1H) | 364.1/365.0 |
| 37 | WX037 | <sup>1</sup>H NMR (400 MHz, CD<sub>3</sub>OD) δ 6.60(d, J = 4.0 Hz, 1H), 4.44.4.19(m, 5H), 4.01-3.85(m, 2H), 2.49-2.35(m, 1H), 2.03-1.89(m, 2H), 1.50(dd, J = 1.6, 6.0 Hz, 3H), 1.37-1.32(m, 2H) | 348.1/348.9 |
| 38 | WX038 | H NMR (400 MHz, CDCl<sub>3</sub>) δ 6.84(d, J = 2.5 Hz, 1H), 4.73-4.41(m, 3H), 4.37-4.09(m, 4H), 3.40-3.30(m, 1H), | 378.1/379.0 |

TABLE 1-continued

1H NMR and MS Data

| Example | Compound No. | 1H NMR | MS m/z: Calculated (M)/ Found (M + H) |
|---|---|---|---|
| 39 | WX039 | 2.63-2.50(m, 1H), 2.37-2.22(m, 3H), 2.15-1.97(m, 2H), 1.55(dd, J = 4.3, 6.0 Hz, 3H) H NMR(400 MHz, CD₃OD) δ 8.70(s, 1H), 8.45(d, J = 2.5 Hz, 1H), 7.90(s, 1H), 7.40(d, J = 6.1 Hz, 1H), 7.29(d, J = 6.1 Hz, 1H), 4.81-4.94(m, 2H),4.62(br dd, J = 6.6, 13.8 Hz, 1H), 4.21-4.07(m, 2H), 2.59-2.50(m, 1H), 2.14-2.05(m, 1H), 1.62(d, J = 6.1 Hz, 3H) | 356.1/357.2 |
| 40 | WX040 | ¹H NMR (400 MHz, CD₃OD) δ 7.63(br d, J = 8.78 Hz, 1H), 7.36-7.52(m, 1H), 7.17(br d, J = 5.02 Hz, 1H), 4.47-4.79(m, 5H), 4.03-4.32(m, 2H), 2.52(br s, 1H), 1.84-2.10(m, 2H), 1.57(d, J = 6.02 Hz, 3H), 1.18-1.41(m, 2 H) | 342.1/343.2 |
| 41 | WX041 | H NMR (400 MHz, CD₃OD) δ 7.57(br d, J = 8.28 Hz, 1H), 7.40(dd, J = 10.92, 7.91 Hz, 1H), 7.03-7.25(m, 1 H), 4.34-4.78(m, 5 H), 4.01-4.26(m, 2 H), 2.44-2.59(m, 1 H), 1.77-2.09(m, 2 H), 1.54(d, J = 6.27 Hz, 3 H), 1.05-1.36(m, 2H) | 342.1/343.2 |
| 42 | WX042 | H NMR (400 MHz, CD₃OD) δ 4.20-4.67(m, 5H),3.84-4.06(m, 2 H), 2.88(br s, 2 H), 2.31-2.59(m,3 H), 1.80-2.02(m, 2 H), 1.48(d, J = 6.27 Hz, 3 H), 1.21-1.33(m, 2 H) | 350.1/351.1 |
| 43 | WX043 | H NMR (400 MHz, CD₃OD) δ 4.23-4.67(m, 5 H), 3.84-4.07(m, 2 H), 2.88(br s, 2 H), 2.31-2.57(m, 3 H), 1.79-2.01 (m, 2 H), 1.48(d, J = 6.27 Hz, 3 H), 1.13-1.35(m, 2 H) | 350.1/351.1 |
| 44 | WX044 | H NMR (400 MHz, CDCl₃) δ 6.71(s, 1H), 4.48-4.35(m, 3H), 4.28(q, J = 8.7 Hz, 2H), 4.08-3.90(m, 2H), 2.42-2.29(m, 1H), 1.95-1.83(m, 2H), 1.43(d, J = 6.0 Hz, 3H), 1.39(t, J = 5.5 Hz, 1H), 1.28(dd, J = 5.5, 8.8 Hz, 1H) | 364.1/365.0 |
| 45 | WX045 | H NMR (400 MHz, CDCl₃) δ 6.73(s, 1H), 4.37-4.19(m, 5H), 4.00-3.83(m, 2H), 2.37-2.23(m, 1H), 1.91-1.79(m, 2H), 1.42(d, J = 6.0 Hz, 3H), 1.40-1.36(m, 1H), 1.28(dd, J = 5.4, 8.7 Hz, 1H) | 364.1/365.0 |
| 46 | WX046 | ¹H NMR (400 MHz, DMSO-d₆) δ 7.96(d, J = 5.6 Hz, 1H), 7.10(d, J = 5.6 Hz, 1H),4.37-4.23(m, 1H),4.01(br t, J = 10.4 Hz, 2H), 3.87-3.78(m, 2H), 3.74(br d, J = 10.4 Hz, 2H), 2.32(br s, 2H), 2.32(br d, J = 8.0 Hz, 1H), 2.27(br d, J = 7.2 Hz, 2H), 1.95-1.85(m, 1H), 1.63(br s, 2H), 1.46(d, J = 6.4 Hz, 3H), 0.85-0.76(m, 1H) | 344.1/345.1 |
| 47 | WX047 | ¹H NMR (400 MHz, CDCl₃) δ 8.23(d, J = 7.8 Hz, 1H), 8.12(d, J = 6.0 Hz, 1H), 7.79(t, J = 7.8 Hz, 1H), 7.31(d, J = 7.5 Hz, 1H), 7.05(d, J = 6.0 Hz, 1H), 4.70-4.59(m, 1H), 4.27-4.10(m, 2H), 3.30-3.20(m, 2H), 2.96(t, J = 7.2 Hz, 2H), 2.50(dtd, J = 5.0, 8.6, 10.9 Hz, 1H), 2.11-2.02(m, 1H), 1.64(d, J = 6.3 Hz, 3H) | 354.1/355.1 |
| 48 | WX048 | ¹H NMR (400 MHz, CD₃OD) δ 8.91(s, 1H)8.62(s, 1H), 8.27(s, 1 H), 7.40(d, J = 6.13 Hz, 1H), 7.28(d, J = 6.00 Hz, 1H), 4.51-4.78(m, 1H), 4.04-4.23(m, 2H), 3.01-3.21(m, 2H), 2.76(t, J = 7.19 Hz, 2H), 2.47-2.68(m, 1H), 2.02-2.16(m, 1H), 1.62(d, J = 6.25 Hz, 3H) | 354.1/355.1 |
| 49 | WX049 | ¹H NMR (400 MHz, CD₃OD) δ 6.87(s, 1H), 4.39-4.18(m, 4H), 4.12(br s, 1H), 3.88(dt, J = 5.2, 8.8 Hz, 1H), 3.80(q, J = 8.4 Hz, 1H), 2.36-2.23(m, 1H), 1.92-1.79(m, 1H), 1.46(d, J = 5.2 Hz, 1H), 1.39(dd, J = 1.2, 6.0 Hz, 3H), 1.18(s, 3H), 0.91(d, J = 5.2 Hz, 1H) | 378.1/379.1 |
| 50 | WX050 | ¹H NMR (400 MHz, CD₃OD) δ 7.75-7.61(m, 2H), 7.10(t, J = 7.8 Hz, 1H), 4.62(br d, J = 6.0 Hz, 4H), 4.29-4.00(m, 2H), 2.52(dtd, J = 5.3, 8.7, 10.9 Hz, 1H), 2.12-1.91(m, 2H), 1.57(dd, J = 1.8, 6.3 Hz, 3H), 1.40-1.30(m, 2H), 1.26-1.22(m, 1H) | 358.1/359.1 |
| 51 | WX051 | ¹H NMR (400 MHz, CD₃OD) δ 7.27-7.21(m, 1H), 4.80-4.60(m, 1H), 4.47-4.38(m, 1H), 4.09-3.87(m, 2H), 2.64-2.36(m, 5H), 2.10-1.88(m, 1H), 1.73-1.59(m, 1H), 1.58-1.45(m, 3H), 1.28-1.01(m, 2H) | 378.1/379.1 |
| 54 | WX054 | ¹H NMR (400 MHz, CD₃OD) δ 7.15(d, J = 6.0 Hz, 1H), 6.92(d, J = 6.0 Hz, 1H), 4.54-4.26(m, 5H), 4.09-3.87(m, 2H), 2.49-2.33(m, 2H), 2.28-2.16(m, 1H), 2.05-1.91(m, 1H), 1.52(d, J = 6.0 Hz, 3H), 1.31(quin, J = 7.3 Hz, 1H), 1.01(dd, J = 6.0, 9.0 Hz, 1H), 0.57(t, J = 5.8 Hz, 1H) | 344.1/345.1 |
| 55 | WX055 | ¹H NMR (400 MHz, CD₃OD) δ 7.16(d, J = 6.0 Hz, 1H), 6.93(d, J = 6.0 Hz, 1H), 4.53-4.27(m, 5H), 4.10-3.87(m, 2H), 2.49-2.33(m, 2H), 2.28-2.17(m, 1H), 2.06-1.91(m, 1H), 1.52(d, J = 6.0 Hz, 3H), 1.37-1.26(m, 1H), 1.01(dd, J = 6.0, 9.0 Hz, 1H), 0.57(t, J = 5.8 Hz, 1H) | 344.1/345.1 |

TABLE 1-continued

¹H NMR and MS Data

| Example | Compound No. | ¹H NMR | MS m/z: Calculated (M)/ Found (M + H) |
|---|---|---|---|
| 56 | WX056 | ¹H NMR (400 MHz, CD$_3$OD) δ 7.03(s, 1H), 4.53-4.19(m, 5H), 4.10-3.84(m, 2H), 2.49-2.33(m, 2H), 2.29-2.17(m, 1H), 1.97(tdd, J = 7.0, 8.8, 10.9 Hz, 1H), 1.51(d, J = 6.5 Hz, 3H), 1.37-1.23(m, 1H), 1.01(dd, J = 5.5, 9.0 Hz, 1H), 0.57(t, J = 5.8 Hz, 1H) | 378.1/379.1 |
| 57 | WX057 | ¹H NMR (400 MHz, CD$_3$OD) δ 7.04(s, 1H), 4.55-4.18(m, 5H), 4.08-3.87(m, 2H), 2.51-2.35(m, 2H), 2.28-2.18(m, 1H), 2.04-1.90(m, 1H), 1.51(d, J = 6.0 Hz, 3H), 1.36-1.23(m, 1H), 1.01(dd, J = 5.8, 8.8 Hz, 1H), 0.57(t, J = 5.8 Hz, 1H) | 378.1/379.1 |

BIOLOGICAL TEST DATA

Experimental Example 1: Ketohexokinase Assay (KHK Assay)

A. Main Materials

1. EnVision multilabel reader, Perkin Elmer;
2. OptiPlate 384-well microplate, Perkin Elmer, Cat. No. 6007290;
3. Recombinant Human Ketohexokinase (KHK), R&D Cat. No.: 8177-HK-020, Lot No.: DDFK0117092;
4. Fructose (D(−)-Fructose), SCR Cat. No.: 36003034; and
5. ADP-Glo kinase assay kit, Promega_Cat. No.: V9101.

B. Methods a) Kinase Reaction 1. preparation of Dilution Buffer containing 50 mM hydroxyethylpiperazine ethanethiosulfonic acid (Hepes), 140 mM KCl, 3.5 mM MgCl$_2$, and 0.01% bovine serum albumin (BSA), pH 7.4.
2. A working solution of ketohexokinase at 2.5 times concentration was prepared with Dilution Buffer, with 50 nM ketohexokinase and 12.5 mM fructose.
3. A working solution of adenosine triphosphate (ATP) at 2.5 times concentration was prepared with Dilution Buffer, with a concentration of 250 µM.
4. Each compound was diluted starting at a concentration of 500 µM, 3-fold diluted for 9 concentration points. The final concentration of the compound in the reaction system started from 10 µM and the final concentration of dimethyl sulfoxide (DMSO) was 2%.
5. A 96-well plate was prepared as a reaction plate, and was incubated at room temperature for 5 min after adding 6 µL ketohexokinase working solution at 2.5 times concentration to each well and further adding 3 µL compound working solution to each well.
6. The first well of each row was a positive control for a compound, i.e. the same volume of the buffer was added to replace the compound and ketohexokinase. The last well was a negative control for the compound, i.e. the same volume of Dilution Buffer was added instead of the compound.
7. 6 µL ATP working solution was added to each well in a 96-well reaction plate to initiate the kinase reaction. The kinase reaction was incubated in a constant temperature heater at 28° C. for 1 h.

b) ADP-Glo assay

1. A384 plate was prepared as a detection plate, and firstly 5 µL ADP-Glo reagent was added.
2. 5 µL kinase reaction mixture from the reaction plate was added to each well and incubated in a constant temperature heater at 28° C. for 30 min.
3. 10 µL kinase detection reagent was added to each well and incubated in a constant temperature heater at 28° C. for 30 min.
4. The detection plate was placed in an EnVision multi-label reader to read the chemiluminescent signal.

C. Experimental Results

TABLE 2 results of in vitro activity assay on KHK

| Compound No. | KHK IC$_{50}$ |
|---|---|
| WX001 | 180 nM |
| WX002 | 190 nM |
| WX003 | 110 nM |
| WX004 | 49 nM |
| WX005 | 650 nM |
| WX006 | 25 nM |
| WX007 | 16 nM |
| WX008 | 210 nM |
| WX009 | 100 nM |
| WX010 | 15 nM |
| WX011 | 17 nM |
| WX012 | 9.4 nM |
| WX013 | 17 nM |
| WX014 | 14 nM |
| WX015 | 6.7 nM |
| WX016 | 32 nM |
| WX017 | 20 nM |
| WX018 | 390 nM |
| WX019 | 110 nM |
| WX020 | 130 nM |
| WX021 | 160 nM |
| WX022 | 200 nM |
| WX023 | 210 nM |
| WX024 | 61 nM |
| WX025 | 240 nM |
| WX026 | 91 nM |
| WX027 | 250 nM |
| WX028 | 50 nM |
| WX029 | 28 nM |
| WX030 | 31 nM |
| WX032 | 150 nM |
| WX033 | 71 nM |
| WX034 | 110 nM |
| WX035 | 36 nM |
| WX036 | 69 nM |
| WX037 | 150 nM |

TABLE 2-continued results of in vitro activity assay on KHK

| Compound No. | KHK IC$_{50}$ |
|---|---|
| WX038 | 480 nM |
| WX039 | 36 nM |
| WX040 | 320 nM |
| WX041 | 52 nM |
| WX042 | 21 nM |
| WX043 | 28 nM |
| WX044 | 81 nM |
| WX045 | 30 nM |
| WX046 | 700 nM |
| WX047 | 630 nM |
| WX048 | 92 nM |
| WX049 | 210 nM |
| WX050 | 260 nM |
| WX051 | 69 nM |
| WX054 | 1000 nM |
| WX055 | 650 nM |
| WX056 | 360 nM |
| WX057 | 200 nM |

Conclusion: the compounds of the present invention have strong inhibitory activity against human-sourced KHK enzyme.

Experimental Example 2: Assay for Inhibition of hERG Potassium Channel

A. Main Materials

1. CHO-hERG cell line (Chinese hamster ovary cells stably expressing hERG channel), constructed in-house by Shanghai Institute of Materia Medica, Chinese Academy of Sciences;
2. Positive control compound: Cisapride, Sigma Aldrich, Cat. No.: C4740-10 mg;
3. Patch clamp amplifier Axopatch 200B, Taser International Inc.

B. Methods a) Cell Culture

CHO cells stably expressing hERG were cultured in a cell culture dish with a diameter of 35 mm, placed in an incubator at 37° C. and 5% CO$_2$, and passaged at a ratio of 1:5 every 48 hours. Formula of the culture medium: 90% F12 (Invitrogen), 10% fetal bovine serum (Gibco), 100 μg/mL G418 (Invitrogen) and 100 μg/mL Hygromycin B (Invitrogen). On the day of the assay, the cell culture medium was aspirated. After rinsed once with extracellular fluid, 0.25% Trypsin-EDTA (Invitrogen) solution was added, and digestion was performed at room temperature for 3-5 min. The digestive fluid was aspirated. After resuspended in extracellular fluid, the cells were transferred to an experimental dish for electrophysiological recording for future use.

b) Preparation of Intracellular and Extracellular Fkuids

The extracellular fluid should be prepared once a month. The intracellular fluid must be packed and frozen at −20° C. The components of the intracellular and extracellular fluids are shown in Table 3.

TABLE 3

Components of the intracellular and extracellular fluids

| Components | Extracellular fluid (mM) | Intracellular fluid (mM) |
|---|---|---|
| NaCl | 145 | — |
| KCl | 4 | 120 |
| KOH | — | 31.25 |
| CaCl$_2$ | 2 | 5.374 |
| MgCl$_2$ | 1 | 1.75 |
| Glucose | 10 | — |
| Na$_2$ATP | — | 4 |
| HEPES | 10 | 10 |
| EGTA | — | 10 |
| pH | 7.4 with NaOH | 7.2 with KOH |
| Osmolality | 295 mOsm | 285 mOsm | c) Preparation of the Compound

The compound was dissolved into a 20 mM stock solution with DMSO. On the day of the assay, the compound stock solution was 3-fold serially diluted with DMSO, that is, 10 μL the compound stock solution was added to 20 μL DMSO to obtain 6 intermediate concentrations of the compound serially diluted with DMSO, which were 20, 6.66, 2.22, 0.74, 0.24 and 0.082 mM, respectively. Then 10 μL of the compound at the intermediate concentrations was added to 4990 μL extracellular fluid and diluted 500 times to afford the final concentrations to be tested, of which the highest concentration to be tested was 40 μM, and which were 40, 13.3, 4.44, 1.48, 0.49 and 0.16 μM, respectively. Preparation of the positive control compound Cisapride: 150 μM cisapride stock solution was 3-fold serially diluted with 100% DMSO, that is, 10 μL of 150 μM cisapride stock solution was added to 20 μL DMSO to obtain 5 intermediate concentrations of cisapride serially diluted with DMSO, which were 150, 50, 16.7, 5.56 and 1.85 μM, respectively. Then 10 μL of the cisapride at the intermediate concentrations was added to 4990 μL extracellular fluid and diluted 500 times to afford the final concentrations to be tested, of which the highest concentration to be tested was 300 nM and which were 300, 100, 33.3, 11.1 and 3.70 nM, respectively. The content of DMSO in the final test concentration should not exceed 0.2%, and this concentration of DMSO had no effect on hERG potassium channel.

d) Electrophysiological Recording Process

In CHO (Chinese Hamster Ovary) cells stably expressing hERG potassium channel, hERG potassium channel currents were recorded at room temperature using whole-cell patch clamp technique. The glass microelectrode was prepared by drawing a glass electrode blank (BF150-86-10, Sutter) by a puller, and the tip resistance after filling intra-electrode liquid is about 2-5 MΩ. The glass microelectrode was inserted into an amplifier head to attach to the Axopatch 200B (Molecular Devices) patch clamp amplifier. Clamping voltage and data recording were controlled and recorded by a computer using pClamp 10 software, with a sampling frequency of 10 kHz and a filtering frequency of 2 kHz. After the whole-cell recordings were obtained, the cells were clamped at −80 mV and the step voltage inducing the hERG potassium current (/hERG) was given a depolarization voltage of 2 s from −80 mV to +20 mV, then repolarized to −50 mV for 1 s and then back to −80 mV. This voltage stimulus was given every 10 s, and a dosing process was started after the hERG potassium current was determined to be stable (1 min). Compound concentrations were administered consecutively starting at low test concentrations, with each test concentration being administered for at least 1 minute. At least 3 cells (n≥3) were tested per concentration of the compound and at least 2 cells (n≥2) were tested per concentration of positive compound.

e) Data Analysis

In each complete current record, the percent inhibition for each compound concentration can be calculated based on the percentage of the peak current to the negative control. The dose-response curve was obtained by fitting with the standard Hill equation which is particularly as follows:

$$I_{(C)}=I_b+(I_{fi}-I_b)*c^n/(IC_{50}^n+c^n)$$

with C as the compound concentration tested and n as the slope.

Curve fitting and inhibition rate calculation were performed by Qpatch analysis software. If the inhibition rate at the lowest concentration exceeds half inhibition or the inhibition rate at the highest concentration does not reach half inhibition, the corresponding $IC_{50}$ of the compound is lower than the lowest concentration or the $IC_{50}$ value is higher than the highest concentration.

Conclusion: the compounds did not show hERG inhibitory activity.

Experimental Example 3: Inhibitory Activity on Cytochrome P450 Isozymes

A. Experimental Purpose

The inhibitory effect of test compounds on the activity of human hepatic microsomal cytochrome P450 isozymes (CYP1A2, CYP2C9, CYP2C19, CYP2D6 and CYP3A4) was determined.

B. Experimental Procedure

First, the test compound (10 mM) was diluted in gradient to prepare working solutions (100×final concentration) with working solution concentrations: 5, 1.5, 0.5, 0.15, 0.05, 0.015, 0.005 mM, respectively, and at the same time, working solutions of each positive inhibitor of P450 isozymes (CYP1A2, CYP2C9, CYP2C19, CYP2D6 and CYP3A4) and its specific substrate mixture were prepared. Human liver microsomes frozen in a −80° C. refrigerator were thawed on ice, and diluted with PB (phosphate buffer) after all the human liver microsomes were dissolved, to prepare a working solution at a certain concentration (0.253 mg/mL). 20 μl substrate mixture was added to the reaction plate (20 μL PB was added to the Blank wells) while 158 μL human liver microsome working solution was added to the reaction plate which was placed on ice for later use. At this time, 2 μL of each concentration of the test compound (N=1) and the specific inhibitor (N=2) were added to the corresponding wells, and the corresponding organic solvents were added to the groups without inhibitors (the test compound or the positive inhibitor) as control samples (1:1 DMSO:MeOH for the test compound control sample, and 1:9 DMSO:MeOH for the positive control sample). After pre-incubation in 37° C. water bath for 10 min, 20 μL coenzyme factor (NADPH) solution was added to the reaction plate, and incubated in 37° C. water bath for 10 min. 400 μL cold acetonitrile solution (200 ng/mL Tolbutamide and Labetalol as the internal standard) was added to stop the reaction. The reaction plate was placed on a shaker and shaken for 10 min. The mixture was centrifuged at 4,000 rpm for 20 min, and 200 μl the supernatant was added to 100 μL water for sample dilution. Finally, the plate was sealed, shaken, mixed well and detected by LC/MS/MS.

C. Experimental Results

The experimental results are shown in Table 4.

TABLE 4

Results of the inhibitory effect of the test compounds on the activity of human liver microsomal cytochrome P450 isoenzymes

| Compound No. | $IC_{50}$ (μM) | | | | |
|---|---|---|---|---|---|
| | CYP1A2 | CYP2C9 | CYP2C19 | CYP2D6 | CYP3A4 |
| WX001 | >50 | >50 | >50 | >50 | >50 |
| WX004 | >50 | >50 | >50 | >50 | >50 |
| WX006 | >50 | >50 | >50 | >50 | >50 |
| WX042 | >50 | >50 | >50 | >50 | >50 |
| WX043 | >50 | >50 | >50 | >50 | >50 |

Conclusion: the compounds of the present invention showed no CYP inhibitory activity.

Experimental Example 4: Metabolic Stability of Compounds in Liver Microsomes of Human, CD-1 Mouse, Beagle Dog and Cynomolgus Monkey A. Experimental Purpose Metabolic stability of test compounds was assessed in liver microsomes of human, CD-1 mouse, beagle dog and cynomolgus monkey.

B. Experimental Procedure

First, the test compound (10 mM) was subject to a two-step dilution, with an intermediate concentration of 100 μM by dilution with 100% methanol, and the working solution concentration of 10 μM by dilution with potassium phosphate buffer. 8 96-well incubation plates were prepared, named as T0, T5, T10, T20, T30, T60, Blank and NCF60, respectively. The corresponding reaction time points of the first 6 incubation plates were 0, 5, 10, 20, 30 and 60 min, respectively; no test compound or control compound was added to the Blank plate. For the NCF60 plate, the solution of NADPH regeneration system was replaced with potassium phosphate buffer for incubation for 60 min. 10 μl the test compound working solution and 80 μL the microsome working solution (liver microsome protein concentration was 0.625 mg/mL) were separately added to T0, T5, T10, T20, T30, T60 and NCF60 plates, and only the microsome working solution was added to the Blank plate, and then the above plates were placed in a 37° C. water bath for pre-incubation for about 10 min. After the pre-incubation, except for NCF60 plate and T0 plate, 10 μL the working solution of the NADPH regeneration system was added to each sample well to start the reaction, and 10 μL potassium phosphate buffer was added to each well in the NCF60 plate. Therefore, in the samples of the test compound or the control compound, the final reaction concentrations of the compound, testosterone, diclofenac and propafenone weres 1 μM, the concentration of liver microsomes was 0.5 mg/mL, and the final concentrations of DMSO and acetonitrile in the reaction system were 0.01% (v/v) and 0.99% (v/v), respectively. After incubation for an appropriate period of time (e.g. 5, 10, 20, 30 and 60 min), 300 μL stop solution (containing 100 ng/mL tolbutamide and 100 ng/mL labetalol in acetonitrile) was added to each sample well to stop the reaction; 300 μL stop solution was added and then 10 μL NADPH working solution was added to the T0 plate. All sample plates were shaken well and centrifuged in a centrifuge (3220×g) for 20 min, then 100 μL supernatant per well was diluted into 300 μL purified water for liquid chromatography tandem mass spectrometry analysis.

Conclusion: the compounds of the invention have excellent metabolic stability in liver microsomes.

Experimental Example 5: Pharmacokinetic Evaluation of Compounds

A. Experimental Purpose

In vivo pharmacokinetics of compounds in SD rats were tested.

B. Experimental Procedure

Pharmacokinetic profiles in rodents following intravenous and oral administration of the compounds were tested by standard protocols. In the experiment, candidate compounds were formulated as clear solutions or homogeneous suspensions, and were administered to rats by single intravenous injection (IV, 1 mpk) and oral administration (PO, 3 mpk). The vehicle for intravenous injection was a certain proportion of PEG400 in water, and the vehicle for oral administration was a certain proportion of methylcellulose and Tween 80 in water. Whole blood was collected, and plasma was prepared. Drug concentration was analyzed by LC-MS/MS, and pharmacokinetic parameters were calculated by Phoenix WinNonlin software.

C. Experimental Results

The experimental results are shown in Table 5.

TABLE 5

Pharmacokinetic test results

| Compound No. | Clearance rate (mL/min/kg) | Half-life $T_{1/2}$ (h) | Integral concentration AUC for PO (nM · hr) | Bioavailability F (%) |
|---|---|---|---|---|
| WX001 | 1.04 | 3.12 | 163046 | 158 |
| WX004 | 1.21 | 2.96 | 64484 | 80 |
| WX006 | 1.05 | 2.63 | 39489 | 44 |
| WX042 | 8.13 | 2.27 | 20515 | 176 |
| WX043 | 5.37 | 5.83 | 11966 | 70 |

Conclusion: the compounds of the present invention have high bioavailability.

Experimental Example 6: Evaluation of the Liver-Blood Ratio of Compounds in Rats A. Experimental Purpose Tissue distribution of compounds in SD rats was tested.

B. Experimental Procedure

In the experiment, candidate compounds were formulated as clear solutions and administered to rats in a single oral dose (PO, 1 mpk). The vehicle for oral administration was a certain proportion of methylcellulose and Tween 80 in water. Whole blood was collected at a certain time and plasma was prepared, and tissues were collected at the corresponding time and prepared into tissue homogenates. Drug concentration was analyzed by LC-MS/MS, and pharmacokinetic parameters were calculated by Phoenix WinNonlin software.

C. Experimental Results

The experimental results are shown in Table 6.

TABLE 6

Pharmacokinetic test results

| Time points | Tested tissue Concentration (nM) | Concentrations in tested tissues (nM) and ratios | | | | | |
|---|---|---|---|---|---|---|---|
| | | WX001 | WX004 | WX006 | WX012 | WX042 | WX043 |
| 1.5 h | Plasma | 4880 | 4670 | 2010 | 810 | 3314 | 2025 |
| | Liver tissue | 2443 | 4420 | 2415 | 2100 | 19900 | 38250 |
| | Liver-blood ratio | 0.491 | 0.943 | 1.20 | 2.62 | 9.53 | 20.0 |
| | Brain tissue | 72.8 | 105 | NA | NA | 76.2 | 30.6 |
| | Brain-blood ratio | 0.015 | 0.022 | NA | NA | 0.0375 | 0.016 |
| 2.0 h | Plasma | 9090 | 7755 | 3100 | 273 | 3045 | 916 |
| | Liver tissue | 4273 | 6365 | 2865 | 618 | 20600 | 27800 |
| | Liver-blood ratio | 0.469 | 0.821 | 0.92 | 2.32 | 6.78 | 30.0 |
| | Brain tissue | 162 | 148 | NA | NA | 62.2 | 13.1 |
| | Brain-blood ratio | 0.017 | 0.019 | NA | NA | 0.0211 | 0.014 |
| 6.0 h | Plasma | 3318 | 3665 | 1780 | 145 | 259 | 246 |
| | Liver tissue | 1790 | 3900 | 2180 | 634 | 6710 | 19800 |
| | Liver-blood ratio | 0.549 | 1.22 | 1.25 | 4.39 | 26.2 | 81.5 |
| | Brain tissue | 91.5 | 71 | NA | NA | ND | ND |
| | Brain-blood ratio | 0.020 | 0.023 | NA | NA | ND | ND |

ND indicates that the compound concentration was too low to reach the limit of detection, and NA indicates that the test was not performed.
Conclusion: the compounds of the present invention have high hepatic tissue selectivity in mice.

Experimental Example 7: Evaluation of the Liver-Blood Ratio of Compounds in Mice A. Experimental Purpose Tissue distribution of compounds in C57BL/6 mice was tested.

B. Experimental Procedure

In the experiment, candidate compounds were formulated as clear solutions and administered to mice in a single oral dose (PO, 1 mpk). The vehicle for oral administration was a certain proportion of methylcellulose and Tween 80 in water. Whole blood was collected at a certain time and plasma was prepared, tissues were collected at the corresponding time and prepared into tissue homogenates. Drug concentration was analyzed by LC-MS/MS, and pharmacokinetic parameters were calculated by Phoenix WinNonlin software.

Conclusion: the compounds of the present invention have high hepatic tissue selectivity in mice.

Experimental Example 8: Acute Fructose Feeding Experiment in Mice—In Vivo Pharmacodynamic Evaluation A. Experimental Purpose The effect of test compounds on the fructose content in mice with high fructose intake was investigated.

B. Experimental Procedure

All animals were acclimated for one week in an animal house, fed with normal chow and fasted for 16 hours before being given fructose.

1) The experiment began at −0.5 hr. A control group was given a certain volume of vehicle (a certain proportion of methylcellulose and Tween 80 in water), and an experimental group was given a certain dose of a solution of the compound (the administered volume was consistent with the vehicle).

2) 0.5 hour later and before administration of a fructose solution, a blood sample was collected at 0 hr, followed by oral administration of 1 g/kg of an aqueous fructose solution.

3) After the administration of fructose, blood samples were collected from saphenous vein of mice at 0.25, 0.5, 1, 2, 3 and 8 hr, and fructose concentration was analyzed by LC-MS/MS.

C. Experimental Results

The experimental results are shown in Table 7.

TABLE 7

Experimental results of acute fructose feeding in mice

|  | WX004, 10 mpk | WX024, 30 mpk | WX019, 30 mpk | WX020, 30 mpk | WX026, 30 mpk | WX029, 30 mpk | WX030, 30 mpk | WX041, 30 mpk | WX042, 30 mpk | WX043, 30 mpk |
|---|---|---|---|---|---|---|---|---|---|---|
| AUC of integral fructose concentration for control group (nM · hr) | 440.3 | 139 | 139 | 139 | 112 | 112 | 112 | 263 | 263 | 263 |
| AUC of integral fructose concentration for dosed group (nM · hr) | 2194 | 1858 | 849 | 1180 | 993 | 1687 | 1029 | 1704 | 3400 | 3504 |
| AUC of integral fructose concentration of dosed group/AUC of Integral fructose concentration of control group | 5.0 | 13.4 | 6.1 | 8.5 | 8.9 | 15.1 | 9.2 | 6.5 | 12.9 | 13.3 |

Conclusion: the compounds of the present invention have a strong inhibitory effect on fructose metabolism in mice.

Experimental Example 9: Acute Fructose Feeding Experiment in Rats—In Vivo Pharmacodynamic Evaluation A. Experimental Purpose The effect of test compounds on the fructose content in rats with high fructose intake was investigated.

B. Experimental Procedure

All animals were acclimated for at least three days in an animal house, fed with normal chow, and fasted 16 hours before being given fructose.

1. The experiment began at −1 hr. A control group was given a certain volume of vehicle and an experimental group was given a certain dose of a solution of the compound (a certain proportion of methylcellulose and Tween 80 in water).

2. 1 hour later and before administration of fructose solution, a blood sample was collected at 0 hr, followed by oral administration of 2 g/kg of an aqueous fructose solution.

3. After administration of fructose, blood samples were collected from the neck vein of rats at 0.5, 1, 2, 3 and 8 hr, and fructose concentration was analyzed by LC-MS/MS.

Conclusion: the compounds of the present invention have a strong inhibitory effect on fructose metabolism in rats.

What is claimed is:

1. A compound represented by formula (III), or a pharmaceutically acceptable salt thereof, (III)

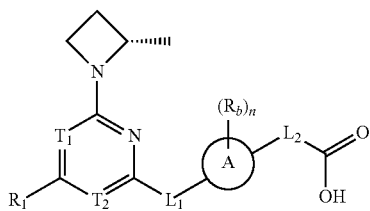

wherein,

T₁ is selected from N, and T₂ is selected from CR$_a$, or T₂ is selected from N, and T₁ is selected from CR$_a$;

R₁ and R$_a$ together with the carbon atoms to which they are directly attached form a ring

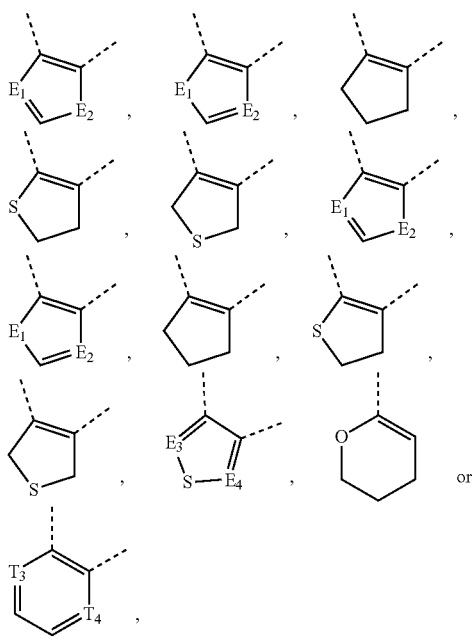

wherein the

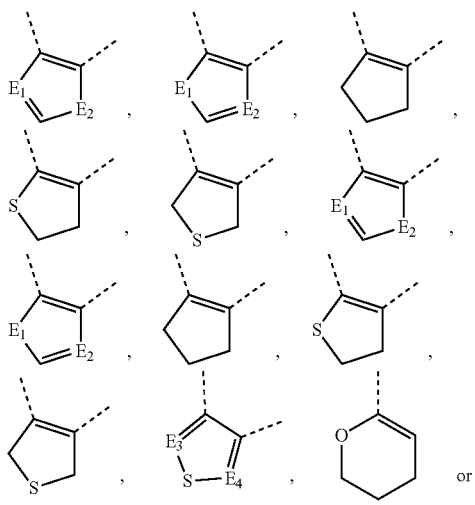

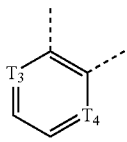

is optionally substituted with 1 or 2 R;

each E₁ and E₂ is independently selected from the group consisting of N, NH, O, CH, CH₂, and S;

E₃ and E₄ are each independently selected from the group consisting of CH and N;

T₃ and T₄ are each independently selected from the group consisting of N and CH;

each R is independently selected from the group consisting of H, halo, CN, NH₂, OH, C$_{1-3}$ alkyl, and C$_{1-3}$ alkoxy, wherein the C$_{1-3}$ alkyl is optionally substituted with 1, 2, or 3 F;

each R$_b$ is independently selected from the group consisting of halo, cyano, and C$_{1-3}$ alkyl, wherein the C$_{1-3}$ alkyl is optionally substituted with 1, 2, or 3 F;

n is selected from 0, 1 and 2;

L₁ is selected from the group consisting of a single bond and NH;

L₂ is selected from the group consisting of a single bond, —(CH₂)$_m$—,

—CH=CH—, and —O(CH₂)$_q$—, wherein the —(CH₂)$_m$—,

—CH=CH—, and —O(CH₂)$_q$— may be optionally substituted with 1, 2, or 3 R;

m is selected from 0, 1 and 2;

q is selected from 1 and 2;

ring A is selected from the group consisting of 4-8 membered heterocycloalkyl, C$_{3-6}$ cycloalkyl, phenyl, and 5-6 membered heteroaryl;

when R₁ and R$_a$ together with the carbon atoms to which they are directly attached form ring

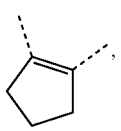

the ring A is not
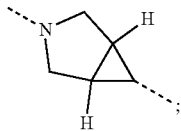
and
wherein the "4-8 membered heterocycloalkyl and 5-6 membered heteroaryl" have 1, 2 or 3 heteroatoms independently selected from the group consisting of O, S and N.
2. The compound according to claim 1, or a pharmaceutically acceptable salt thereof, wherein the structural unit
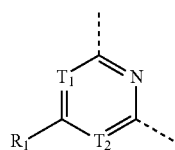
is selected from the group consisting of
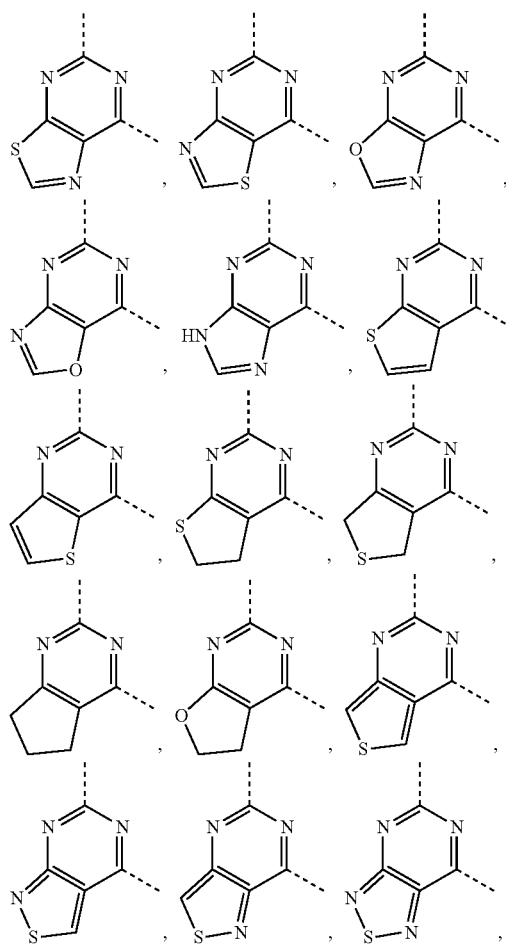
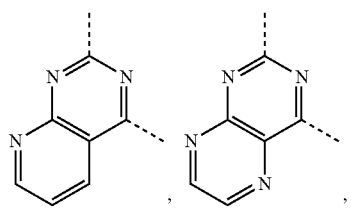
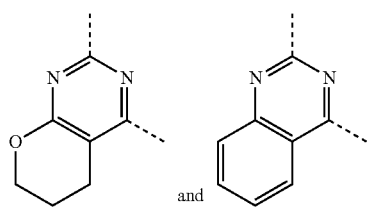
and , wherein the
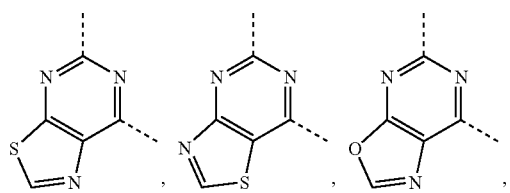
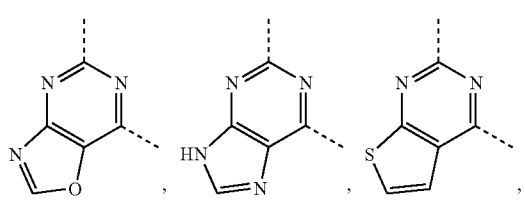
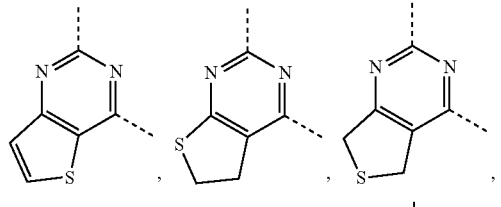
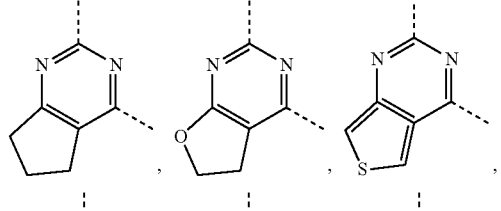
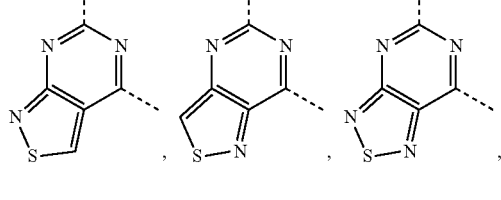
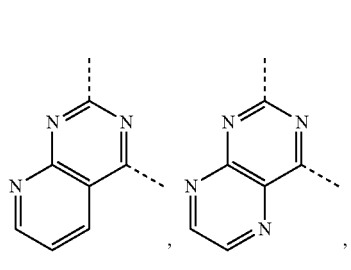

-continued
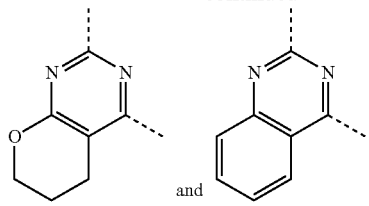
and
is optionally substituted with 1 or 2 R.
3. The compound according to claim 1, or a pharmaceutically acceptable salt thereof, wherein the structural unit
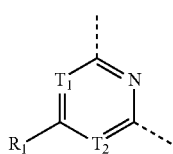
is selected from the group consisting of
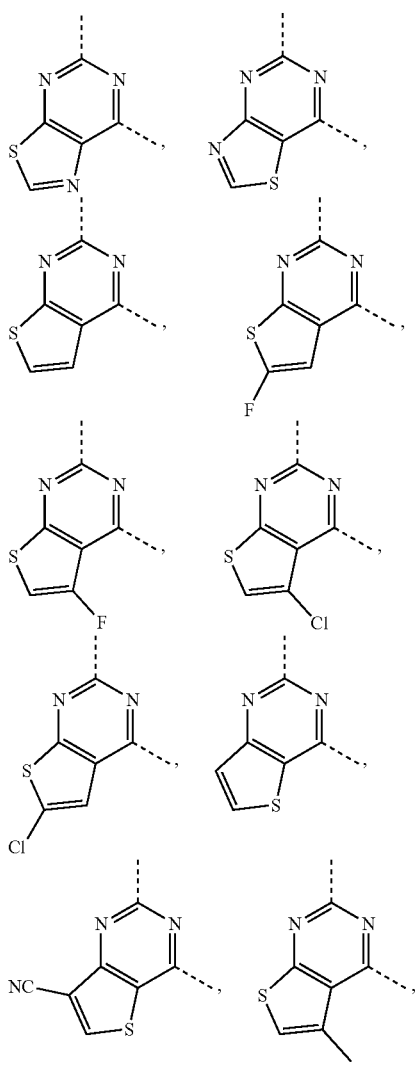
-continued
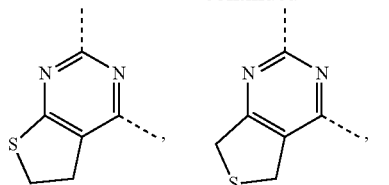
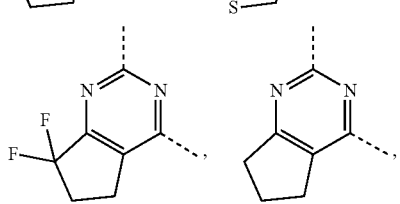
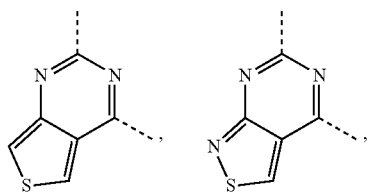
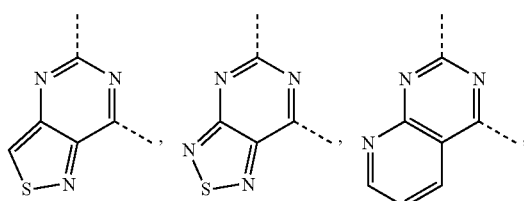
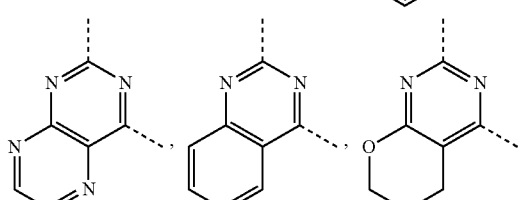
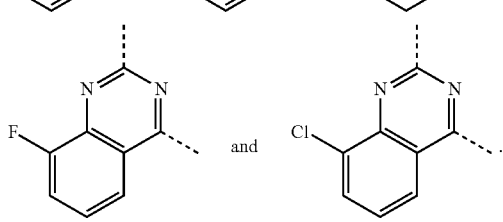
4. The compound according to claim 1, or a pharmaceutically acceptable salt thereof, wherein ring A is selected from the group consisting of
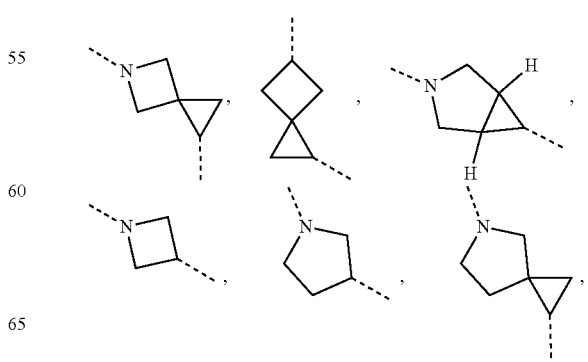

-continued

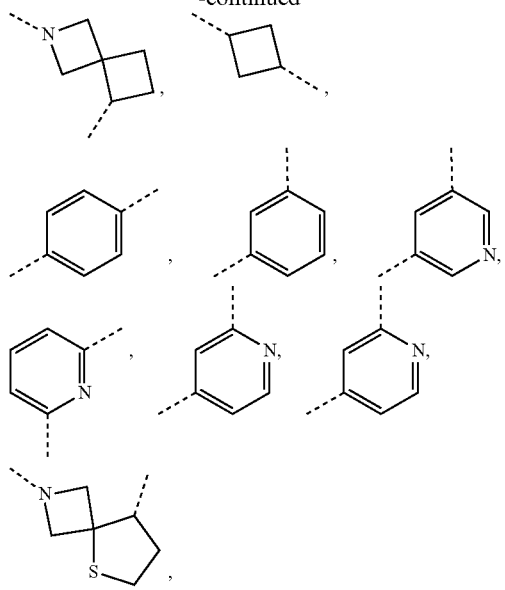

thiazolyl, thienyl, imidazolyl, and pyrazolyl.

5. The compound according to claim 1, or a pharmaceutically acceptable salt thereof, wherein each R is independently selected from the group consisting of H, F, Cl, CN, $CH_3$, and $CF_3$.

6. The compound according to claim 1, or a pharmaceutically acceptable salt thereof, wherein each $R_b$ is independently selected from the group consisting of F, Cl, cyano, $CH_3$, and $CF_3$.

7. The compound according to claim 1, or a pharmaceutically acceptable salt thereof, wherein $L_2$ is selected from the group consisting of a single bond, —$CH_2$—, —$CH_2CH_2$—, —CH=CH—, and —$OCH_2$—.

8. The compound according to claim 1, or a pharmaceutically acceptable salt thereof, selected from the group consisting of:

(I-1)
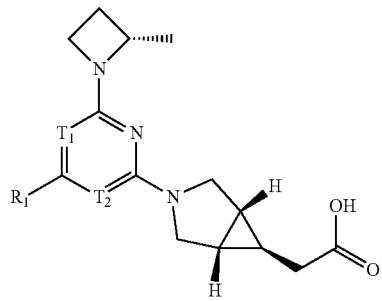

(I-2)
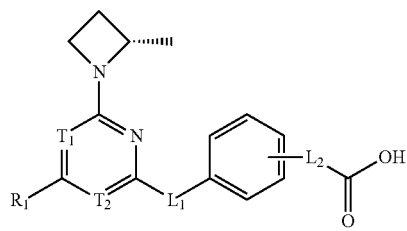

-continued (III-1)
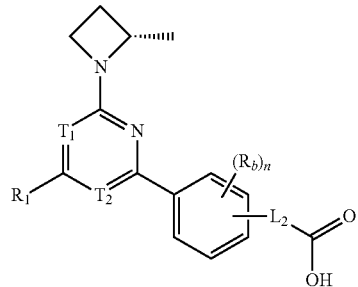

(III-2)
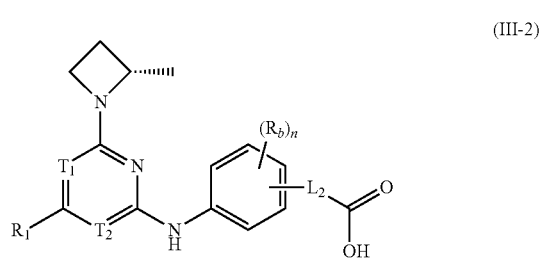

(VI-1)
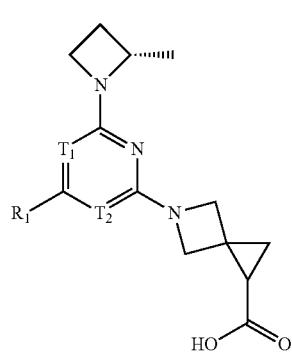

(VIII-1)
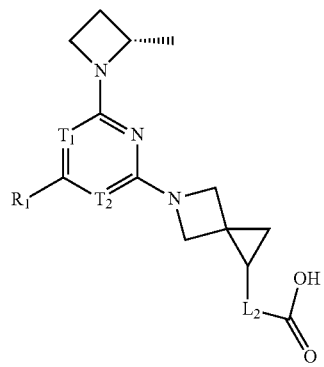

wherein $R_1$, $R_b$, $T_1$, $T_2$, n, $L_1$ and $L_2$ are as defined in claim 1.

9. A compound of any of the following formulae, or a pharmaceutically acceptable salt thereof:

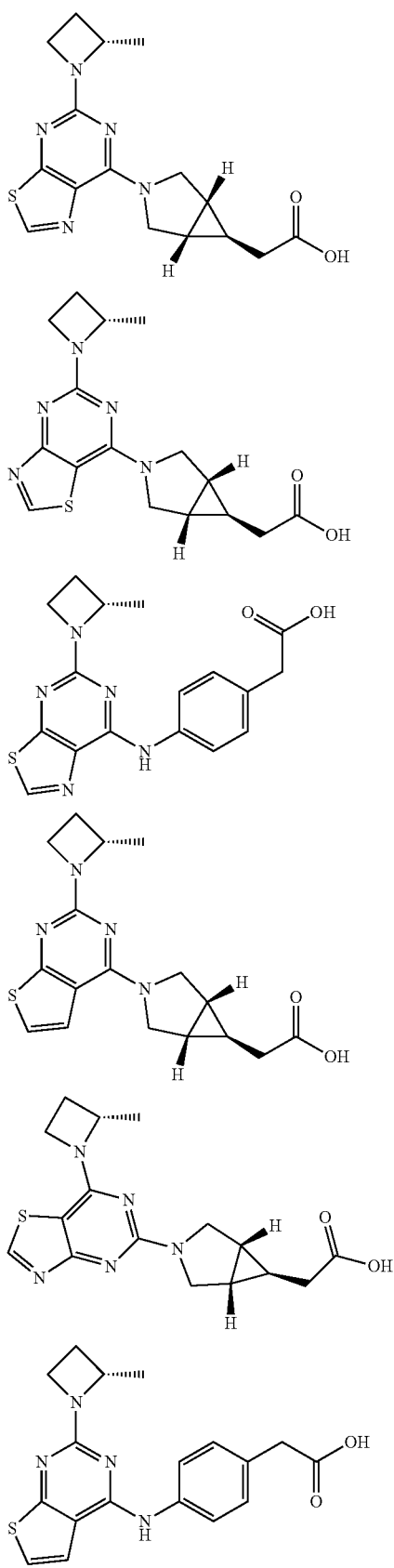
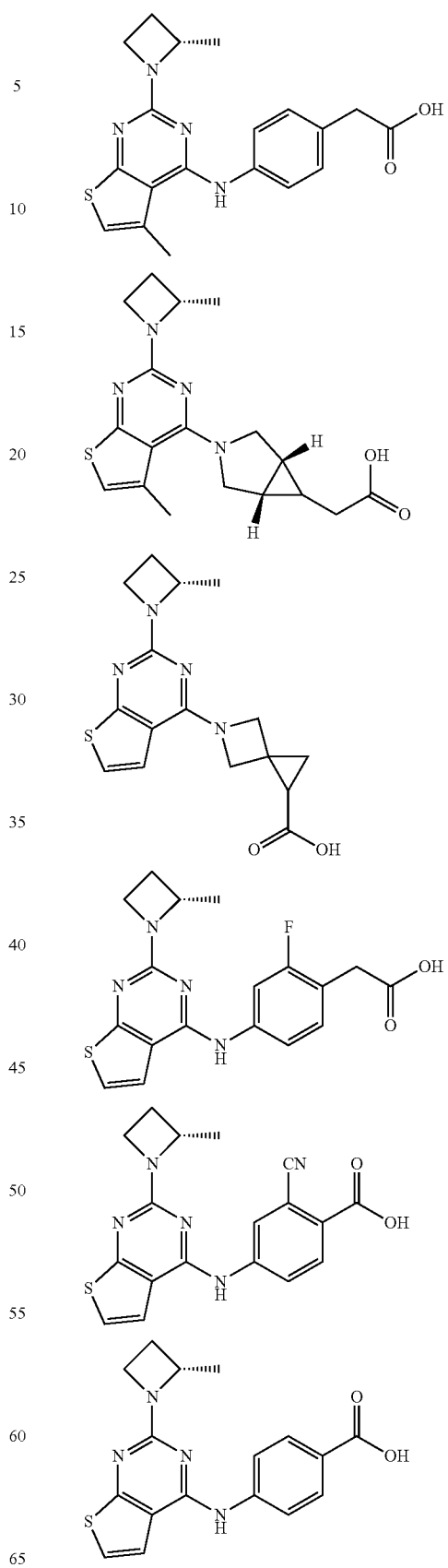

135
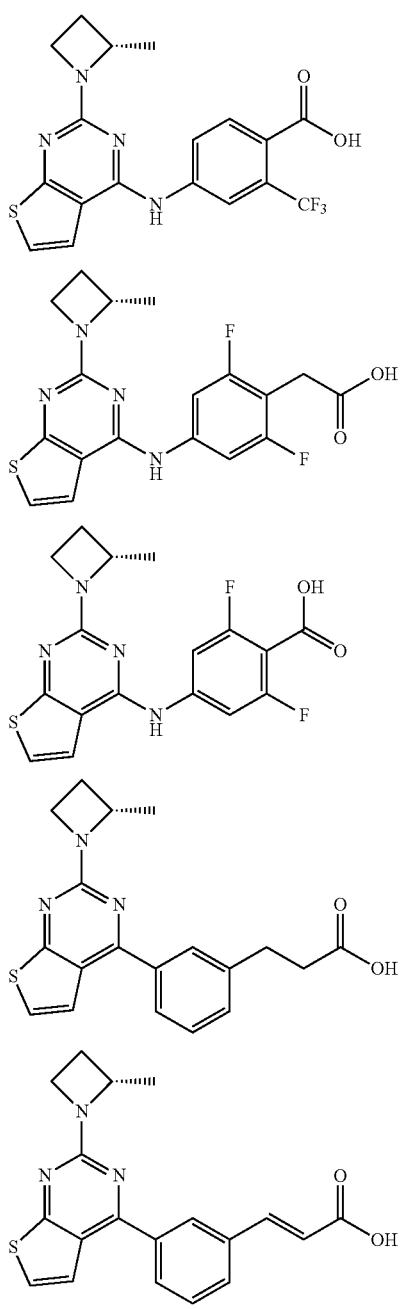
136
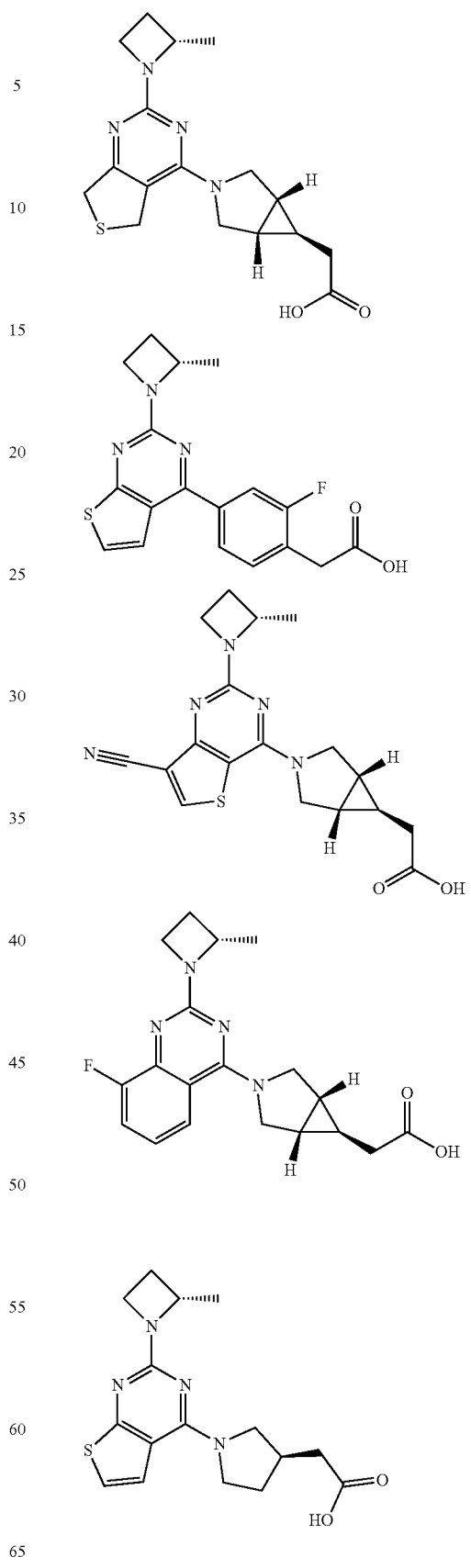

137
-continued
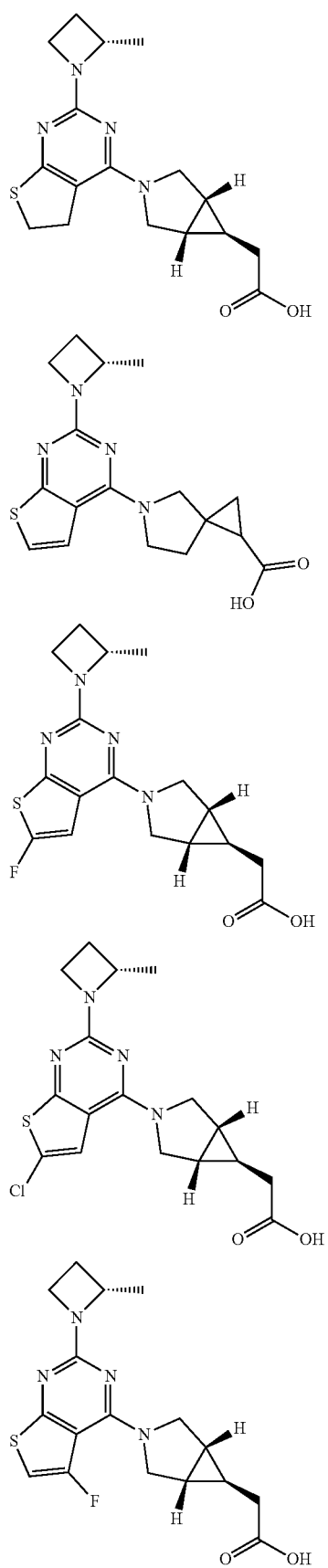
138
-continued
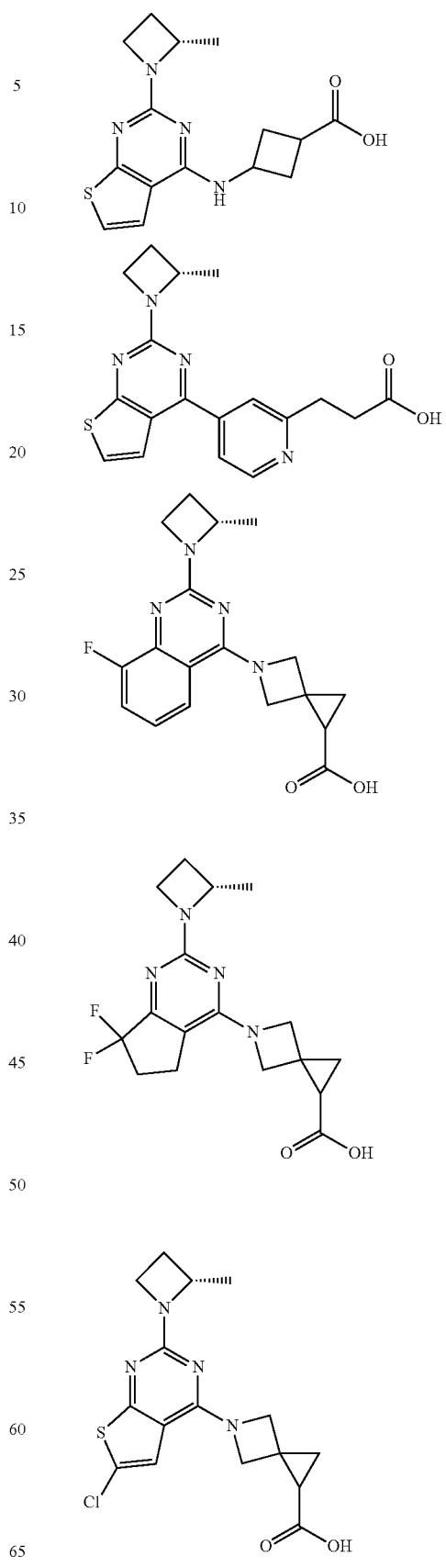

139
-continued
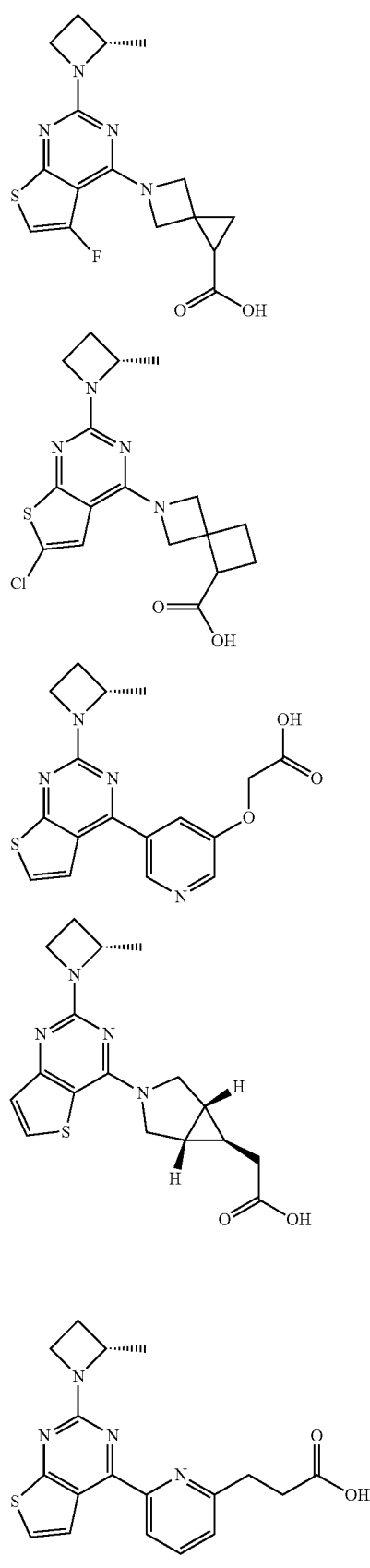
140
-continued
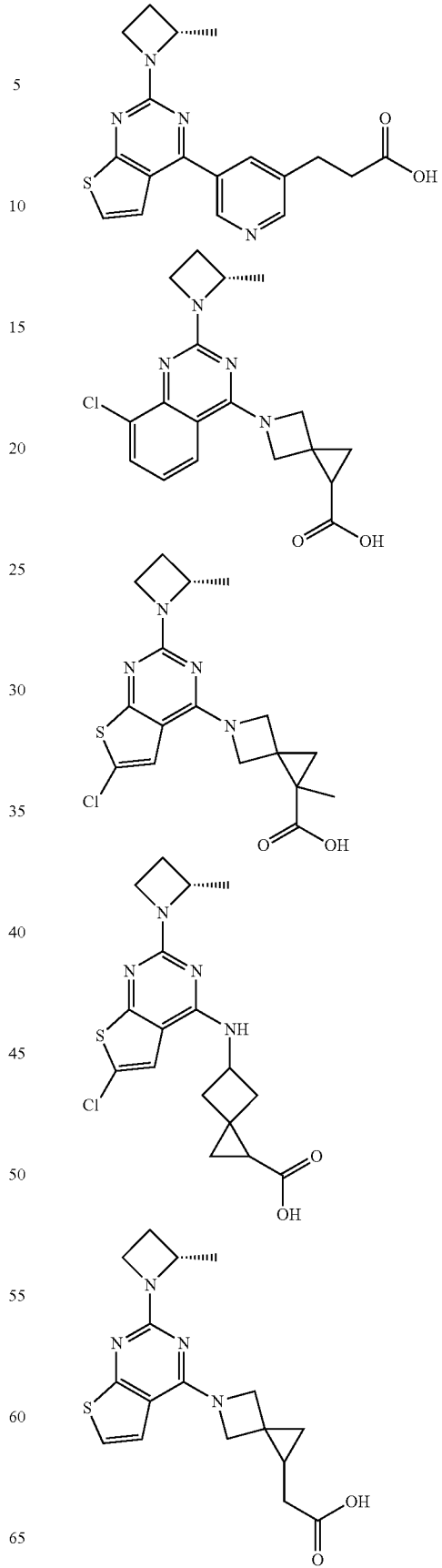

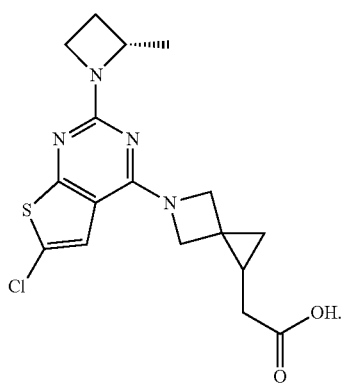 [SMILES: C[C@H]1CCN1c1nc(N2CC3(CC3CC(=O)O)C2)c2cc(Cl)sc2n1]
10. The compound according to claim 9, or a pharmaceutically acceptable salt thereof, selected from the group consisting of:
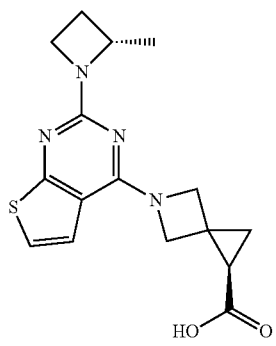
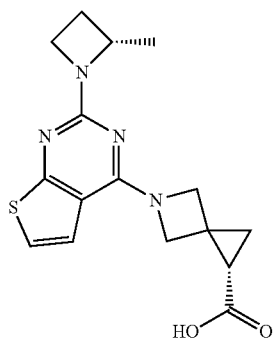
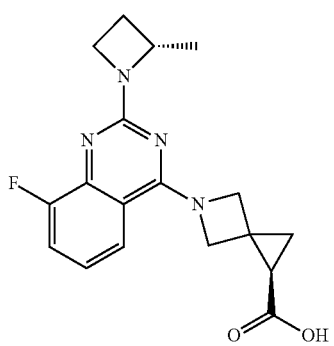
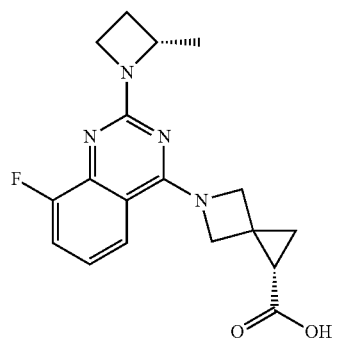
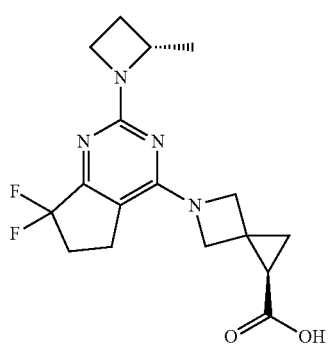
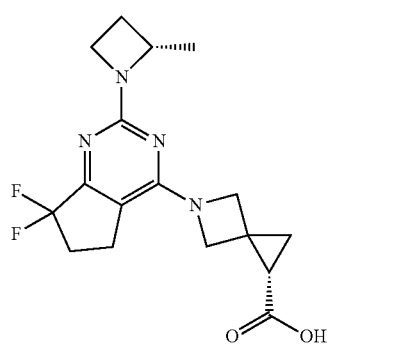
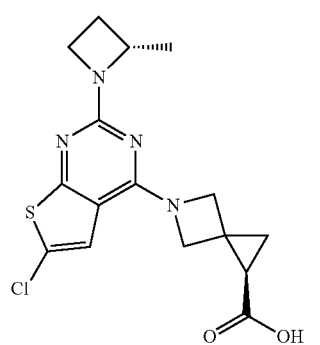
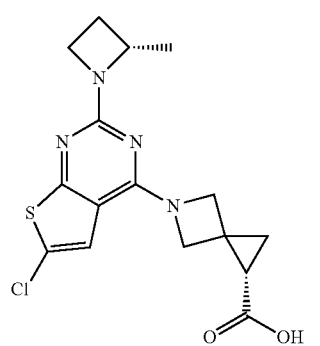

-continued

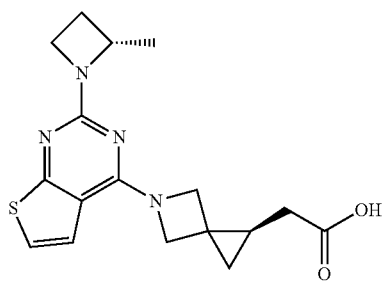

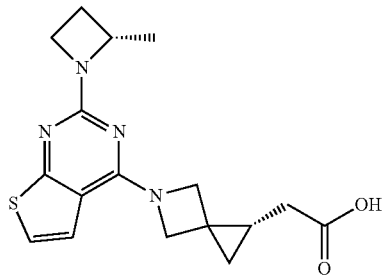

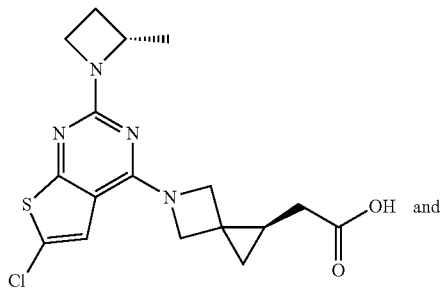 and

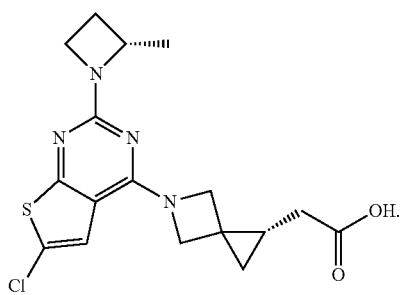

11. A method of inhibiting KHK in a subject in need thereof which comprises the administration of a medicament comprising a KHK inhibitor compound according to claim 1, or a pharmaceutically acceptable salt thereof.

12. The method according to claim 11, wherein the subject has non-alcoholic fatty liver disease or non-alcoholic steatohepatitis.

13. A medicament composition which comprises a compound according to claim 1 and a pharmaceutically acceptable carrier.

14. The compound according to claim 1, wherein

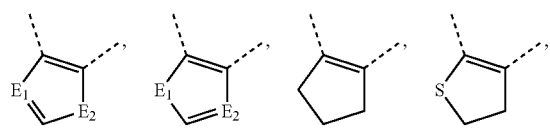

-continued

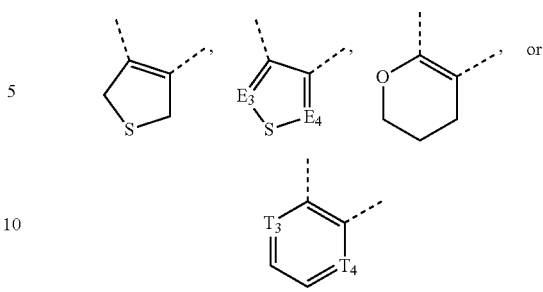

is substituted with 1 or 2 R.

15. The compound according to claim 1, wherein R is $C_{1-3}$ alkyl which is substituted with 1, 2, or 3 F.

16. The compound of claim 1, wherein $R_b$ is $C_{1-3}$ alkyl which is substituted with 1, 2, or 3 F.

17. The compound according to claim 1, wherein $L_2$ is $-O(CH_2)_q-$, which is substituted with 1, 2, or 3 R.

18. The compound according to claim 2, or a pharmaceutically acceptable salt thereof, wherein any of the following:

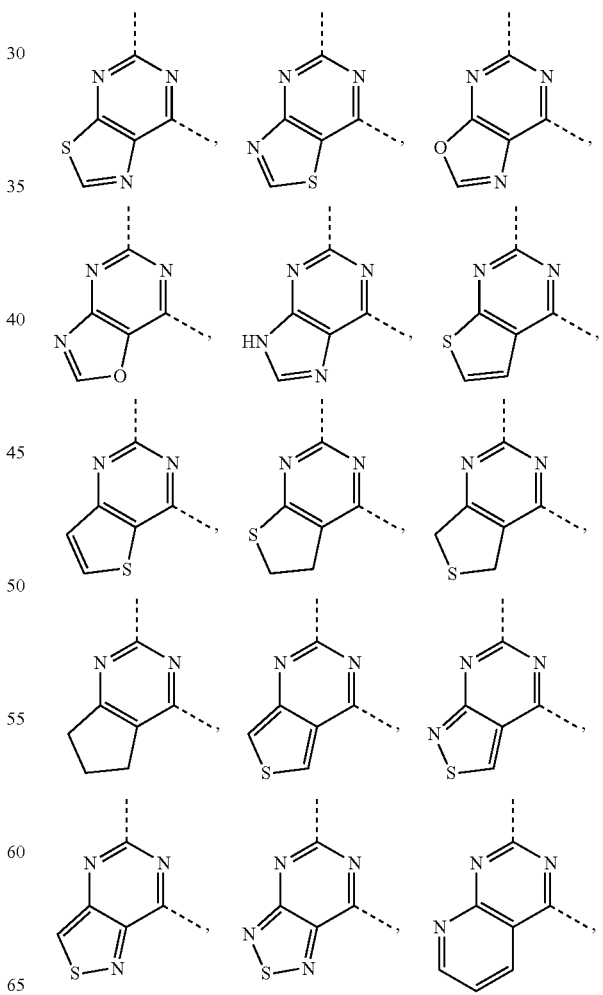

-continued
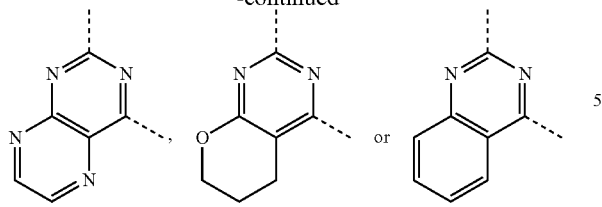
is substituted with 1 or 2 R.
* * * * *